US012785543B2

(12) United States Patent
Chen

(10) Patent No.: US 12,785,543 B2
(45) Date of Patent: Nov. 3, 2026

(54) FILTER HAVING A COMMON SUPPLY AND LOAD TERMINAL AND CYCLOCONVERTER

(71) Applicant: Huawei Digital Power Technologies Co., Ltd., Shenzhen (CN)

(72) Inventor: Baoguo Chen, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 243 days.

(21) Appl. No.: 18/735,535

(22) Filed: Jun. 6, 2024

(65) Prior Publication Data

US 2025/0023481 A1 Jan. 16, 2025

(30) Foreign Application Priority Data

Jul. 11, 2023 (CN) ......................... 202310850982.2

(51) Int. Cl.

| | |
|---|---|
| ***H02M 1/12*** | (2006.01) |
| ***H02M 1/00*** | (2006.01) |
| ***H02M 5/458*** | (2006.01) |
| *H02J 4/20* | (2026.01) |

(52) U.S. Cl.

CPC ......... *H02M 1/126* (2013.01); *H02M 1/0064* (2021.05); *H02M 5/4585* (2013.01); *H02J 4/20* (2026.01)

(58) Field of Classification Search

CPC ............................ H02M 5/4585; H02M 1/126

See application file for complete search history.

(56) References Cited

U.S. PATENT DOCUMENTS 5,111,373 A 5/1992 Higaki
2011/0103106 A1* 5/2011 Sato .................... H02M 5/4585 363/37

FOREIGN PATENT DOCUMENTS

CN 105406695 A 3/2016

* cited by examiner

*Primary Examiner* — Peter M Novak

(74) *Attorney, Agent, or Firm* — Maier & Maier, PLLC

(57) ABSTRACT

A power conversion device includes a first filter inductor and an AC/AC circuit, where the first filter inductor includes three inductor windings, and a first inductor magnetic core. The first inductor winding, the second inductor winding, and the third inductor winding are all wound around the first inductor magnetic core. The first inductor winding is connected to a first input end of the power conversion device, the second inductor winding is connected to a second input end and a second output end of the power conversion device, the first inductor winding and a second end of the second inductor winding are separately connected to the AC/AC circuit, the third inductor winding is connected to a first output end of the power conversion device, and the second inductor winding and a second end of the third inductor winding are separately connected to the AC/AC circuit.

20 Claims, 20 Drawing Sheets

FILTER HAVING A COMMON SUPPLY AND LOAD TERMINAL AND CYCLOCONVERTER

CROSS-REFERENCE TO RELATED APPLICATIONS

This application claims priority to Chinese Patent Application No. 202310850982.2, filed on Jul. 11, 2023, which is hereby incorporated by reference in its entirety.

TECHNICAL FIELD

The embodiments relate to the field of power supply technologies, and a power conversion device.

BACKGROUND

An alternating current/alternating current (AC/AC) power supply, such as an uninterruptible power supply (UPS) or a frequency converter, is provided with an input filter at an alternating current input side and an output filter at an alternating current output side. The AC/AC power supply filters high-frequency noise of an internal switch circuit by using the two filters, so that an alternating current output by the AC/AC power supply meets national and industry network access standards. The input filter is configured to make electromagnetic interference at a power grid side lower than a requirement limit, and the output filter is configured to make noise output by the AC/AC power supply meet a requirement for normal operation of an alternating current load.

Currently, both the input filter and the output filter of the AC/AC power supply perform filtering by using filter inductors. For example, refer to a schematic diagram of a structure of an AC/AC power supply with a single-phase input and a single-phase output shown in FIG. 1. As shown in FIG. 1, the AC/AC power supply includes an input filter (such as an input filter inductor Lin), an output filter (such as an output filter inductor Lout), and an AC/AC circuit. The input filter inductor Lin includes inductor windings Lin1 and Lin2 and a first magnetic core, and the inductor windings Lin1 and Lin2 are both wound around the first magnetic core. The output filter inductor Lout includes inductor windings Lout1 and Lout2 and a second magnetic core, and the inductor windings Lout1 and Lout2 are both wound around the second magnetic core.

It is clear that the input filter and the output filter are two physically separate units, and consequently the input filter and the output filter each use a large quantity of circuit elements and occupy a large volume, resulting in high circuit costs of the AC/AC power supply.

SUMMARY

The embodiments provide a power conversion device, to effectively reduce circuit costs of the power conversion device.

According to a first aspect, the embodiments provide a power conversion device. The power conversion device includes an alternating current input end, an alternating current output end, a first filter inductor, and an AC/AC circuit, the first filter inductor includes a first inductor winding, a second inductor winding, a third inductor winding, and a first inductor magnetic core, the alternating current input end of the power conversion device includes a first input end and a second input end, and the alternating current output end of the power conversion device includes a first output end and a second output end. The first inductor winding, the second inductor winding, and the third inductor winding are all wound around the first inductor magnetic core. A first end of the first inductor winding is connected to the first input end of the power conversion device, a first end of the second inductor winding is connected to the second input end and the second output end of the power conversion device, and a second end of the first inductor winding and a second end of the second inductor winding are separately connected to an input end of the AC/AC circuit. A first end of the third inductor winding is connected to the first output end of the power conversion device, and the second end of the second inductor winding and a second end of the third inductor winding are separately connected to an output end of the AC/AC circuit. It may be understood that, from a circuit structure of the power conversion device in this implementation, the first filter inductor not only can implement functions of an input filter inductor Lin and an output filter inductor Lout of an AC/AC power supply with a single-phase input and a single-phase output in the conventional technology, but also reduces one inductor winding and one inductor magnetic core in comparison with the input filter inductor Lin and the output filter inductor Lout of the AC/AC power supply with the single-phase input and the single-phase output in the conventional technology, thereby reducing circuit costs of the power conversion device.

With reference to the first aspect, in a first possible implementation, the power conversion device further includes a second filter inductor, and the second filter inductor includes a fourth inductor winding, a fifth inductor winding, a sixth inductor winding, and a second inductor magnetic core. The fourth inductor winding, the fifth inductor winding, and the sixth inductor winding are all wound around the second inductor magnetic core. The first end of the first inductor winding is connected to the first input end of the power conversion device through the fourth inductor winding, the first end of the second inductor winding is connected to the second input end and the second output end of the power conversion device through the fifth inductor winding, and the first end of the third inductor winding is connected to the first output end of the power conversion device through the sixth inductor winding. It may be understood from the circuit structure of the power conversion device in this implementation that the first filter inductor and the second filter inductor not only can implement functions of a two-stage filter inductor at an input end and a two-stage filter inductor at an output end of the AC/AC power supply with the single-phase input and the single-phase output in the conventional technology, but also reduce two inductor windings and two inductor magnetic cores in comparison with the two-stage filter inductor at the input end and the two-stage filter inductor at the output end of the AC/AC power supply with the single-phase input and the single-phase output in the conventional technology, thereby reducing circuit costs of the power conversion device.

With reference to the first aspect, in a second possible implementation, the power conversion device further includes a second filter inductor, and the second filter inductor includes a fourth inductor winding, a fifth inductor winding, a sixth inductor winding, a seventh inductor winding, and a second inductor magnetic core. The fourth inductor winding, the fifth inductor winding, the sixth inductor winding, and the seventh inductor winding are all wound around the second inductor magnetic core. The first end of the first inductor winding is connected to the first input end of the power conversion device through the fourth inductor winding. The first end of the second inductor winding is connected to the second input end of the power conversion device through the fifth inductor winding, and the first end of the second inductor winding is connected to the second output end of the power conversion device through the sixth inductor winding. The first end of the third inductor winding is connected to the first output end of the power conversion device through the seventh inductor winding. It may be understood from the circuit structure of the power conversion device in this implementation that the first filter inductor and the second filter inductor not only can implement functions of a two-stage filter inductor at an input end and a two-stage filter inductor at an output end of the AC/AC power supply with the single-phase input and the single-phase output in the conventional technology, but also reduce one inductor winding and two inductor magnetic cores in comparison with the two-stage filter inductor at the input end and the two-stage filter inductor at the output end of the AC/AC power supply with the single-phase input and the single-phase output in the conventional technology, thereby reducing circuit costs of the power conversion device. In addition, in addition to a circuit structure in which the filter inductor at the input end and the filter inductor at the output end share one inductor winding and one inductor magnetic core, the second filter inductor may also use a circuit structure in which the filter inductor at the input end and the filter inductor at the output end share one inductor magnetic core. The second filter inductor has various structures, so that the power conversion device has various structures and high flexibility.

With reference to the first aspect, in a third possible implementation, the power conversion device further includes a second filter inductor, and the second filter inductor includes a fourth inductor winding, a fifth inductor winding, and a second inductor magnetic core. The fourth inductor winding and the fifth inductor winding are both wound around the second inductor magnetic core. The first end of the first inductor winding is connected to the first input end of the power conversion device through the fourth inductor winding, and the first end of the second inductor winding is connected to the second input end of the power conversion device through the fifth inductor winding; or the first end of the second inductor winding is connected to the second output end of the power conversion device through the fourth inductor winding, and the first end of the third inductor winding is connected to the first output end of the power conversion device through the fifth inductor winding. It may be understood that the power conversion device in this implementation is applicable to an application scenario in which a single-phase input and a single-phase output are used, and a one-stage filter inductor is at an input end and a two-stage filter inductor is at an output end, or a two-stage filter inductor is at an input end and a one-stage filter inductor is at an output end, and is high in applicability.

With reference to any one of the first aspect to the third possible implementation of the first aspect, in a fourth possible implementation, the input end of the AC/AC circuit includes a first input end and a common end, and the output end of the AC/AC circuit includes a first output end and the common end. The second end of the first inductor winding is connected to the first input end of the AC/AC circuit, the second end of the second inductor winding is connected to the common end of the AC/AC circuit, and the second end of the third inductor winding is connected to the first output end of the AC/AC circuit. It may be understood that the AC/AC circuit in this implementation may be any AC/AC circuit with a single-phase input and a single-phase output and is applicable to a power conversion device with a single-phase input and a single-phase output.

With reference to the fourth possible implementation of the first aspect, in a fifth possible implementation, the AC/AC circuit includes a first phase bridge arm, a second phase bridge arm, a third phase bridge arm, a first bus capacitor, a first inductor, and a second inductor. The first phase bridge arm, the second phase bridge arm, the third phase bridge arm, and the first bus capacitor are connected in parallel to each other. A midpoint of the first phase bridge arm is connected to the first input end of the AC/AC circuit through the first inductor, a midpoint of the second phase bridge arm is connected to the common end of the AC/AC circuit, and a midpoint of the third phase bridge arm is connected to the first output end of the AC/AC circuit.

With reference to the fourth possible implementation of the first aspect, in a sixth possible implementation, the AC/AC circuit includes a first phase bridge arm, a second phase bridge arm, a first bus capacitor, a second bus capacitor, a first inductor, a second inductor, a first switching transistor, a second switching transistor, a third switching transistor, and a fourth switching transistor. The first bus capacitor and the second bus capacitor are connected in series and then connected in parallel to two ends of the first phase bridge arm, the first phase bridge arm and the second phase bridge arm are connected in parallel, and a serial connection part of the first bus capacitor and the second bus capacitor is connected to the common end of the AC/AC circuit. The first switching transistor and the second switching transistor are reversely connected in series between the common end of the AC/AC circuit and a midpoint of the first phase bridge arm, and the third switching transistor and the fourth switching transistor are reversely connected in series between the common end of the AC/AC circuit and a midpoint of the second phase bridge arm. The midpoint of the first phase bridge arm is connected to the first input end of the AC/AC circuit through the first inductor, and the midpoint of the second phase bridge arm is connected to the first output end of the AC/AC circuit through the second inductor. It may be understood that, in addition to a three-bridge-arm conversion circuit in the foregoing implementation, the AC/AC circuit may further use a circuit structure of the AC/AC circuit provided in this implementation. The AC/AC circuit has various structures, so that the power conversion device has various structures and high flexibility.

With reference to the first aspect, in a seventh possible implementation, the first filter inductor further includes a fourth inductor winding and a fifth inductor winding, and the alternating current output end of the power conversion device further includes a third output end and a fourth output end. The fourth inductor winding and the fifth inductor winding are both wound around the first inductor magnetic core. A first end of the fourth inductor winding is connected to the third output end of the power conversion device, a first end of the fifth inductor winding is connected to the fourth output end of the power conversion device, and a second end of the fourth inductor winding and a second end of the fifth inductor winding are separately connected to the output end of the AC/AC circuit. It may be understood from a circuit structure of the power conversion device in this implementation that the first filter inductor not only can implement functions of an input filter inductor and an output filter inductor of an AC/AC power supply with a single-phase input and a three-phase output in the conventional technology, but also reduces one inductor winding and one inductor magnetic core in comparison with the input filter inductor and the output filter inductor of the AC/AC power supply with the single-phase input and the three-phase output in the conventional technology, thereby reducing circuit costs of the power conversion device.

With reference to the seventh possible implementation of the first aspect, in an eighth possible implementation, the power conversion device further includes a second filter inductor, and the second filter inductor includes a sixth inductor winding, a seventh inductor winding, an eighth inductor winding, a ninth inductor winding, a tenth inductor winding, and a second inductor magnetic core. The sixth inductor winding, the seventh inductor winding, the eighth inductor winding, the ninth inductor winding, and the tenth inductor winding are all wound around the second inductor magnetic core. The first end of the first inductor winding is connected to the first input end of the power conversion device through the sixth inductor winding, the first end of the second inductor winding is connected to the second input end and the second output end of the power conversion device through the seventh inductor winding, and the first end of the third inductor winding is connected to the first output end of the power conversion device through the eighth inductor winding. The first end of the fourth inductor winding is connected to the third output end of the power conversion device through the ninth inductor winding, and the first end of the fifth inductor winding is connected to the fourth output end of the power conversion device through the tenth inductor winding. It may be understood from the circuit structure of the power conversion device in this implementation that the first filter inductor and the second filter inductor reduce two inductor windings and two inductor magnetic cores in comparison with a two-stage filter inductor at the input end and a two-stage filter inductor at the output end of the AC/AC power supply with the single-phase input and the three-phase output in the conventional technology, thereby reducing circuit costs of the power conversion device.

With reference to the seventh possible implementation of the first aspect, in a ninth possible implementation, the power conversion device further includes a second filter inductor, and the second filter inductor includes a sixth inductor winding, a seventh inductor winding, an eighth inductor winding, a ninth inductor winding, a tenth inductor winding, an eleventh inductor winding, and a second inductor magnetic core. The sixth inductor winding, the seventh inductor winding, the eighth inductor winding, the ninth inductor winding, the tenth inductor winding, and the eleventh inductor winding are all wound around the second inductor magnetic core. The first end of the first inductor winding is connected to the first input end of the power conversion device through the sixth inductor winding, the first end of the second inductor winding is connected to the second input end of the power conversion device through the seventh inductor winding, and the first end of the second inductor winding is connected to the second output end of the power conversion device through the eighth inductor winding. The first end of the third inductor winding is connected to the first output end of the power conversion device through the ninth inductor winding, the first end of the fourth inductor winding is connected to the third output end of the power conversion device through the tenth inductor winding, and the first end of the fifth inductor winding is connected to the fourth output end of the power conversion device through the eleventh inductor winding. It may be understood from the circuit structure of the power conversion device in this implementation that the first filter inductor and the second filter inductor reduce one inductor winding and two inductor magnetic cores in comparison with a two-stage filter inductor at the input end and a two-stage filter inductor at the output end of the AC/AC power supply with the single-phase input and the three-phase output in the conventional technology, thereby reducing circuit costs of the power conversion device. In addition, in addition to a circuit structure in which the filter inductor at the input end and the filter inductor at the output end share one inductor winding and one inductor magnetic core, the second filter inductor may also use a circuit structure in which the filter inductor at the input end and the filter inductor at the output end share one inductor magnetic core. The second filter inductor has various structures, so that the power conversion device has various structures and high flexibility.

With reference to any one of the seventh possible implementation of the first aspect to the ninth possible implementation of the first aspect, in a tenth possible implementation, the input end of the AC/AC circuit includes a first input end and a common end, and the output end of the AC/AC circuit includes a first output end, a second output end, a third output end, and the common end. The second end of the first inductor winding is connected to the first input end of the AC/AC circuit, and the second end of the second inductor winding is connected to the common end of the AC/AC circuit. The second end of the third inductor winding is connected to the first output end of the AC/AC circuit, the second end of the fourth inductor winding is connected to the second output end of the AC/AC circuit, and the second end of the fifth inductor winding is connected to the third output end of the AC/AC circuit. It may be understood that the AC/AC circuit in this implementation may be any AC/AC circuit with a single-phase input and a three-phase output and is applicable to a power conversion device with a single-phase input and a three-phase output.

With reference to the tenth possible implementation of the first aspect, in an eleventh possible implementation, the AC/AC circuit includes a first phase bridge arm, a second phase bridge arm, a third phase bridge arm, a fourth phase bridge arm, a first bus capacitor, a second bus capacitor, a first inductor, a second inductor, a third inductor, and a fourth inductor. The first phase bridge arm, the second phase bridge arm, the third phase bridge arm, and the fourth phase bridge arm are connected in parallel to each other. The first bus capacitor and the second bus capacitor are connected in series and then connected in parallel to two ends of the first phase bridge arm, and a connection part of the first bus capacitor and the second bus capacitor is connected to the common end. A midpoint of the first phase bridge arm is connected to the first input end of the AC/AC circuit through the first inductor, a midpoint of the second phase bridge arm is connected to the first output end of the AC/AC circuit through the second inductor, a midpoint of the third phase bridge arm is connected to the second output end of the AC/AC circuit through the third inductor, and a midpoint of the fourth phase bridge arm is connected to the third output end of the AC/AC circuit through the fourth inductor.

With reference to the first aspect, in a twelfth possible implementation, the first filter inductor further includes a fourth inductor winding and a fifth inductor winding, and the alternating current input end of the power conversion device further includes a third input end and a fourth input end. The fourth inductor winding and the fifth inductor winding are both wound around the first inductor magnetic core. A first end of the fourth inductor winding is connected to the third input end of the power conversion device, a first end of the fifth inductor winding is connected to the fourth input end of the power conversion device, and a second end of the fourth inductor winding and a second end of the fifth inductor winding are separately connected to the input end of the AC/AC circuit. It may be understood from a circuit structure of the power conversion device in this implementation that the first filter inductor not only can implement functions of an input filter inductor and an output filter inductor of an AC/AC power supply with a three-phase input and a single-phase output in the conventional technology, but also reduces one inductor winding and one inductor magnetic core in comparison with the input filter inductor and the output filter inductor of the AC/AC power supply with the three-phase input and the single-phase output in the conventional technology, thereby reducing circuit costs of the power conversion device.

With reference to the twelfth possible implementation of the first aspect, in a thirteenth possible implementation, the power conversion device further includes a second filter inductor, and the second filter inductor includes a sixth inductor winding, a seventh inductor winding, an eighth inductor winding, a ninth inductor winding, a tenth inductor winding, and a second inductor magnetic core. The sixth inductor winding, the seventh inductor winding, the eighth inductor winding, the ninth inductor winding, and the tenth inductor winding are all wound around the second inductor magnetic core. The first end of the first inductor winding is connected to the first input end of the power conversion device through the sixth inductor winding, the first end of the second inductor winding is connected to the second input end and the second output end of the power conversion device through the seventh inductor winding, and the first end of the third inductor winding is connected to the first output end of the power conversion device through the eighth inductor winding. The first end of the fourth inductor winding is connected to the third input end of the power conversion device through the ninth inductor winding, and the first end of the fifth inductor winding is connected to the fourth input end of the power conversion device through the tenth inductor winding. It may be understood from the circuit structure of the power conversion device in this implementation that the first filter inductor and the second filter inductor reduce two inductor windings and two inductor magnetic cores in comparison with a two-stage filter inductor at the input end and a two-stage filter inductor at the output end of the AC/AC power supply with the three-phase input and the single-phase output in the conventional technology, thereby reducing circuit costs of the power conversion device.

With reference to the twelfth possible implementation of the first aspect, in a fourteenth possible implementation, the power conversion device further includes a second filter inductor, and the second filter inductor includes a sixth inductor winding, a seventh inductor winding, an eighth inductor winding, a ninth inductor winding, a tenth inductor winding, an eleventh inductor winding, and a second inductor magnetic core. The sixth inductor winding, the seventh inductor winding, the eighth inductor winding, the ninth inductor winding, and the tenth inductor winding are all wound around the second inductor magnetic core. The first end of the first inductor winding is connected to the first input end of the power conversion device through the sixth inductor winding, the first end of the second inductor winding is connected to the second input end of the power conversion device through the seventh inductor winding, the first end of the second inductor winding is connected to the second output end of the power conversion device through the eighth inductor winding, and the first end of the third inductor winding is connected to the first output end of the power conversion device through the ninth inductor winding. The first end of the fourth inductor winding is connected to the third input end of the power conversion device through the tenth inductor winding, and the first end of the fifth inductor winding is connected to the fourth input end of the power conversion device through the eleventh inductor winding. It may be understood from the circuit structure of the power conversion device in this implementation that the first filter inductor and the second filter inductor reduce one inductor winding and two inductor magnetic cores in comparison with a two-stage filter inductor at the input end and a two-stage filter inductor at the output end of the AC/AC power supply with the three-phase input and the single-phase output in the conventional technology, thereby reducing circuit costs of the power conversion device. In addition, in addition to a circuit structure in which the filter inductor at the input end and the filter inductor at the output end share one inductor winding and one inductor magnetic core, the second filter inductor may also use a circuit structure in which the filter inductor at the input end and the filter inductor at the output end share one inductor magnetic core. The second filter inductor has various structures, so that the power conversion device has various structures and high flexibility.

With reference to any one of the twelfth possible implementation of the first aspect to the fourteenth possible implementation of the first aspect, in a fifteenth possible implementation, the input end of the AC/AC circuit includes a first input end, a second input end, a third input end, and a common end, and the output end of the AC/AC circuit includes a first output end and the common end. The second end of the first inductor winding is connected to the first input end of the AC/AC circuit, the second end of the fourth inductor winding is connected to the second input end of the AC/AC circuit, and the second end of the fifth inductor winding is connected to the third input end of the AC/AC circuit. The second end of the second inductor winding is connected to the common end of the AC/AC circuit, and the second end of the third inductor winding is connected to the first output end of the AC/AC circuit. It may be understood that the AC/AC circuit in this implementation may be any AC/AC circuit with a three-phase input and a single-phase output and is applicable to a power conversion device with a three-phase input and a single-phase output.

With reference to the fifteenth possible implementation of the first aspect, in a sixteenth possible implementation, the AC/AC circuit includes a first phase bridge arm, a second phase bridge arm, a third phase bridge arm, a fourth phase bridge arm, a first bus capacitor, a second bus capacitor, a first inductor, a second inductor, a third inductor, and a fourth inductor. The first phase bridge arm, the second phase bridge arm, the third phase bridge arm, and the fourth phase bridge arm are connected in parallel to each other. The first bus capacitor and the second bus capacitor are connected in series and then connected in parallel to two ends of the first phase bridge arm, and a serial connection part of the first bus capacitor and the second bus capacitor is connected to the common end. A midpoint of the first phase bridge arm is connected to the first input end of the AC/AC circuit through the first inductor, a midpoint of the second phase bridge arm is connected to the second input end of the AC/AC circuit through the second inductor, a midpoint of the third phase bridge arm is connected to the third input end of the AC/AC circuit through the third inductor, and a midpoint of the fourth phase bridge arm is connected to the first output end of the AC/AC circuit through the fourth inductor.

With reference to the first aspect, in a seventeenth possible implementation, the first filter inductor further includes a fourth inductor winding, a fifth inductor winding, a sixth inductor winding, and a seventh inductor winding, the alternating current input end of the power conversion device further includes a third input end and a fourth input end, and the alternating current output end of the power conversion device further includes a third output end and a fourth output end. The fourth inductor winding, the fifth inductor winding, the sixth inductor winding, and the seventh inductor winding are all wound around the first inductor magnetic core. A first end of the fourth inductor winding is connected to the third output end of the power conversion device, a first end of the fifth inductor winding is connected to the fourth output end of the power conversion device, and a second end of the fourth inductor winding and a second end of the fifth inductor winding are separately connected to the output end of the AC/AC circuit. A first end of the sixth inductor winding is connected to the third input end of the power conversion device, a first end of the seventh inductor winding is connected to the fourth input end of the power conversion device, and a second end of the sixth inductor winding and a second end of the seventh inductor winding are separately connected to the input end of the AC/AC circuit. It may be understood from a circuit structure of the power conversion device in this implementation that the first filter inductor not only can implement functions of an input filter inductor and an output filter inductor of an AC/AC power supply with a three-phase input and a three-phase output in the conventional technology, but also reduces one inductor winding and one inductor magnetic core in comparison with the input filter inductor and the output filter inductor of the AC/AC power supply with the three-phase input and the three-phase output in the conventional technology, thereby reducing circuit costs of the power conversion device.

With reference to the seventeenth possible implementation of the first aspect, in an eighteenth possible implementation, the power conversion device further includes a second filter inductor, and the second filter inductor includes an eighth inductor winding, a ninth inductor winding, a tenth inductor winding, an eleventh inductor winding, a twelfth inductor winding, a thirteenth inductor winding, a fourteenth inductor winding, and a second inductor magnetic core. The eighth inductor winding, the ninth inductor winding, the tenth inductor winding, the eleventh inductor winding, the twelfth inductor winding, the thirteenth inductor winding, and the fourteenth inductor winding are all wound around the second inductor magnetic core. The first end of the first inductor winding is connected to the first input end of the power conversion device through the eighth inductor winding, the first end of the second inductor winding is connected to the second input end and the second output end of the power conversion device through the ninth inductor winding, and the first end of the third inductor winding is connected to the first output end of the power conversion device through the tenth inductor winding. The first end of the fourth inductor winding is connected to the third output end of the power conversion device through the eleventh inductor winding, and the first end of the fifth inductor winding is connected to the fourth output end of the power conversion device through the twelfth inductor winding. The first end of the sixth inductor winding is connected to the third input end of the power conversion device through the thirteenth inductor winding, and the first end of the seventh inductor winding is connected to the fourth input end of the power conversion device through the fourteenth inductor winding. It may be understood from the circuit structure of the power conversion device in this implementation that the first filter inductor and the second filter inductor reduce two inductor windings and two inductor magnetic cores in comparison with a two-stage filter inductor at the input end and a two-stage filter inductor at the output end of the AC/AC power supply with the three-phase input and the three-phase output in the conventional technology, thereby reducing circuit costs of the power conversion device.

With reference to the seventeenth possible implementation of the first aspect, in a nineteenth possible implementation, the power conversion device further includes a second filter inductor, and the second filter inductor includes an eighth inductor winding, a ninth inductor winding, a tenth inductor winding, an eleventh inductor winding, a twelfth inductor winding, a thirteenth inductor winding, a fourteenth inductor winding, a fifteenth inductor winding, and a second inductor magnetic core. The eighth inductor winding, the ninth inductor winding, the tenth inductor winding, the eleventh inductor winding, the twelfth inductor winding, the thirteenth inductor winding, the fourteenth inductor winding, and the fifteenth inductor winding are all wound around the second inductor magnetic core. The first end of the first inductor winding is connected to the first input end of the power conversion device through the eighth inductor winding, the first end of the second inductor winding is connected to the second input end of the power conversion device through the ninth inductor winding, and the first end of the second inductor winding is connected to the second output end of the power conversion device through the tenth inductor winding. The first end of the third inductor winding is connected to the first output end of the power conversion device through the eleventh inductor winding, the first end of the fourth inductor winding is connected to the third output end of the power conversion device through the twelfth inductor winding, and the first end of the fifth inductor winding is connected to the fourth output end of the power conversion device through the thirteenth inductor winding. The first end of the sixth inductor winding is connected to the third input end of the power conversion device through the fourteenth inductor winding, and the first end of the seventh inductor winding is connected to the fourth input end of the power conversion device through the fifteenth inductor winding. It may be understood from the circuit structure of the power conversion device in this implementation that the first filter inductor and the second filter inductor reduce one inductor winding and two inductor magnetic cores in comparison with a two-stage filter inductor at the input end and a two-stage filter inductor at the output end of the AC/AC power supply with the three-phase input and the three-phase output in the conventional technology, thereby reducing circuit costs of the power conversion device. In addition, in addition to a circuit structure in which the filter inductor at the input end and the filter inductor at the output end share one inductor winding and one inductor magnetic core, the second filter inductor may also use a circuit structure in which the filter inductor at the input end and the filter inductor at the output end share one inductor magnetic core. The second filter inductor has various structures, so that the power conversion device has various structures and high flexibility.

With reference to any one of the seventeenth possible implementation of the first aspect to the nineteenth possible implementation of the first aspect, in a twentieth possible implementation, the input end of the AC/AC circuit includes a first input end, a second input end, a third input end, and a common end, and the output end of the AC/AC circuit includes a first output end, a second output end, a third output end, and the common end. The second end of the first inductor winding is connected to the first input end of the AC/AC circuit, the second end of the sixth inductor winding is connected to the second input end of the AC/AC circuit, the second end of the seventh inductor winding is connected to the third input end of the AC/AC circuit, and the second end of the second inductor winding is connected to the common end of the AC/AC circuit. The second end of the third inductor winding is connected to the first output end of the AC/AC circuit, the second end of the fourth inductor winding is connected to the second output end of the AC/AC circuit, and the second end of the fifth inductor winding is connected to the third output end of the AC/AC circuit. It may be understood that the AC/AC circuit in this implementation may be any AC/AC circuit with a three-phase input and a three-phase output and is applicable to a power conversion device with a three-phase input and a three-phase output.

With reference to the twentieth possible implementation of the first aspect, in a twenty-first possible implementation, the AC/AC circuit includes a first phase bridge arm, a second phase bridge arm, a third phase bridge arm, a fourth phase bridge arm, a fifth phase bridge arm, a sixth phase bridge arm, a first bus capacitor, a second bus capacitor, a first inductor, a second inductor, a third inductor, a fourth inductor, a fifth inductor, and a sixth inductor. The first phase bridge arm, the second phase bridge arm, the third phase bridge arm, the fourth phase bridge arm, the fifth phase bridge arm, and the sixth phase bridge arm are connected in parallel to each other. The first bus capacitor and the second bus capacitor are connected in series and then connected in parallel to two ends of the first phase bridge arm, and a serial connection part of the first bus capacitor and the second bus capacitor is connected to the common end. A midpoint of the first phase bridge arm is connected to the first input end of the AC/AC circuit through the first inductor, a midpoint of the second phase bridge arm is connected to the second input end of the AC/AC circuit through the second inductor, a midpoint of the third phase bridge arm is connected to the third input end of the AC/AC circuit through the third inductor, a midpoint of the fourth phase bridge arm is connected to the first output end of the AC/AC circuit through the fourth inductor, a midpoint of the fifth phase bridge arm is connected to the second output end of the AC/AC circuit through the fifth inductor, and a midpoint of the sixth phase bridge arm is connected to the third output end of the AC/AC circuit through the sixth inductor.

With reference to any one of the first aspect to the sixteenth possible implementation of the first aspect, in a twenty-second possible implementation, the power conversion device further includes a first filter capacitor, and the first filter capacitor is connected between the first input end and the first output end of the power conversion device, or is connected between the second end of the first inductor winding and the second end of the third inductor winding. It may be understood that the first filter capacitor is bridged between a connection line in which an input end of the power conversion device is located and a connection line in which an output end of the power conversion device is located and has various locations and high flexibility.

With reference to the second possible implementation of the first aspect, the third possible implementation of the first aspect, the ninth possible implementation of the first aspect, or the fourteenth possible implementation of the first aspect, in a twenty-third possible implementation, the power conversion device further includes a first filter capacitor, and the first filter capacitor is connected between the second input end and the second output end of the power conversion device.

With reference to any one of the seventeenth possible implementation of the first aspect to the twenty-first possible implementation of the first aspect, in a twenty-fourth possible implementation, the power conversion device further includes a first filter capacitor, and the first filter capacitor is connected between the first input end and the first output end of the power conversion device, is connected between the third input end and the third output end of the power conversion device, is connected between the fourth input end and the fourth output end of the power conversion device, is connected between the second end of the first inductor winding and the second end of the third inductor winding, is connected between the second end of the sixth inductor winding and the second end of the fourth inductor winding, or is connected between the second end of the seventh inductor winding and the second end of the fifth inductor winding.

With reference to the nineteenth possible implementation of the first aspect, in a twenty-fifth possible implementation, the power conversion device further includes a first filter capacitor, and the first filter capacitor is connected between the second input end and the second output end of the power conversion device.

With reference to any one of the first aspect to the twenty-fifth possible implementation of the first aspect, in a twenty-sixth possible implementation, the power conversion device is an uninterruptible power supply.

With reference to any one of the first aspect to the twenty-fifth possible implementation of the first aspect, in a twenty-seventh possible implementation, the power conversion device is an inverter, the input end of the AC/AC circuit is an input/output bidirectional end of the AC/AC circuit, the inverter further includes a first direct current input end and a DC/DC circuit, and the AC/AC circuit includes an AC/DC circuit and a DC/AC circuit. The first direct current input end of the inverter is configured to connect to a photovoltaic string. An alternating current end of the AC/DC circuit is used as the input/output bidirectional end of the AC/AC circuit, and a direct current end of the AC/DC circuit is connected to a direct current input end of the DC/AC circuit and a direct current output end of the DC/DC circuit. An alternating current output end of the DC/AC circuit is used as the output end of the AC/AC circuit, and a direct current input end of the DC/DC circuit is connected to the first direct current input end of the inverter. It may be understood that, in addition to the uninterruptible power supply, the power conversion device may be the inverter, so that the power conversion device has various product forms and high flexibility.

DETAILED DESCRIPTION OF EMBODIMENTS

A power conversion device is applicable to a plurality of application fields such as a new energy smart microgrid field, a power transmission and distribution field, a new energy field (for example, a photovoltaic grid-connected field or a wind power grid-connected field), a photovoltaic power generation field, an energy storage and power generation field, and a wind power generation field. The power conversion device may be an AC/AC power supply such as a UPS, an inverter, a frequency converter, or a constant-frequency power supply, and is applicable to different application scenarios, for example, a photovoltaic power supply scenario (including a large-scale photovoltaic station scenario, a small- and medium-scale distributed photovoltaic station scenario, and a residential photovoltaic system scenario), an energy storage power supply scenario (including a large-scale energy storage plant scenario, a small- and medium-scale distributed energy storage plant scenario, and a residential photovoltaic energy storage power generation system scenario), and a UPS power supply scenario. The following provides descriptions by using the UPS power supply scenario as an example.

Figure 2:
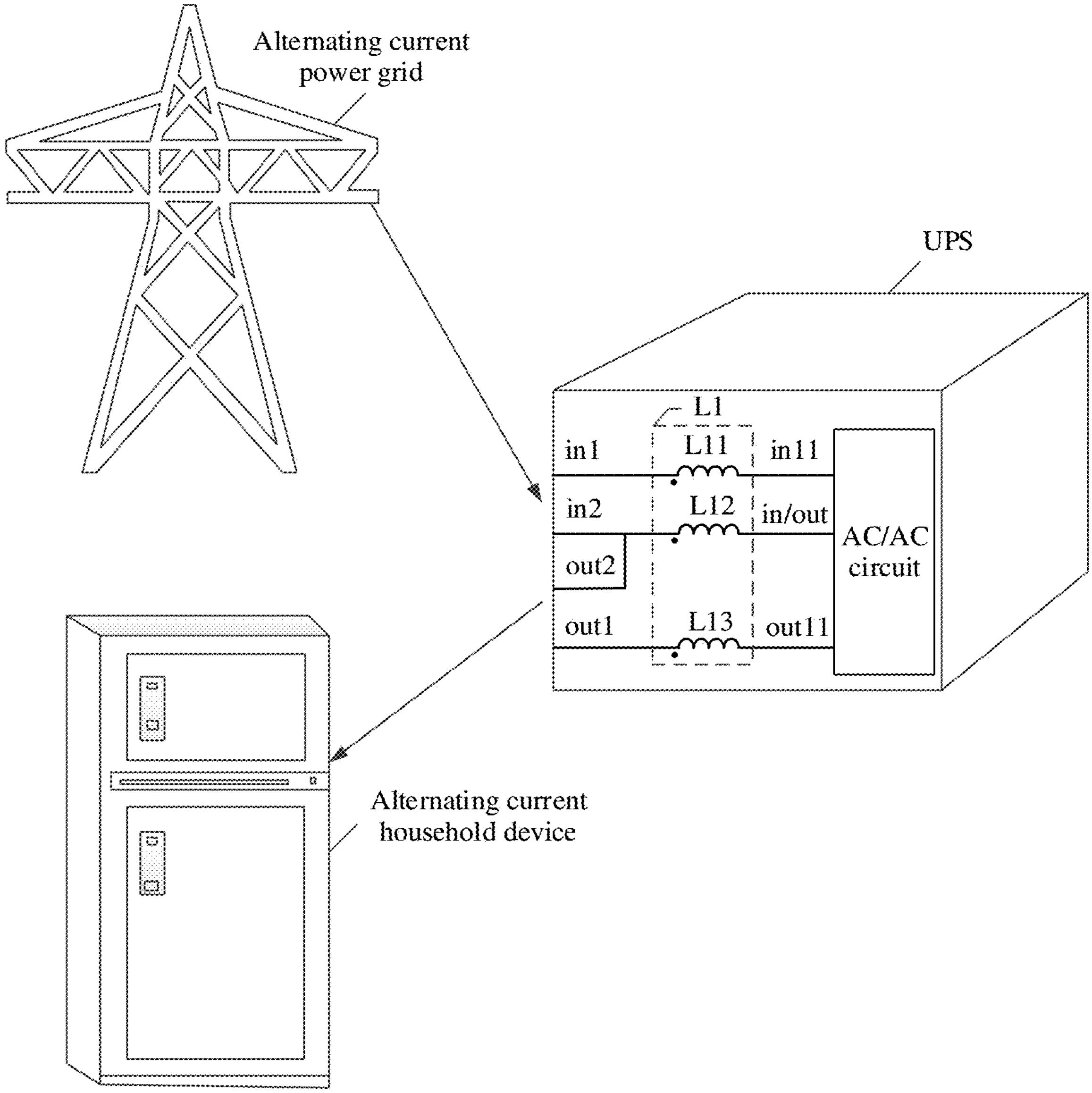
FIG. 2 is a schematic diagram of an application scenario of a power conversion device.

FIG. 2 is a schematic diagram of an application scenario of a power conversion device. In a UPS power supply scenario, the power conversion device may be a UPS shown in FIG. 2. An alternating current input end of the UPS is connected to an alternating current power grid, and an alternating current output end of the UPS is connected to an alternating current household device. The UPS includes a first filter inductor L1 and an AC/AC circuit. The first filter inductor L1 includes a first inductor winding L11, a second inductor winding L12, a third inductor winding L13, and a first inductor magnetic core (not shown in the figure). The alternating current input end of the UPS includes a first input end in1 and a second input end in2, and an output end of the UPS includes a first output end out1 and a second output end out2. The first inductor winding L11, the second inductor winding L12, and the third inductor winding L13 are all wound around the first inductor magnetic core. A first end of the first inductor winding L11 and a first end of the second inductor winding L12 are respectively connected to the first input end in1 and the second input end in2 of the UPS, and a second end of the first inductor winding L11 and a second end of the second inductor winding L12 are respectively connected to input ends in11 and in/out of the AC/AC circuit. The first end of the second inductor winding L12 and a first end of the third inductor winding L13 are respectively connected to the second output end out2 and the first output end out1 of the UPS, and the second end of the second inductor winding L12 and a second end of the third inductor winding L13 are respectively connected to the output ends in/out and out11 of the AC/AC circuit.

Optionally, the UPS may further include an energy storage unit (for example, a battery). When the alternating current power grid no longer outputs an alternating current, the UPS may invert, through a DC/AC circuit in the AC/AC circuit, a direct current output by the energy storage unit into an alternating current, to implement uninterruptible power supplying for an alternating current load.

Optionally, the UPS may further include a bypass switch. The bypass switch may be located between the first input end in1 and the first output end out1 of the UPS or located between the first input end in11 and the first output end out11 of the AC/AC circuit. The bypass switch may be a controllable switch such as a relay or a silicon controlled thyristor SCR. When the AC/AC circuit in the UPS is faulty, the UPS may control the bypass switch to be turned on, so that the alternating current input by the alternating current power grid is directly output to the alternating current load through the bypass switch, to implement power supplying for the alternating current load. This not only can improve stability of the UPS during working, but also can improve working efficiency of the UPS.

After the UPS starts to operate, the first inductor winding L11 and the second inductor winding L12 in the first filter inductor L1 filter the alternating current input by the alternating current power grid, so that electromagnetic interference of the alternating current input by the alternating current power grid is lower than a required limit, and the alternating current whose electromagnetic interference is lower than the required limit is output to the input end of the AC/AC circuit. The AC/AC circuit first rectifies the alternating current input from the input end of the AC/AC circuit, then inverts the alternating current into an alternating current that meets an operating voltage of the alternating current load (for example, the alternating current household device), and outputs the alternating current to the second inductor winding L12 and the third inductor winding L13. The second inductor winding L12 and the third inductor winding L13 filter the alternating current output by the AC/AC circuit, so that noise of the alternating current output to the alternating current load meets a requirement of normal operation of the alternating current load, to implement power supplying for the alternating current load.

It may be understood from a circuit structure of the UPS that the second inductor winding L12 may be used as an input inductor winding or may be used as an output inductor winding. In other words, the second inductor winding L12 is a filter inductor winding shared by an input filter inductor and an output filter inductor of the UPS. In addition, because the first filter inductor includes only the first inductor magnetic core, the first filter inductor L1 not only can implement functions of an input filter inductor Lin and an output filter inductor Lout of an AC/AC power supply with a single-phase input and a single-phase output in the conventional technology, but also reduces one inductor winding and one inductor magnetic core in comparison with the input filter inductor Lin and the output filter inductor Lout of the AC/AC power supply with the single-phase input and the single-phase output in the conventional technology, thereby reducing a volume of the UPS, and reducing circuit costs of the UPS. The foregoing is merely an example of the application scenario of the power conversion device, but is not exhaustive. The application scenario is not limited.

The following describes, with reference to FIG. 3*a* to FIG. 8, a working principle of a power conversion device by using an example in which an alternating current input end of the power conversion device is connected to an alternating current power grid and an alternating current output end of the power conversion device is connected to an alternating current load.

Figure 3A:
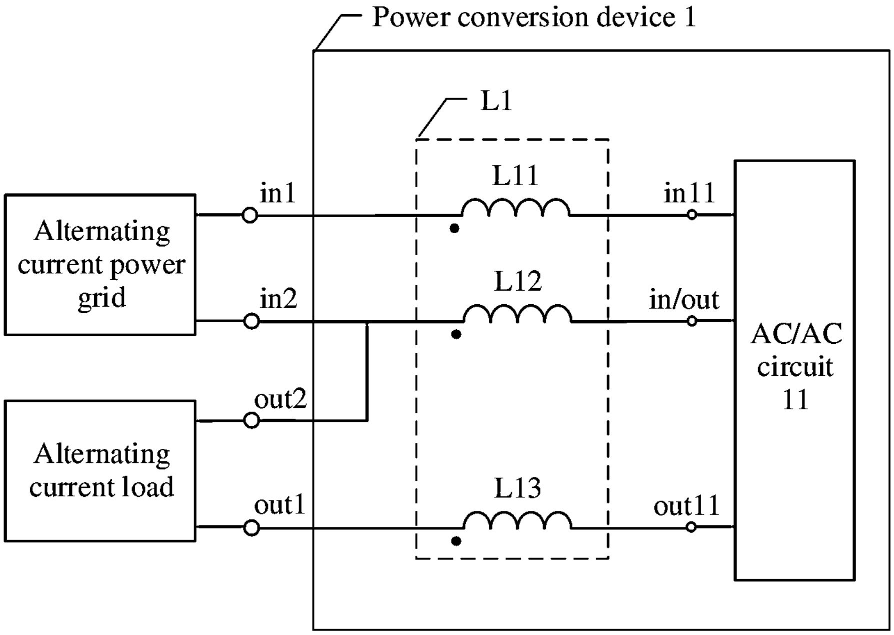
FIG. 3*a* is a schematic diagram of a structure of a power conversion device.

FIG. 3*a* is a schematic diagram of a structure of a power conversion device. As shown in FIG. 3*a*, an alternating current input end of the power conversion device 1 is configured to connect to an alternating current power grid, and an alternating current output end of the power conversion device is configured to connect to an alternating current load. The alternating current input end of the power conversion device 1 includes a first input end in1 and a second input end in2, and the alternating current output end of the power conversion device 1 includes a first output end out1 and a second output end out2. The first input end in1 and the second input end in2 of the power conversion device 1 are connected to the alternating current power grid, and the first output end out1 and the second output end out2 of the power conversion device are connected to the alternating current load. The power conversion device 1 includes a first filter inductor L1 and an AC/AC circuit 11. The first filter inductor L1 includes a first inductor winding L11, a second inductor winding L12, a third inductor winding L13, and a first inductor magnetic core.

The first inductor winding L11, the second inductor winding L12, and the third inductor winding L13 are all wound around the first inductor magnetic core. A first end of the first inductor winding and a first end of the second inductor winding are respectively connected to the first input end in1 and the second input end in2 of the power conversion device 1, and a second end of the first inductor winding L11 and a second end of the second inductor winding L12 are separately connected to an input end of the AC/AC circuit 11. The input end of the AC/AC circuit 11 includes a first input end in11 and a common end in/out, and the second end of the first inductor winding L11 and the second end of the second inductor winding L12 are respectively connected to the first input end in11 and the common end in/out of the AC/AC circuit 11.

A first end of the second inductor winding L12 and a first end of the third inductor winding L13 are respectively connected to the second output end out2 and the first output end out1 of the power conversion device 1, and the second end of the second inductor winding L12 and a second end of the third inductor winding L13 are separately connected to an output end of the AC/AC circuit 11. The output end of the AC/AC circuit 11 includes a first output end out11 and the common end in/out. The second end of the second inductor winding L12 and the second end of the third inductor winding L13 are respectively connected to the common end in/out and the first output end out11 of the AC/AC circuit 11.

It may be understood, from an energy flow direction and a circuit structure of the power conversion device 1 shown in FIG. 3*a*, that after an alternating current of the alternating current power grid is input to the power conversion device 1, the first inductor winding L11 and the second inductor winding L12 may filter the alternating current input by the alternating current power grid, to reduce electromagnetic interference of the alternating current input by the alternating current power grid. Then, an alternating current output by the AC/AC circuit 11 is filtered by the second inductor winding L12 and the third inductor winding L13, to obtain an alternating current that meets a noise requirement for normal operation of the alternating current load. It is clear that the first filter inductor L1 can implement functions of an input filter inductor Lin and an output filter inductor Lout of an AC/AC power supply with a single-phase input and a single-phase output in the conventional technology.

In this embodiment, the first filter inductor L1 not only can implement the functions of the input filter inductor Lin and the output filter inductor Lout of the AC/AC power supply with the single-phase input and the single-phase output in the conventional technology, but also reduces one inductor winding and one inductor magnetic core in comparison with the input filter inductor Lin and the output filter inductor Lout of the AC/AC power supply with the single-phase input and the single-phase output in the conventional technology, thereby reducing a volume of the power conversion device 1, and reducing circuit costs of the power conversion device 1.

Figure 3B:
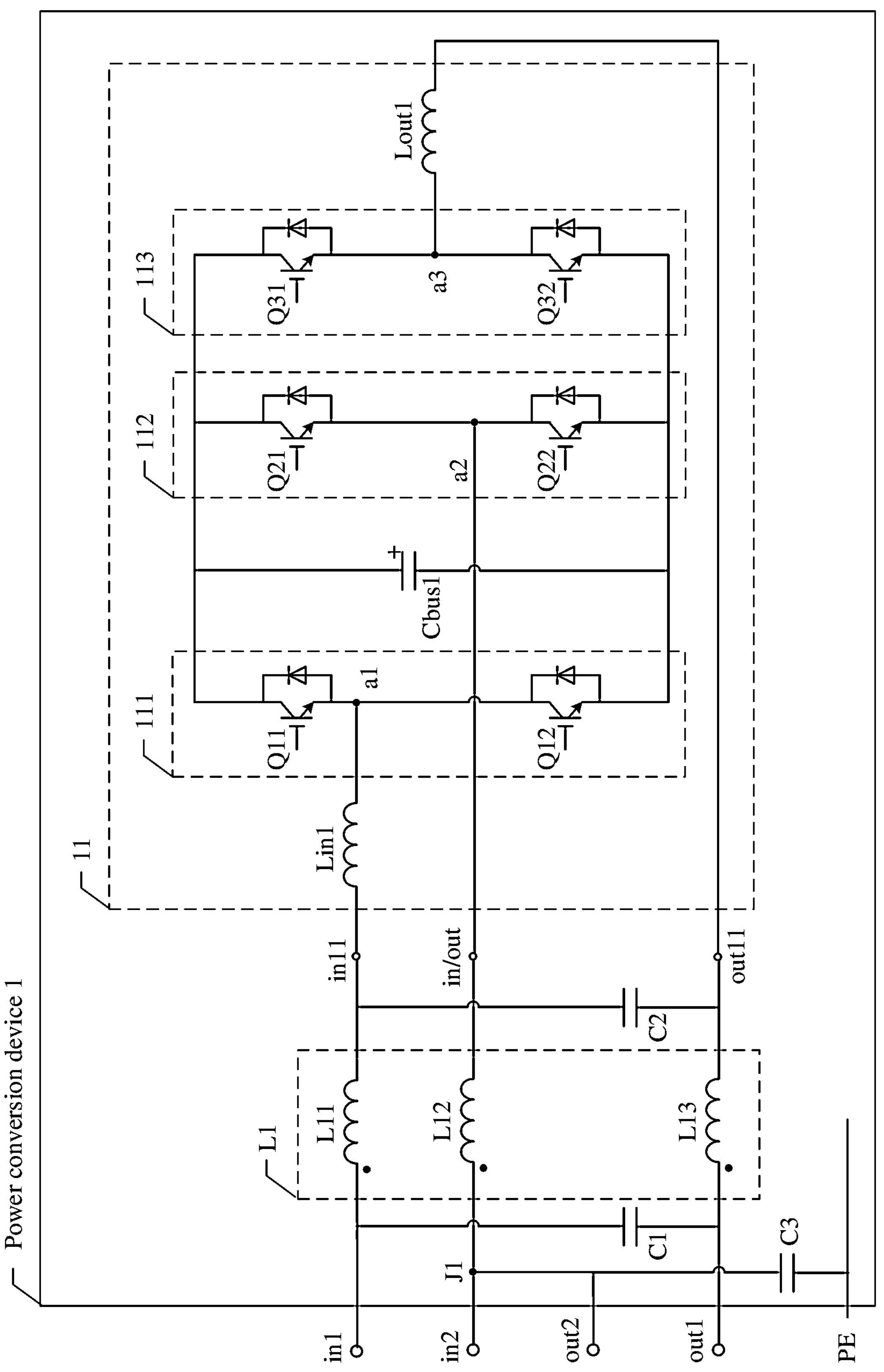
FIG. 3*b* is a schematic diagram of another structure of a power conversion device.

FIG. 3*b* is a schematic diagram of a structure of a power conversion device. As shown in FIG. 3*b*, the power conversion device 1 includes a first filter inductor L1, a first filter capacitor C1, and an AC/AC circuit 11. The AC/AC circuit 11 includes a first phase bridge arm 111, a second phase bridge arm 112, a third phase bridge arm 113, a first bus capacitor Cbus1, a first inductor Lin1, and a second inductor Lout1. The first phase bridge arm 111, the second phase bridge arm 112, the third phase bridge arm 113, and the first bus capacitor Cbus1 are connected in parallel to each other. A switching transistor Q11 and a switching transistor Q12 are connected in series to form the first phase bridge arm 111, a switching transistor Q21 and a switching transistor Q22 are connected in series to form the second phase bridge arm 112, and a switching transistor Q31 and a switching transistor Q32 are connected in series to form the third phase bridge arm 113. A midpoint a1 of the first phase bridge arm 111, such as a serial connection part of the switching transistor Q11 and the switching transistor Q12, is connected to a first input end in11 of the AC/AC circuit 11 through the first inductor Lin1. A midpoint a2 of the second phase bridge arm 112, such as a serial connection part of the switching transistor Q21 and the switching transistor Q22, is connected to a common end in/out of the AC/AC circuit 11. A midpoint a3 of the third phase bridge arm 113, such as a serial connection part of the switching transistor Q31 and the switching transistor Q32, is connected to a first output end out11 of the AC/AC circuit 11. A type of each switching transistor in the three phase bridge arms may be a diode, a metal oxide semiconductor field effect transistor (MOSFET), an insulated gate bipolar transistor (IGBT), a gallium nitride (GaN) transistor, or the like. This is not limited. In addition, a first input end in1 of the power conversion device 1 is connected to any one of three phase alternating current ends of an alternating current power grid, and a second input end in2 of the power conversion device 1 is connected to a neutral end of the alternating current power grid.

The first filter capacitor C1 is connected between the first input end in1 and a first output end out1 of the power conversion device 1. When a capacitance of the first filter capacitor C1 is equal to a sum of capacitances of an input filter capacitor Cin and an output filter capacitor Cout in the conventional technology, the first filter capacitor C1 may replace the input filter capacitor Cin and the output filter capacitor Cout in the conventional technology, so that locations of filter capacitors in the power conversion device 1 are more centralized, and a miniaturization of the power conversion device 1 is facilitated. Optionally, the first filter capacitor C1 may be alternatively located between an undotted terminal of a first inductor winding L11 and an undotted terminal of a third inductor winding L13, and the first filter capacitor C1 in the power conversion device 1 has various locations, so that the power conversion device 1 has various structures and high flexibility.

To better achieve filtering effect on an input current and an output current of the power conversion device 1, the power conversion device 1 may further appropriately add a filter capacitor. For example, the power conversion device 1 further includes a second filter capacitor C2 and a third filter capacitor C3. The second filter capacitor C2 is located between the undotted terminal of the first inductor winding L11 and the undotted terminal of the third inductor winding L13, and the third filter capacitor C3 is located between a second output end out of the power conversion device 1 and a ground cable PE. Optionally, the power conversion device 1 may further add at least one of the following filter capacitors: a filter capacitor located between the first input end in1 of the power conversion device 1 and the ground cable PE, a filter capacitor located between the first output end out1 of the power conversion device 1 and the ground cable PE, a filter capacitor located between the undotted terminal of the first inductor winding L11 and the ground cable PE, a filter capacitor located between an undotted terminal of a second inductor winding L12 and the ground cable PE, and a filter capacitor located between the undotted terminal of the third inductor winding L13 and the ground cable PE.

After the power conversion device 1 operates, energy of the alternating current power grid is input to the power conversion device 1 from the first input end in1 and the second input end in2 of the power conversion device 1, flows through the first inductor winding L11 and the second inductor winding L12, then flows into the AC/AC circuit 11 from the first input end in11 and the common end in/out of the AC/AC circuit 11, and then is rectified by the first phase bridge arm 111 and the second phase bridge arm 112 in the AC/AC circuit 11. It is clear that the first inductor winding L11 and the second inductor winding L12 may filter an alternating current input by the alternating current power grid, to reduce electromagnetic interference of the alternating current input by the alternating current power grid and interference of the AC/AC circuit 11 to the alternating current power grid. In addition, energy stored on the first bus capacitor Cbus1 after being rectified by the first phase bridge arm 111 and the second phase bridge arm 112 is output from the first output end out11 and the common end in/out of the AC/AC circuit 11 after being inverted by the second phase bridge arm 112 and the third phase bridge arm 113, flows through the third inductor winding L13 and the second inductor winding L12, and then flows into an alternating current load through the first output end out1 and a second output end out2 of the power conversion device 1. It is clear that the second inductor winding L12 and the third inductor winding L13 may filter an alternating current output by the AC/AC circuit 11, to obtain an alternating current that meets a noise requirement for normal operation of the alternating current load. Therefore, it may be understood that the first filter inductor L1 can implement functions of an input filter inductor Lin and an output filter inductor Lout of an AC/AC power supply with a single-phase input and a single-phase output in the conventional technology.

In addition, it is assumed that the input current and the output current of the power conversion device 1 are respectively I1 and I2. It may be understood from an energy flow direction of the power conversion device 1 that a through current of a branch (such as a circuit between a node J1 and the midpoint a2 of the second phase bridge arm 112) on which the second inductor winding L12 is located is |I1-I2|. Similarly, it may be understood, from a current flow direction and a circuit structure of the AC/AC power supply with the single-phase input and the single-phase output in the conventional technology, that in the conventional technology, a through current of a branch (such as a circuit between an input end inN of the AC/AC power supply and the common end in/out of the AC/AC circuit) on which an inductor winding Lin2 is located is I1. It is clear that the through current of the branch on which the second inductor winding L12 is located in the power conversion device 1 is greatly reduced in comparison with the through current of the branch on which the inductor winding Lin2 is located in the conventional technology. Therefore, the second inductor winding L12 in the power conversion device 1 may use a thinner copper wire or cable, and a connection line between the node J1 and the midpoint a2 of the second phase bridge arm 112 may use a thinner cable. This can greatly reduce circuit costs of the power conversion device 1.

In this embodiment, the first filter inductor L1 not only can implement the functions of the input filter inductor Lin and the output filter inductor Lout of the AC/AC power supply with the single-phase input and the single-phase output in the conventional technology, but also reduces one inductor winding and one inductor magnetic core in comparison with the input filter inductor Lin and the output filter inductor Lout of the AC/AC power supply with the single-phase input and the single-phase output in the conventional technology, thereby reducing a volume of the power conversion device 1, and reducing the circuit costs of the power conversion device 1. In addition, the second inductor winding L12 is an inductor winding shared by a filter inductor at the input end and a filter inductor at the output end, and a through current of the shared inductor winding is greatly reduced in comparison with the through current of the corresponding inductor winding Lin2 in the conventional technology. Therefore, this can effectively reduce circuit costs of the second inductor winding L12 and a connection line corresponding to the second inductor winding L12, and further reduce the circuit costs of the power conversion device 1. In addition, a second inductor winding L2 is the shared inductor winding, to connect the second input end in2 and the second output end out2 of the power conversion device 1, so that the third filter capacitor C3 may be equivalent to filter capacitors Cin3 and Cout3 of the AC/AC power supply with the single-phase input and the single-phase output in the conventional technology. Therefore, the power conversion device 1 can reduce one filter capacitor in comparison with the AC/AC power supply with the single-phase input and the single-phase output in the conventional technology, to further reduce the circuit costs of the power conversion device 1.

Figure 3C:
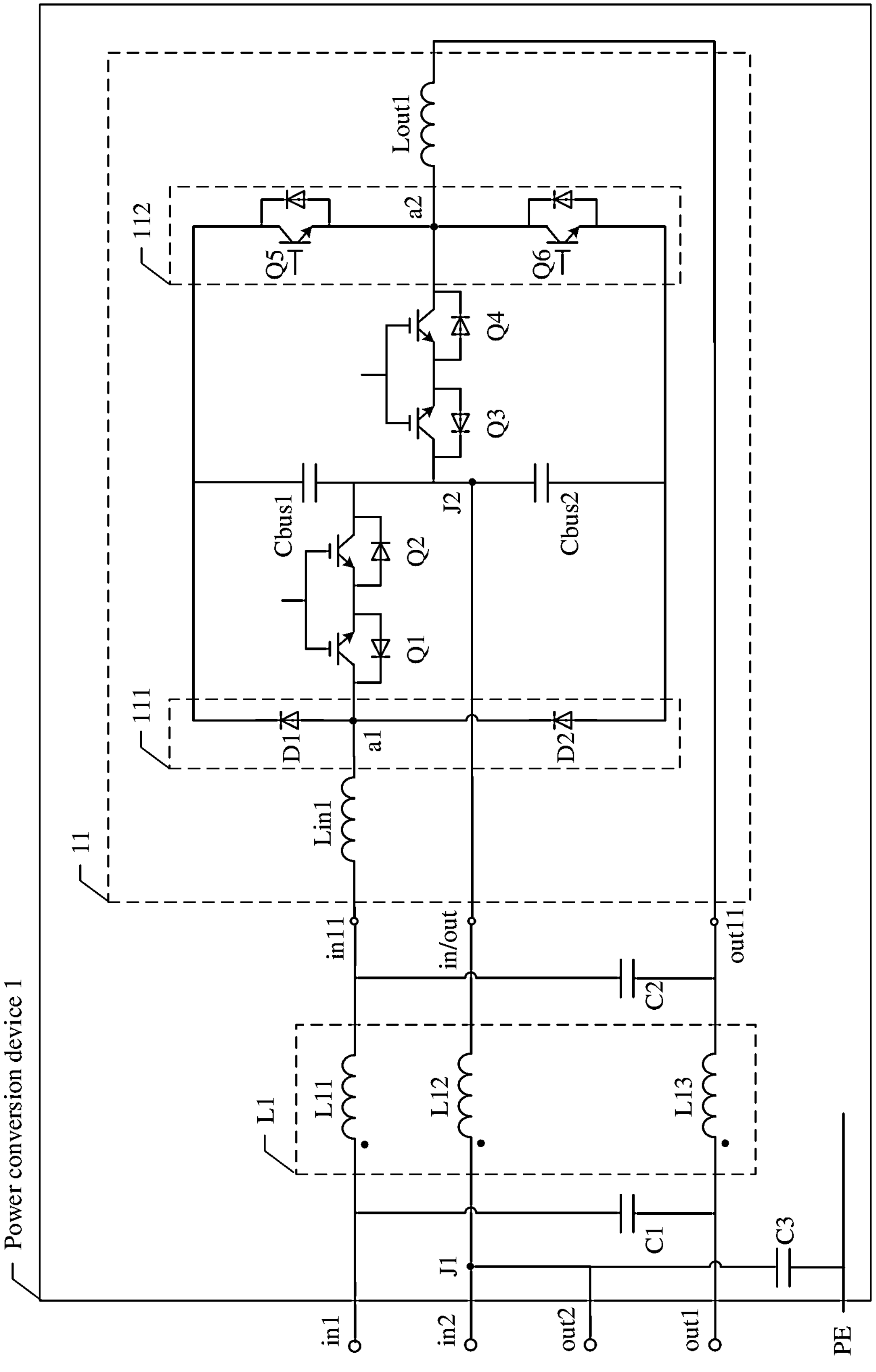
FIG. 3*c* is a schematic diagram of another structure of a power conversion device.

FIG. 3*c* is a schematic diagram of another structure of a power conversion device. Compared with the power conversion device 1 shown in FIG. 3*b*, in the power conversion device 1 shown in FIG. 3*c*, an AC/AC circuit 11 shown in FIG. 3*c* is different from the AC/AC circuit 11 shown in FIG. 3*b*. The AC/AC circuit 11 includes a first phase bridge arm 111, a second phase bridge arm 112, a first bus capacitor Cbus1, a second bus capacitor Cbus2, a first inductor Lin1, a second inductor Lout1, a first switching transistor Q1, a second switching transistor Q2, a third switching transistor Q3, and a fourth switching transistor Q4. A type of the switching transistor in the AC/AC circuit 11 may be a diode, an MOSFET, an IGBT, a GaN transistor, or the like. This is not limited. For example, the following provides descriptions by using an example in which a switching transistor in the first phase bridge arm 111 is a diode, and another switching transistor in the AC/AC circuit 11 except the switching transistor in the first phase bridge arm 111 is an IGBT. The first phase bridge arm 111 and the second phase bridge arm 112 are connected in parallel. A first diode D1 and a second diode D2 are connected in series to form the first phase bridge arm 111. A fifth switching transistor Q5 and a sixth switching transistor Q6 are connected in series to form the second phase bridge arm 112. A cathode of the first diode D1 is connected to a collector of the fifth switching transistor Q5, and an anode of the first diode D1 is connected to a cathode of the second diode D2. An emitter of the fifth switching transistor Q5 is connected to a collector of the sixth switching transistor Q6, and an emitter of the sixth switching transistor Q6 is connected to an anode of the second diode D2. The first bus capacitor Cbus1 and the second bus capacitor Cbus2 are connected in series and then connected in parallel to two ends of the first phase bridge arm 111, such as the cathode of the first diode D1 and the anode of the second diode D2. A serial connection part of the first bus capacitor Cbus1 and the second bus capacitor Cbus2 is connected to a common end in/out of the AC/AC circuit 11. The first switching transistor Q1 and the second switching transistor Q2 are reversely connected in series between the common end in/out of the AC/AC circuit 11 and a midpoint a1 of the first phase bridge arm 111. A collector of the first switching transistor Q1 is connected to the midpoint a1 of the first phase bridge arm 111, an emitter of the first switching transistor Q1 is connected to an emitter of the second switching transistor Q2, and a collector of the second switching transistor Q2 is connected to the common end in/out of the AC/AC circuit 11. The third switching transistor Q3 and the fourth switching transistor Q4 are reversely connected in series between the common end in/out of the AC/AC circuit 11 and a midpoint a2 of the second phase bridge arm 112. A collector of the third switching transistor Q3 is connected to the common end in/out of the AC/AC circuit 11, an emitter of the third switching transistor Q3 is connected to an emitter of the fourth switching transistor Q4, and a collector of the fourth switching transistor Q4 is connected to the midpoint a2 of the second phase bridge arm 112. The midpoint a1 of the first phase bridge arm 111 is connected to a first input end in11 of the AC/AC circuit 11 through the first inductor Lin1, and the midpoint a2 of the second phase bridge arm 112 is connected to a first output end out11 of the AC/AC circuit 11 through the second inductor Lout1.

Herein, for other circuit elements except the AC/AC circuit 11 in the power conversion device 1, connection relationships of the other circuit elements, and an energy flow direction of the power conversion device 1, refer to descriptions of corresponding parts in the power conversion device 1 shown in FIG. 3*b*. Details are not described herein again. It is assumed that an input current and an output current of the power conversion device 1 are respectively I1 and I2. It may be understood from the energy flow direction of the power conversion device 1 that a through current of a branch (such as a circuit between a node J1 and a node J2) on which a second inductor winding L12 is located is |I1-I2|. Similarly, it may be understood, from an energy flow direction and a circuit structure of an AC/AC power supply with a single-phase input and a single-phase output in the conventional technology, that a through current of a branch (such as a circuit between an input end inN of the AC/AC power supply and the common end in/out of the AC/AC circuit) on which an inductor winding Lin2 corresponding to the second inductor winding L12 is located is I1. It is clear that the through current of the branch on which the second inductor winding L12 is located in the power conversion device 1 is greatly reduced in comparison with a through current of a branch on which the inductor winding Lin2 is located in the conventional technology. Therefore, the second inductor winding L12 in the power conversion device 1 may use a thinner copper wire or cable than the inductor winding Lin2, and a connection line between the node J1 and the node J2 may use a thinner cable than a connection line of the branch on which the inductor winding Lin2 is located. This can greatly reduce circuit costs of the power conversion device 1.

In this embodiment, a first filter inductor L1 not only can implement functions of an input filter inductor Lin and an output filter inductor Lout of the AC/AC power supply with the single-phase input and the single-phase output in the conventional technology, but also reduces one inductor winding and one inductor magnetic core in comparison with the input filter inductor Lin and the output filter inductor Lout of the AC/AC power supply with the single-phase input and the single-phase output in the conventional technology, thereby reducing a volume of the power conversion device 1, and reducing the circuit costs of the power conversion device 1. In addition, the second inductor winding L12 is an inductor winding shared by a filter inductor at the input end and a filter inductor at the output end, and a through current of the shared inductor winding is greatly reduced in comparison with the through current of the corresponding inductor winding Lin2 in the conventional technology. Therefore, this can effectively reduce circuit costs of the second inductor winding L12 and a connection line corresponding to the second inductor winding L12, and further reduce the circuit costs of the power conversion device 1. In addition, the second inductor winding L2 is the shared inductor winding, to connect a second input end in2 and a second output end out2 of the power conversion device 1, so that a third filter capacitor C3 may be equivalent to filter capacitors Cin3 and Cout3 in the conventional technology. Therefore, the power conversion device 1 can reduce one filter capacitor in comparison with the AC/AC power supply with the single-phase input and the single-phase output in the conventional technology, to further reduce the circuit costs of the power conversion device 1. Additionally, the AC/AC circuit 11 has various circuit structures, so that the power conversion device 1 has various structures and high flexibility.

It should be noted that A is connected to B may be that A is directly connected to B or A is indirectly connected to B through C. This is not limited.

Figure 4A:
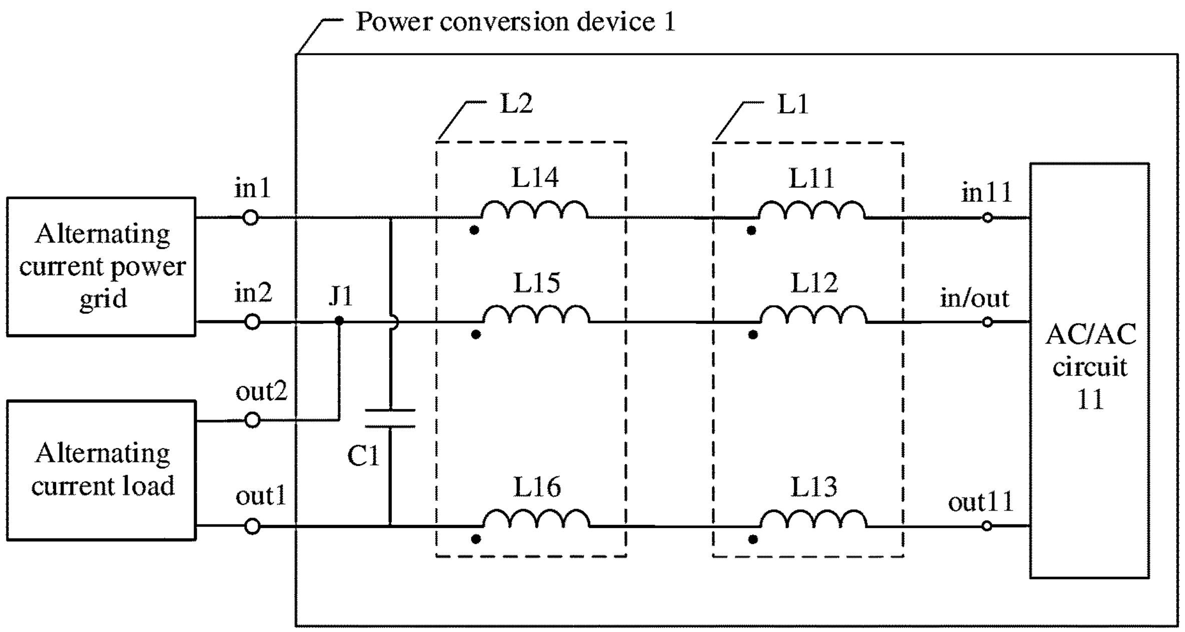
FIG. 4*a* is a schematic diagram of another structure of a power conversion device.

FIG. 4*a* is a schematic diagram of another structure of a power conversion device. Compared with the power conversion device 1 shown in FIG. 3*a*, the power conversion device 1 shown in FIG. 4*a* further includes a second filter inductor L2. As shown in FIG. 4*a*, the second filter inductor L2 includes a fourth inductor winding L14, a fifth inductor winding L15, a sixth inductor winding L16, and a second inductor magnetic core.

The fourth inductor winding L14, the fifth inductor winding L15, and the sixth inductor winding L16 are all wound around the second inductor magnetic core. A first end (such as a dotted terminal) of a first inductor winding L11 is connected to a first input end in1 of the power conversion device 1 through the fourth inductor winding L14. The dotted terminal of the first inductor winding L11 is connected to an undotted terminal of the fourth inductor winding L14, and a dotted terminal of the fourth inductor winding L14 is connected to the first input end in1 of the power conversion device 1. A first end of a second inductor winding L12 is connected to a second input end in2 and a second output end out2 of the power conversion device 1 through the fifth inductor winding L15. A first end of a third inductor winding L13 is connected to a first output end out1 of the power conversion device through the sixth inductor winding L16. A first end of each inductor winding may be a dotted terminal, and correspondingly, a second end of each inductor winding is an undotted terminal. Herein, for a connection relationship between each inductor winding in the first filter inductor L1 and an AC/AC circuit 11, a circuit element included in the AC/AC circuit 11, and a connection relationship of the circuit element, refer to descriptions of corresponding parts in the power conversion devices 1 shown in FIG. 3*b* and FIG. 3*c*. Details are not described herein again.

Optionally, a first filter capacitor C1 may be alternatively located between the undotted terminal of the first inductor winding L11 and an undotted terminal of the third inductor winding L13. It may be understood that when a capacitance of the first filter capacitor C1 is equal to a sum of capacitances of an input filter capacitor Cin2 and an output filter capacitor Cout2 in the conventional technology, the first filter capacitor may replace the input filter capacitor Cin2 and the output filter capacitor Cout2 in the conventional technology, so that locations of filter capacitors in the power conversion device 1 are more centralized, and a miniaturization of the power conversion device 1 is facilitated. Optionally, the first filter capacitor C1 is alternatively located between the dotted terminal of the first inductor winding L11 and a dotted terminal of the third inductor winding L13. It may be understood that the first filter capacitor C1 in the power conversion device 1 has various locations, so that the power conversion device 1 has various structures and high flexibility.

To better achieve filtering effect on an input current and an output current of the power conversion device 1, the power conversion device 1 may further appropriately add a filter capacitor. For example, the power conversion device 1 may further add at least one of the following filter capacitors: a filter capacitor located between the undotted terminal of the first inductor winding L11 and the undotted terminal of the third inductor winding L13, a filter capacitor located between the dotted terminal of the first inductor winding L11 and the dotted terminal of the third inductor winding L13, a filter capacitor located between the first input end in1 of the power conversion device 1 and a ground cable PE, a filter capacitor located between the first output end out1 of the power conversion device 1 and the ground cable PE, a filter capacitor located between the second input end in2 of the power conversion device 1 and the ground cable PE, a filter capacitor located between the undotted terminal of the first inductor winding L11 and the ground cable PE, a filter capacitor located between an undotted terminal of the second inductor winding L12 and the ground cable PE, a filter capacitor located between the undotted terminal of the third inductor winding L13 and the ground cable PE, a filter capacitor located between the dotted terminal of the first inductor winding L11 and the ground cable PE, a filter capacitor located between a dotted terminal of the second inductor winding L12 and the ground cable PE, and a filter capacitor located between the dotted terminal of the third inductor winding L13 and the ground cable PE.

Figure 1:
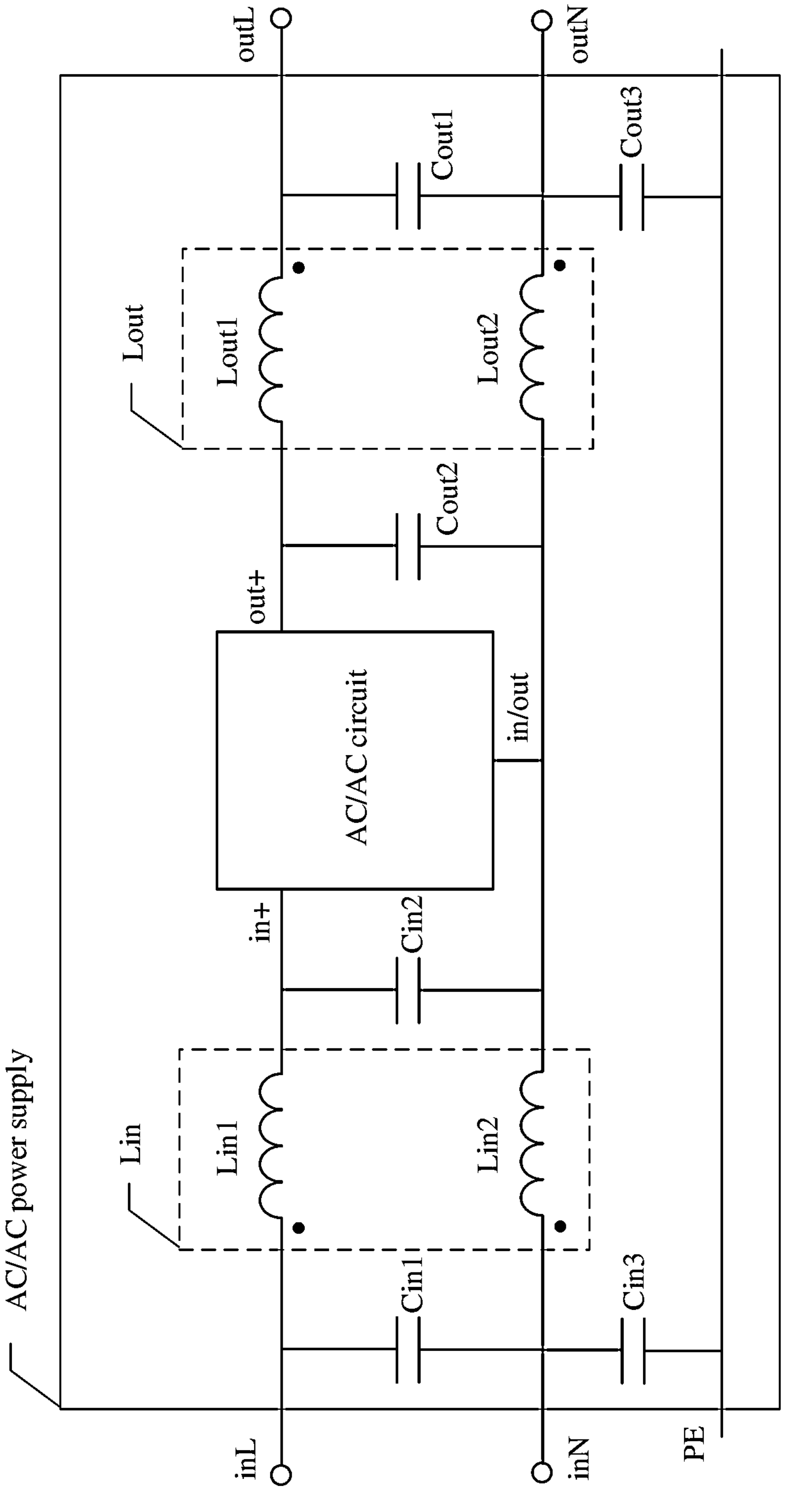
FIG. 1 is a schematic diagram of a structure of an AC/AC power supply according to the conventional technology.

It may be understood from a circuit structure of the power conversion device 1 shown in FIG. 4*a* that the power conversion device 1 shown in FIG. 4*a* is applicable to an application scenario in which a single-phase input and a single-phase output are used and two-stage filter inductors are at both an input end and an output end. After the power conversion device 1 operates, energy of an alternating current power grid is input to the power conversion device 1 from the first input end in1 and the second input end in2 of the power conversion device 1, flows through the fourth inductor winding L14, the first inductor winding L11, the fifth inductor winding L15, and the second inductor winding L12, and then flows into the AC/AC circuit 11 from a first input end in11 and a common end in/out of the AC/AC circuit 11. It is clear that the first inductor winding L11, the second inductor winding L12, the fourth inductor winding L14, and the fifth inductor winding L15 may filter an alternating current input by the alternating current power grid, to better reduce electromagnetic interference of the alternating current input by the alternating current power grid, and may also better suppress switching ripples at an input side of the AC/AC circuit 11, to prevent switching noise from interfering with a power grid side device. In addition, energy converted by the AC/AC circuit 11 flows out from a first output end out11 and the common end in/out of the AC/AC circuit 11, passes through the third inductor winding L13, the sixth inductor winding L16, the second inductor winding L12, and the fifth inductor winding L15, and then flows into an alternating current load. It is clear that the second inductor winding L12, the third inductor winding L13, the fifth inductor winding L15, and the sixth inductor winding L16 may filter an alternating current output by the AC/AC circuit, to obtain an alternating current that meets a noise requirement for normal operation of the alternating current load and has lower noise. Therefore, it may be understood that the first filter inductor L1 and the second filter inductor L2 can implement functions of two-stage filter inductors at an input end (such as two input filter inductors) and two-stage filter inductors at an output end (such as two output filter inductors) of an AC/AC power supply with a single-phase input and a single-phase output in the conventional technology. For example, the AC/AC power supply with the single-phase input and the single-phase output and with the two-stage filter inductors at both the input end and the output end in the conventional technology is an AC/AC power supply in which an input filter inductor is added between an input end and an input filter inductor of an AC/AC power supply shown in FIG. 1 and an output filter inductor is added between an output end and an output filter inductor of the AC/AC power supply shown in FIG. 1.

In addition, it is assumed that an input current and an output current of the power conversion device 1 are respectively I1 and I2. It may be understood from an energy flow direction of the power conversion device 1 that a through current of a branch (such as a circuit between a node J1 and the common end in/out of the AC/AC circuit 11) on which the fifth inductor winding L15 and the second inductor winding L12 are located is |I1-I2|. Similarly, it may be understood, from an energy flow direction and a circuit structure of the AC/AC power supply with the single-phase input and the single-phase output and with the two-stage filter inductors at both the input end and the output end in the conventional technology, that in the conventional technology, a through current of a branch (such as a circuit between the input end inN of the AC/AC power supply and the common end in/out of the AC/AC circuit) on which two inductor windings corresponding to the fifth inductor winding L15 and the second inductor winding L12 are located is I1. It is clear that the through current of the branch on which the second inductor winding L12 and the fifth inductor winding L15 are located in the power conversion device 1 is greatly reduced in comparison with the through current of the branch on which the two corresponding inductor windings are located in the conventional technology. Therefore, the second inductor winding L12 and the fifth inductor winding L15 in the power conversion device 1 each may use a thinner copper wire or cable, and a connection line between the node J1 and the common end in/out of the AC/AC circuit may use a thinner cable. This can greatly reduce circuit costs of the power conversion device 1.

In this embodiment, the first filter inductor L1 and the second filter inductor L2 not only can implement functions of the two-stage filter inductor at the input end and the two-stage filter inductor at the output end of the AC/AC power supply with the single-phase input and the single-phase output in the conventional technology, but also reduce two inductor windings and two inductor magnetic cores in comparison with the two-stage filter inductor at the input end and the two-stage filter inductor at the output end of the AC/AC power supply with the single-phase input and the single-phase output in the conventional technology, thereby reducing a volume of the power conversion device 1, and reducing circuit costs of the power conversion device 1. In addition, the second inductor winding L12 and the fifth inductor winding L15 each are an inductor winding shared by the filter inductor at the input end and the filter inductor at the output end, and a through current of the shared inductor winding is greatly reduced in comparison with a through current of two corresponding inductor windings in the conventional technology. Therefore, this can effectively reduce circuit costs of the second inductor winding L12, the fifth inductor winding L15, and a connection line corresponding to the second inductor winding L12 and the fifth inductor winding L15, and further reduce circuit costs of the power conversion device 1.

Figure 4B:
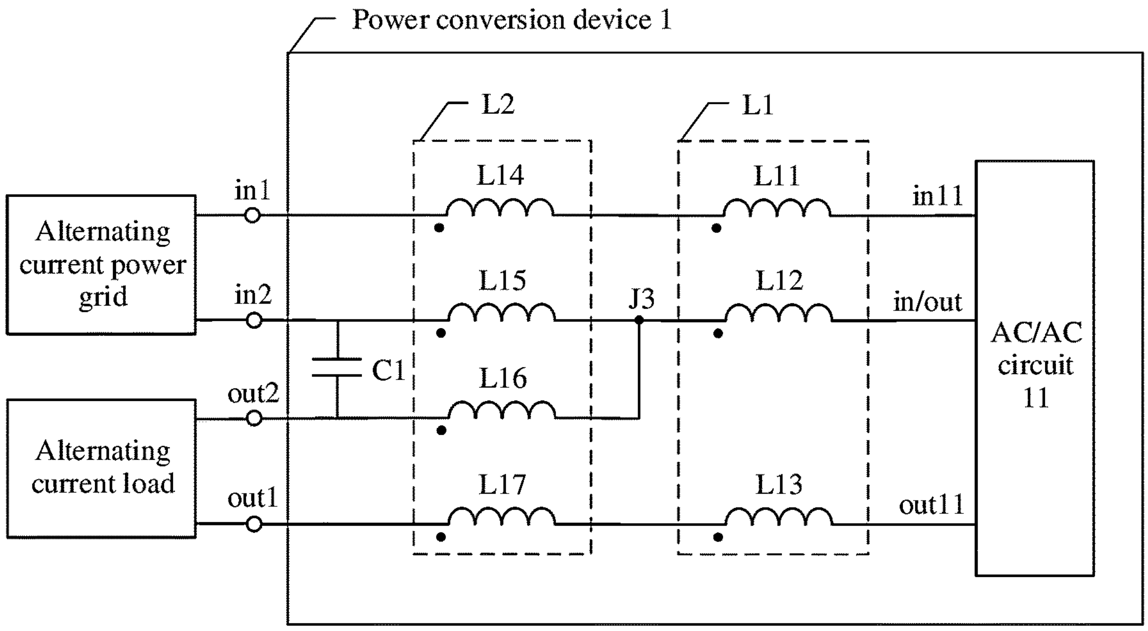
FIG. 4*b* is a schematic diagram of another structure of a power conversion device.

FIG. 4*b* is a schematic diagram of another structure of a power conversion device. Compared with the power conversion device 1 shown in FIG. 4*a*, in the power conversion device shown in FIG. 4*b*, a second filter inductor L2 shown in FIG. 4*b* is different from the second filter inductor L2 shown in FIG. 4*a*. The second filter inductor L2 includes a fourth inductor winding L14, a fifth inductor winding L15, a sixth inductor winding L16, a seventh inductor winding L17, and a second inductor magnetic core. The fourth inductor winding L14, the fifth inductor winding L15, the sixth inductor winding L16, and the seventh inductor winding L17 are all wound around the second inductor magnetic core. A first end of a first inductor winding L11 is connected to a first input end in1 of the power conversion device 1 through the fourth inductor winding L14, a first end of the second inductor winding L12 is connected to a second input end in2 of the power conversion device 1 through the fifth inductor winding L15, the first end of the second inductor winding L12 is connected to a second output end out2 of the power conversion device 1 through the sixth inductor winding L16, and a first end of the third inductor winding L13 is connected to a first output end out1 of the power conversion device 1 through the seventh inductor winding L17. A first end of each inductor winding may be a dotted terminal, and correspondingly, a second end of each inductor winding is an undotted terminal.

Herein, for other circuit elements except the second filter inductor L2 in the power conversion device 1 shown in FIG. 4*b* and connection relationships of the other circuit elements, refer to descriptions of corresponding parts in the power conversion device 1 shown in FIG. 4*a*. Details are not described herein again.

Optionally, the power conversion device 1 further includes a first filter capacitor C1. For example, the first filter capacitor C1 is located between the second input end in2 and the second output end out2 of the power conversion device 1. It may be understood that when a capacitance of the first filter capacitor C1 is equal to a sum of capacitances of an input filter capacitor Cin3 and an output filter capacitor Cout3 in the conventional technology, the first filter capacitor C1 may replace the input filter capacitor Cin3 and the output filter capacitor Cout3 in the conventional technology, so that locations of filter capacitors in the power conversion device 1 are more centralized, and a miniaturization of the power conversion device 1 is facilitated. Optionally, the first filter capacitor C1 may be alternatively located between the first input end in1 and the first output end out1 of the power conversion device 1, located between an undotted terminal of the first inductor winding L11 and an undotted terminal of the third inductor winding L13, or located between a dotted terminal of the first inductor winding L11 and a dotted terminal of the third inductor winding L13. It may be understood that the first filter capacitor C1 in the power conversion device 1 has various locations, so that the power conversion device 1 has various structures and high flexibility.

To better achieve filtering effect on an input current and an output current of the power conversion device 1, the power conversion device 1 may further appropriately add a filter capacitor. For example, the power conversion device 1 may further add at least one of the following filter capacitors: a filter capacitor located between the undotted terminal of the first inductor winding L11 and the undotted terminal of the third inductor winding L13, a filter capacitor located between the dotted terminal of the first inductor winding L11 and the dotted terminal of the third inductor winding L13, a filter capacitor located between the first input end in1 of the power conversion device 1 and a ground cable PE, a filter capacitor located between the first output end out1 of the power conversion device 1 and the ground cable PE, a filter capacitor located between the second input end in2 of the power conversion device 1 and the ground cable PE, a filter capacitor located between the second output end out2 of the power conversion device 1 and the ground cable PE, a filter capacitor located between the undotted terminal of the first inductor winding L11 and the ground cable PE, a filter capacitor located between an undotted terminal of the second inductor winding L12 and the ground cable PE, a filter capacitor located between the undotted terminal of the third inductor winding L13 and the ground cable PE, a filter capacitor located between the dotted terminal of the first inductor winding L11 and the ground cable PE, a filter capacitor located between a dotted terminal of the second inductor winding L12 and the ground cable PE, and a filter capacitor located between the dotted terminal of the third inductor winding L13 and the ground cable PE.

It may be understood from a circuit structure of the power conversion device 1 shown in FIG. 4*b* that the power conversion device 1 shown in FIG. 4*b* is also applicable to an application scenario in which a single-phase input and a single-phase output are used and two-stage filter inductors are at both an input end and an output end. After the power conversion device 1 operates, energy of an alternating current power grid is input to the power conversion device 1 from the first input end in1 and the second input end in2 of the power conversion device 1, flows through the fourth inductor winding L14, the first inductor winding L11, the fifth inductor winding L15, and the second inductor winding L12, and then flows into an AC/AC circuit 11 from a first input end in11 and a common end in/out of the AC/AC circuit 11. It is clear that the first inductor winding L11, the second inductor winding L12, the fourth inductor winding L14, and the fifth inductor winding L15 may filter an alternating current input by the alternating current power grid, to better reduce electromagnetic interference of the alternating current input by the alternating current power grid, and may also better suppress switching ripples at an input side of the AC/AC circuit 11, to prevent switching noise from interfering with a power grid side device. In addition, energy converted by the AC/AC circuit 11 flows out from a first output end out11 and the common end in/out of the AC/AC circuit 11, passes through the third inductor winding L13, the seventh inductor winding L17, the second inductor winding L12, and the sixth inductor winding L16, and then flows into an alternating current load. It is clear that the second inductor winding L12, the third inductor winding L13, the sixth inductor winding L16, and the seventh inductor winding L17 may filter an alternating current output by the AC/AC circuit 11, to obtain an alternating current that meets a noise requirement for normal operation of the alternating current load and has lower noise. Therefore, it may be understood that a first filter inductor L1 and the second filter inductor L2 can implement functions of a two-stage filter inductor at an input end and a two-stage filter inductor at an output end of an AC/AC power supply with a single-phase input and a single-phase output in the conventional technology.

In addition, it is assumed that an input current and an output current of the power conversion device 1 are respectively I1 and I2. It may be understood from an energy flow direction of the power conversion device 1 that a through current of a branch (such as a circuit between a node J3 and the common end in/out of the AC/AC circuit 11) on which the second inductor winding L12 is located is |I1-I2|. Similarly, it may be understood, from an energy flow direction and a circuit structure of the AC/AC power supply with the single-phase input and the single-phase output and with two-stage filter inductors at both the input end and the output end in the conventional technology, that in the conventional technology, a through current of a branch (such as a circuit between the input end inN of the AC/AC power supply and the common end in/out of the AC/AC circuit) on which an inductor winding Lin2 corresponding to the second inductor winding L12 is located is I1. It is clear that the through current of the branch on which the second inductor winding L12 is located in the power conversion device 1 is greatly reduced in comparison with the through current of the branch on which the corresponding inductor winding Lin2 is located in the conventional technology. Therefore, the second inductor winding L12 in the power conversion device 1 may use a thinner copper wire or cable, and a connection line between the node J3 and the common end in/out of the AC/AC circuit 11 may use a thinner cable. This can greatly reduce circuit costs of the power conversion device 1.

In this embodiment, the first filter inductor L1 and the second filter inductor L2 not only can implement functions of the two-stage filter inductor at the input end and the two-stage filter inductor at the output end of the AC/AC power supply with the single-phase input and the single-phase output in the conventional technology, but also reduce one inductor winding and two inductor magnetic cores in comparison with the two-stage filter inductor at the input end and the two-stage filter inductor at the output end of the AC/AC power supply with the single-phase input and the single-phase output in the conventional technology, thereby reducing a volume of the power conversion device 1, and reducing circuit costs of the power conversion device 1. In addition, the second inductor winding L12 is an inductor winding shared by a filter inductor at the input end and a filter inductor at the output end, and a through current of the shared inductor winding is greatly reduced in comparison with the through current of the corresponding inductor winding Lin2 in the conventional technology. Therefore, this can effectively reduce circuit costs of the second inductor winding L12 and a connection line corresponding to the second inductor winding L12, and further reduce the circuit costs of the power conversion device 1. In addition, in addition to a structure of three inductor windings and one inductor magnetic core, the second filter inductor L2 may use a structure of four inductor windings and one inductor magnetic core, so that the power conversion device 1 has various circuit structures and high flexibility.

Figure 4C:
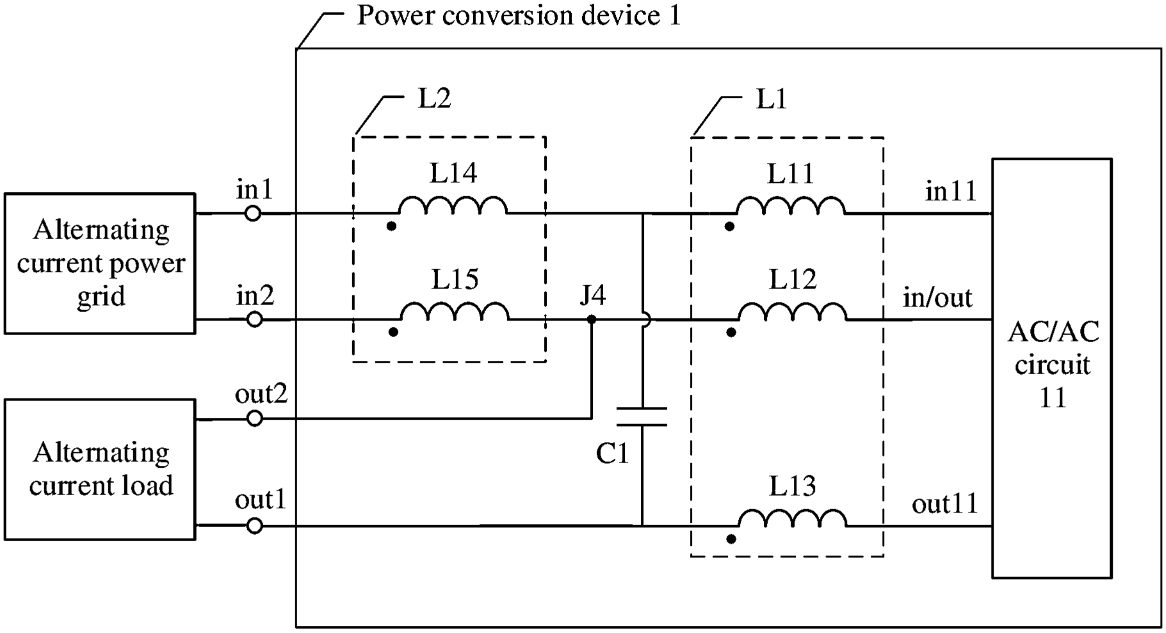
FIG. 4*c* is a schematic diagram of another structure of a power conversion device.

FIG. 4*c* is a schematic diagram of another structure of a power conversion device. Compared with the power conversion device 1 shown in FIG. 4*a*, in the power conversion device shown in FIG. 4*c*, a second filter inductor L2 shown in FIG. 4*c* is different from the second filter inductor L2 shown in FIG. 4*a*. The second filter inductor L2 includes a fourth inductor winding L14, a fifth inductor winding L15, and a second inductor magnetic core. The fourth inductor winding L14 and the fifth inductor winding L15 are both wound around the second inductor magnetic core. A first end of a first inductor winding L11 is connected to a first input end in1 of the power conversion device 1 through the fourth inductor winding L14, and a first end of a second inductor winding L12 is connected to a second input end in2 of the power conversion device 1 through the fifth inductor winding L15. A first end of each inductor winding may be a dotted terminal, and correspondingly, a second end of each inductor winding is an undotted terminal.

Herein, for other circuit elements except the second filter inductor L2 in the power conversion device 1 shown in FIG. 4*c* and connection relationships of the other circuit elements, refer to descriptions of corresponding parts in the power conversion device 1 shown in FIG. 4*a*. Details are not described herein again.

Optionally, the power conversion device 1 further includes a first filter capacitor C1. For example, the first filter capacitor C1 is connected between a dotted terminal of the first inductor winding L11 and a dotted terminal of a third inductor winding L13. Optionally, the first filter capacitor C1 may be alternatively located between the first input end in1 and a first output end out1 of the power conversion device 1, located between the second input end in2 and a second output end out2 of the power conversion device 1, or located between an undotted terminal of the first inductor winding L11 and an undotted terminal of the third inductor winding L13. It may be understood that the first filter capacitor C1 in the power conversion device 1 has various locations, so that the power conversion device 1 has various structures and high flexibility.

To better achieve filtering effect on an input current and an output current of the power conversion device 1, the power conversion device 1 may further appropriately add a filter capacitor. For example, the power conversion device 1 may further add at least one of the following filter capacitors: a filter capacitor located between the first input end in1 and the first output end out1 of the power conversion device 1, a filter capacitor located between a second input end in2 and the second output end out2 of the power conversion device 1, a filter capacitor located between the undotted terminal of the first inductor winding L11 and the undotted terminal of the third inductor winding L13, a filter capacitor located between the first input end in1 of the power conversion device 1 and a ground cable PE, a filter capacitor located between the first output end out1 of the power conversion device 1 and the ground cable PE, a filter capacitor located between the second input end in2 of the power conversion device 1 and the ground cable PE, a filter capacitor located between the second output end out2 of the power conversion device 1 and the ground cable PE, a filter capacitor located between the undotted terminal of the first inductor winding L11 and the ground cable PE, a filter capacitor located between an undotted terminal of the second inductor winding L12 and the ground cable PE, a filter capacitor located between the undotted terminal of the third inductor winding L13 and the ground cable PE, a filter capacitor located between a dotted terminal of the second inductor winding L12 and the ground cable PE, and a filter capacitor located between the dotted terminal of the third inductor winding L13 and the ground cable PE.

It may be understood from a circuit structure of the power conversion device 1 shown in FIG. 4*c* that the power conversion device 1 shown in FIG. 4*c* is applicable to an application scenario in which a single-phase input and a single-phase output are used, a two-stage filter inductor is at an input end, and a one-stage filter inductor is at an output end. In addition, it is assumed that an input current and an output current of the power conversion device 1 are respectively I1 and I2. It may be understood from an energy flow direction of the power conversion device 1 that a through current of a branch (such as a circuit between a node J4 and a common end in/out of an AC/AC circuit 11) on which the second inductor winding L12 is located is |I1-I2|. Similarly, it may be understood, from a current flow direction and a circuit structure of an AC/AC power supply with a single-phase input and a single-phase output and with a two-stage filter inductor at an input end and a one-stage filter inductor at an output end in the conventional technology, that in the conventional technology, a through current of a branch (such as a circuit between an input end inN of the AC/AC power supply and the common end in/out of the AC/AC circuit) on which an inductor winding Lin2 corresponding to the second inductor winding L12 is located is I1. It is clear that the through current of the branch on which the second inductor winding L12 is located in the power conversion device 1 is greatly reduced in comparison with the through current of the branch on which the corresponding inductor winding Lin2 is located in the conventional technology. Therefore, the second inductor winding L12 in the power conversion device 1 may use a thinner copper wire or cable, and a connection line between the node J4 and the common end in/out of the AC/AC circuit 11 may use a thinner cable. This can greatly reduce circuit costs of the power conversion device 1.

In this embodiment, a first filter inductor L1 can implement functions of an input filter inductor Lin and an output filter inductor Lout of the AC/AC power supply with the single-phase input and the single-phase output in the conventional technology, but also reduces one inductor winding and one inductor magnetic core in comparison with the input filter inductor Lin and the output filter inductor Lout of the AC/AC power supply with the single-phase input and the single-phase output in the conventional technology, thereby reducing a volume of the power conversion device 1, and reducing circuit costs of the power conversion device 1. In addition, the second inductor winding L12 is an inductor winding shared by a filter inductor at the input end and a filter inductor at the output end, and a through current of the shared inductor winding is greatly reduced in comparison with the through current of the corresponding inductor winding Lin2 in the conventional technology. Therefore, this can effectively reduce circuit costs of the second inductor winding L12 and a connection line corresponding to the second inductor winding L12, and further reduce the circuit costs of the power conversion device 1.

Figure 4D:
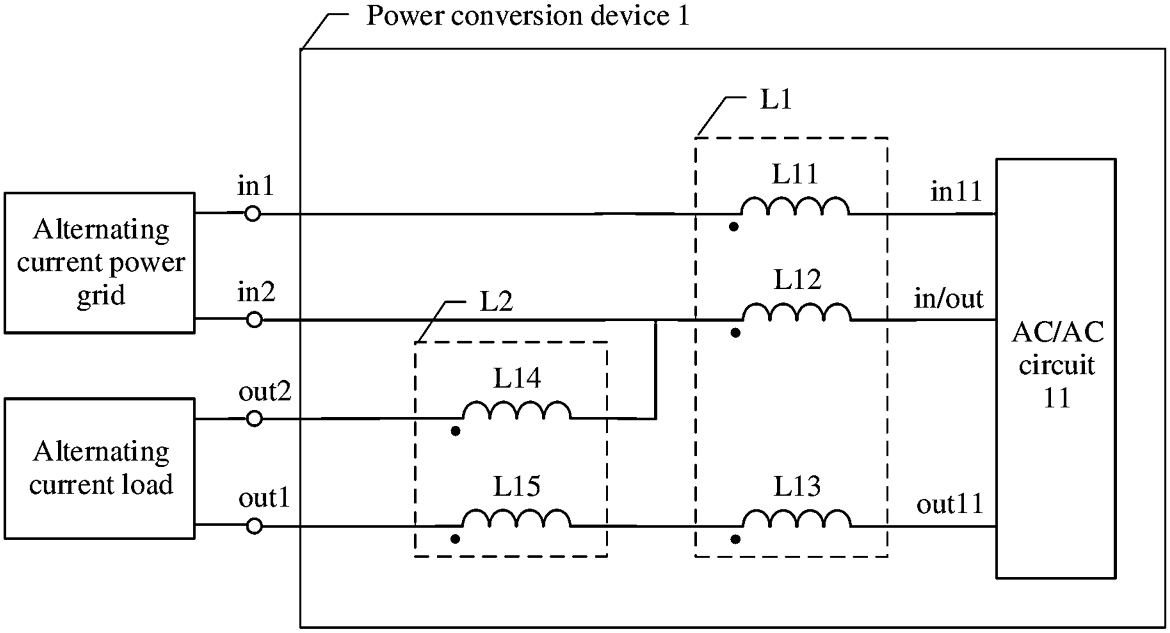
FIG. 4*d* is a schematic diagram of another structure of a power conversion device.

It should be noted that the second filter inductor L2 shown in FIG. 4*c* is located outside an alternating current input end of the power conversion device 1 or may be located at an alternating current output end of the power conversion device 1. For details, refer to a power conversion device 1 shown in FIG. 4*d*. It may be understood from a circuit structure of the power conversion device 1 shown in FIG. 4*d* that the power conversion device 1 shown in FIG. 4*d* is applicable to an application scenario in which a single-phase input and a single-phase output are used, a one-stage filter inductor is at an input end, and a two-stage filter inductor is at an output end. Herein, for an energy flow direction and a circuit structure of the power conversion device 1 shown in FIG. 4*d*, refer to descriptions of corresponding parts in the power conversion device 1 shown in FIG. 4*c*. Details are not described herein again. In addition, the power conversion device 1 shown in FIG. 4*c* may further include a third filter inductor, and the third filter inductor is located at the alternating current output end of the power conversion device 1. Therefore, the power conversion device 1 is applicable to an application scenario in which a single-phase input and a single-phase output are used and two-stage filter inductors are both at the input end and the output end. Herein, for a location of the third filter inductor, refer to a location of a second filter inductor L2 shown in FIG. 4*d*. For an energy flow direction and the circuit structure of the power conversion device 1 including the third filter inductor, refer to descriptions of corresponding parts in the power conversion device 1 shown in FIG. 4*d*. Details are not described herein again.

Figure 5A:
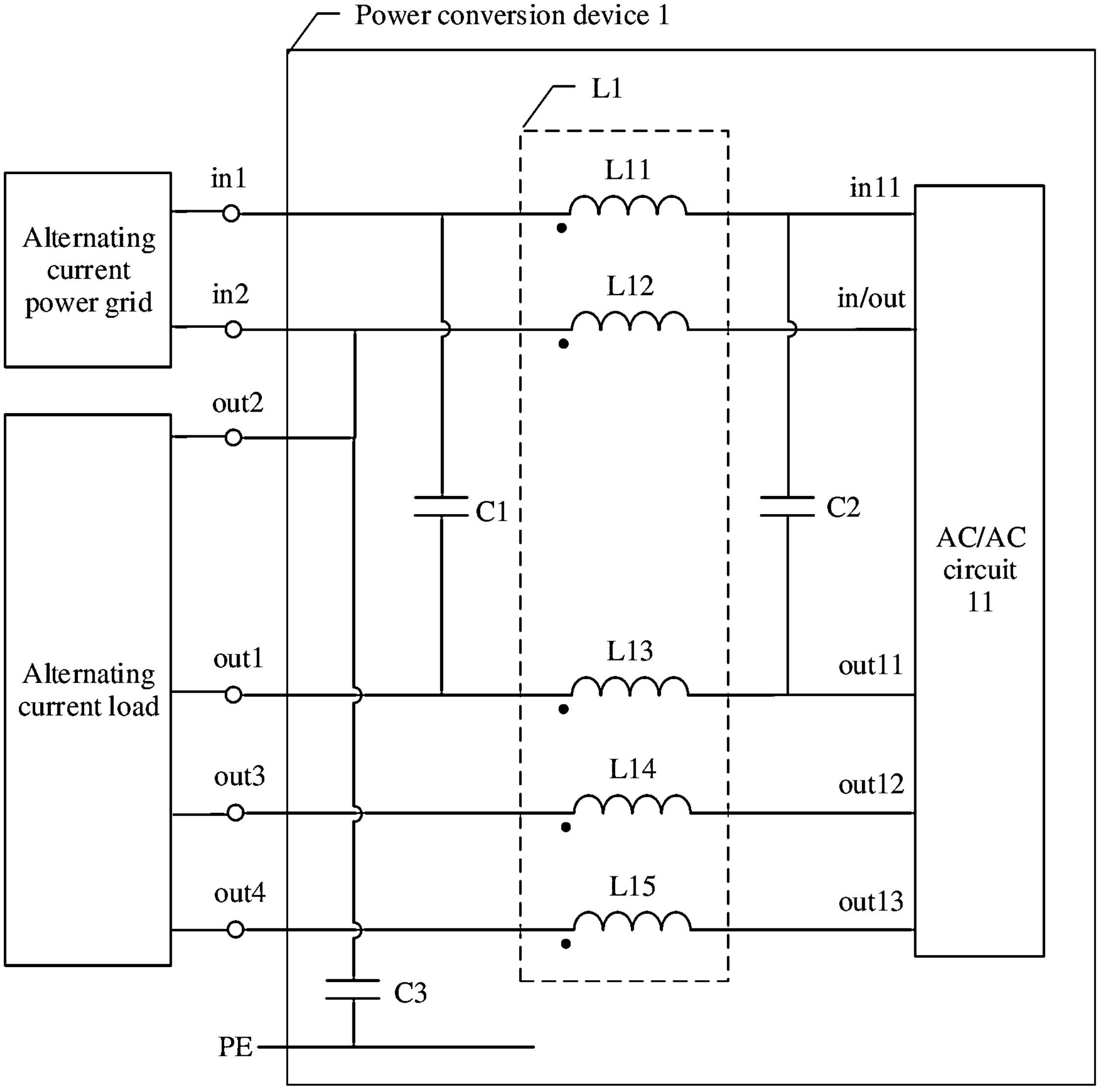
FIG. 5*a* is a schematic diagram of another structure of a power conversion device.

FIG. 5*a* is a schematic diagram of another structure of a power conversion device. Compared with the power conversion device 1 shown in FIG. 3*a*, in the power conversion device 1 shown in FIG. 5*a*, an alternating current output end further includes a third output end out3 and a fourth output end out4, a first filter inductor L1 further includes a fourth inductor winding L14 and a fifth inductor winding L15, and an output end of an AC/AC circuit 11 further includes a second output end out12 and a third output end out13. A first end of the fourth inductor winding L14 is connected to a third output end out3 of the power conversion device 1, and a second end of the fourth inductor winding L14 is connected to the second output end out12 of the AC/AC circuit 11. A first end of the fifth inductor winding L15 is connected to the fourth output end out4 of the power conversion device 1, and a second end of the fifth inductor winding L15 is connected to the third output end out13 of the AC/AC circuit 11. A first end of each inductor winding may be a dotted terminal, and correspondingly, a second end of each inductor winding is an undotted terminal.

The power conversion device 1 further includes a first filter capacitor C1, a second filter capacitor C2, and a third filter capacitor C3. For descriptions of the first filter capacitor C1, the second filter capacitor C2, and the third filter capacitor C3, refer to descriptions of corresponding parts in the power conversion device 1 shown in FIG. 3*b*. Details are not described herein again.

To better achieve filtering effect on an input current and an output current of the power conversion device 1, the power conversion device 1 may further appropriately add a filter capacitor. For example, the power conversion device 1 may further add at least one of the following filter capacitors: a filter capacitor located between a first input end in1 of the power conversion device 1 and a ground cable PE, a filter capacitor located between a first output end out1 of the power conversion device 1 and the ground cable PE, a filter capacitor located between the third output end out3 of the power conversion device 1 and the ground cable PE, a filter capacitor located between the fourth output end out4 of the power conversion device 1 and the ground cable PE, a filter capacitor located between the first input end in1 and a second input end in2 of the power conversion device 1, a filter capacitor located between the first output end out1 and the second output end out2 of the power conversion device 1, a filter capacitor located between the second output end out2 and the third output end out3 of the power conversion device 1, a filter capacitor located between the second output end out2 and the fourth output end out4 of the power conversion device 1, a filter capacitor located between an undotted terminal of a first inductor winding L11 and the ground cable PE, a filter capacitor located between an undotted terminal of a second inductor winding L12 and the ground cable PE, a filter capacitor located between an undotted terminal of a third inductor winding L13 and the ground cable PE, a filter capacitor located between an undotted terminal of the fourth inductor winding L14 and the ground cable PE, a filter capacitor located between an undotted terminal of the fifth inductor winding L15 and the ground cable PE, a filter capacitor located between the undotted terminal of the first inductor winding L11 and the undotted terminal of the second inductor winding L12, a filter capacitor located between the undotted terminal of the third inductor winding L13 and the undotted terminal of the second inductor winding L12, a filter capacitor located between the undotted terminal of the fourth inductor winding L14 and the undotted terminal of the second inductor winding L12, a filter capacitor located between the undotted terminal of the fifth inductor winding L15 and the undotted terminal of the second inductor winding L12, a filter capacitor located between the undotted terminal of the third inductor winding L13 and the undotted terminal of the fourth inductor winding L14, a filter capacitor located between the undotted terminal of the third inductor winding L13 and the undotted terminal of the fifth inductor winding L15, and a filter capacitor located between the undotted terminal of the fourth inductor winding L14 and the undotted terminal of the fifth inductor winding L15.

It should be noted that when a capacitance of the first filter capacitor C1 is a sum of a capacitance of the filter capacitor located between the first input end in1 and the second input end in2 of the power conversion device 1 and a capacitance of the filter capacitor located between the first output end out1 and the second output end out2 of the power conversion device 1, the first filter capacitor C1 may replace the filter capacitor located between the first input end in1 and the second input end in2 of the power conversion device 1 and the filter capacitor located between the first output end out1 and the second output end out2 of the power conversion device 1, so that a quantity of filter capacitors in the power conversion device 1 is reduced, locations of filter capacitors in the power conversion device 1 are more centralized, and a miniaturization of the power conversion device 1 is facilitated.

Figure 5B:
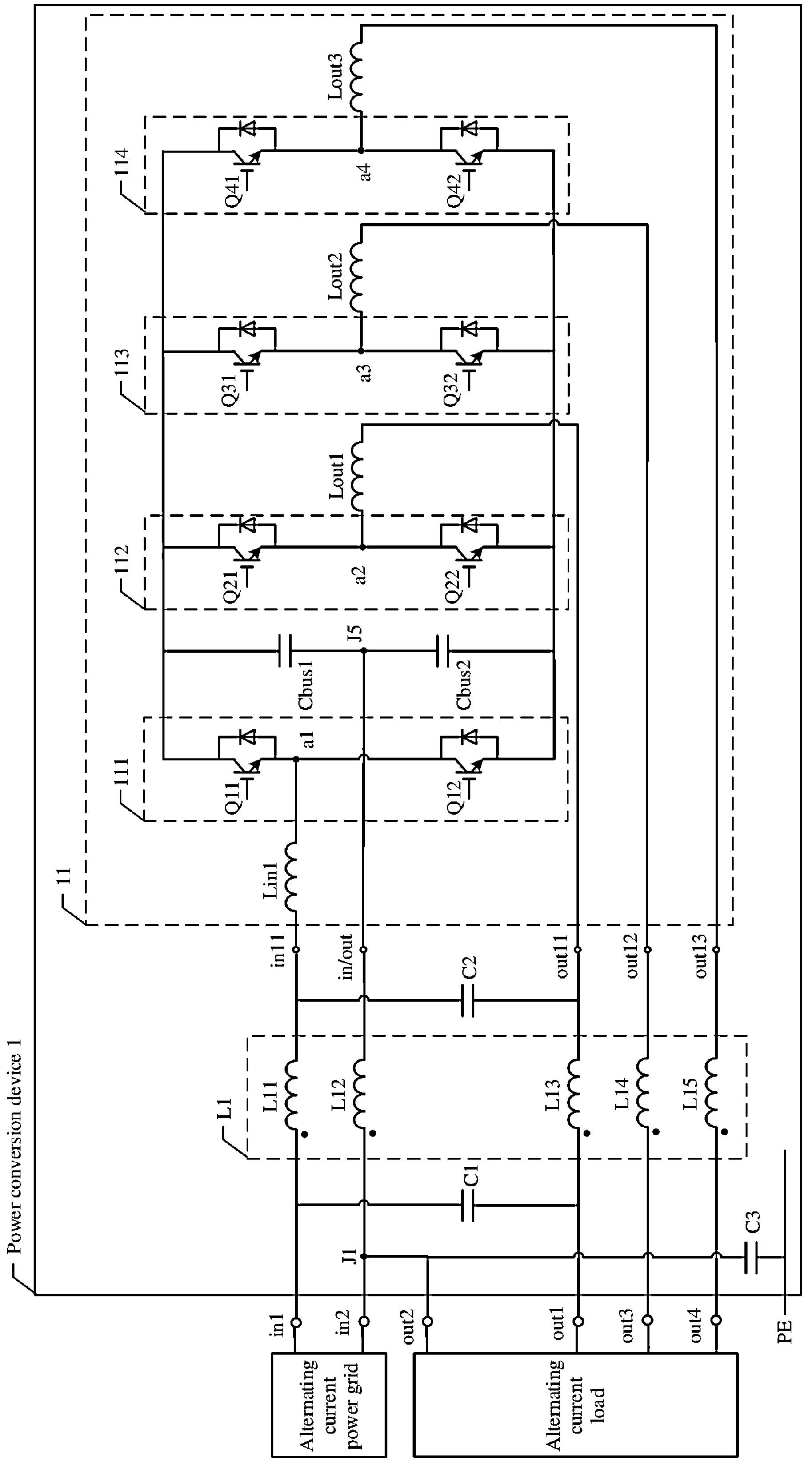
FIG. 5*b* is a schematic diagram of another structure of a power conversion device.

Herein, an AC/AC circuit 11 shown in FIG. 5*b* may be used as the AC/AC circuit 11. As shown in FIG. 5*b*, the AC/AC circuit 11 includes a first phase bridge arm 111, a second phase bridge arm 112, a third phase bridge arm 113, a fourth phase bridge arm 114, a first bus capacitor Cbus1, a second bus capacitor Cbus2, a first inductor Lin1, a second inductor Lout1, a third inductor Lout2, and a fourth inductor Lout3. The first phase bridge arm 111, the second phase bridge arm 112, the third phase bridge arm 113, and the fourth phase bridge arm 114 are connected in parallel to each other. A switching transistor Q11 and a switching transistor Q12 are connected in series to form the first phase bridge arm 111, a switching transistor Q21 and a switching transistor Q22 are connected in series to form the second phase bridge arm 112, a switching transistor Q31 and a switching transistor Q32 are connected in series to form the third phase bridge arm 113, and a switching transistor Q41 and a switching transistor Q42 are connected in series to form the fourth phase bridge arm 114. The first bus capacitor Cbus1 and the second bus capacitor Cbus2 are connected in series and then connected in parallel to two ends of the first phase bridge arm 111, and a connection part J5 of the first bus capacitor Cbus1 and the second bus capacitor Cbus2 is connected to a common end in/out of the AC/AC circuit 11. A midpoint a1 of the first phase bridge arm 111, such as a serial connection part of the switching transistor Q11 and the switching transistor Q12, is connected to a first input end in11 of the AC/AC circuit 11 through the first inductor Lin1. A midpoint a2 of the second phase bridge arm 112, such as a serial connection part of the switching transistor Q21 and the switching transistor Q22, is connected to a first output end out11 of the AC/AC circuit 11 through the second inductor Lout1. A midpoint a3 of the third phase bridge arm 113, such as a serial connection part of the switching transistor Q31 and the switching transistor Q32, is connected to a second output end out12 of the AC/AC circuit 11 through the third inductor Lout2. A midpoint a4 of the fourth phase bridge arm 114, such as a serial connection part of the switching transistor Q41 and the switching transistor Q42, is connected to a third output end out13 of the AC/AC circuit 11 through the fourth inductor Lout3.

After the power conversion device 1 operates, energy of an alternating current power grid is input to the power conversion device 1 from the first input end in1 and the second input end in2 of the power conversion device 1, flows through the first inductor winding L11 and the second inductor winding L12, then flows into the AC/AC circuit 11 from the first input end in11 and the common end in/out of the AC/AC circuit 11, and then is rectified by the first phase bridge arm 111 and the second phase bridge arm 112 in the AC/AC circuit 11. It is clear that the first inductor winding L11 and the second inductor winding L12 may filter an alternating current input by the alternating current power grid and filter electromagnetic interference of the AC/AC circuit to the alternating current power grid, to reduce electromagnetic interference of the alternating current input by the alternating current power grid and interference of the AC/AC circuit 11 to the power grid. In addition, energy stored on the first bus capacitor Cbus1 and the second bus capacitor Cbus2 after being rectified by the first phase bridge arm 111 and the second phase bridge arm 112 is output from the first output end out11, the second output end out12, the third output end out13, and the common end in/out of the AC/AC circuit 11 after being inverted by the second phase bridge arm 112, the third phase bridge arm 113, and the fourth phase bridge arm 114, passes through the third inductor winding L13, the fourth inductor winding L14, the fifth inductor winding L15, and the second inductor winding L12, and then flows into an alternating current load. It is clear that the second inductor winding L12, the third inductor winding L13, the fourth inductor winding L14, and the fifth inductor winding L15 may filter an alternating current output by the AC/AC circuit 11, to obtain an alternating current that meets a noise requirement for normal operation of the alternating current load. Therefore, it may be understood that the first filter inductor L1 can implement functions of an input filter inductor with two inductor windings and an output filter inductor with four inductor windings in an AC/AC power supply with a single-phase input and a three-phase output in the conventional technology.

In addition, it is assumed that an input current and an output current of the power conversion device 1 are respectively I1 and I2. It may be understood from an energy flow direction of the power conversion device 1 that a through current of a branch (such as a circuit between a node J1 and a node J5) on which the second inductor winding L12 is located is |I1-I2|. Similarly, it may be understood, from an energy flow direction and a circuit structure of the AC/AC power supply with the single-phase input and the three-phase output in the conventional technology, that in the conventional technology, a through current of a branch (such as a circuit between an input end inN of the AC/AC power supply and the common end in/out of the AC/AC circuit) on which an inductor winding Lin2 is located is I1. It is clear that the through current of the branch on which the second inductor winding L12 is located in the power conversion device 1 is greatly reduced in comparison with the through current of the branch on which the inductor winding Lin2 is located in the conventional technology. Therefore, the second inductor winding L12 in the power conversion device 1 may use a thinner copper wire or cable, and a connection line between the node J1 and the node J5 may use a thinner cable. This can greatly reduce circuit costs of the power conversion device 1.

In this embodiment, the first filter inductor L1 not only can implement the functions of the input filter inductor and the output filter inductor of the AC/AC power supply with the single-phase input and the three-phase output in the conventional technology, but also reduces one inductor winding and one inductor magnetic core in comparison with the input filter inductor and the output filter inductor of the AC/AC power supply with the single-phase input and the three-phase output in the conventional technology, thereby reducing a volume of the power conversion device 1, and reducing the circuit costs of the power conversion device 1. In addition, the second inductor winding L12 is an inductor winding shared by a filter inductor at the input end and a filter inductor at the output end, and the through current of the shared inductor winding is greatly reduced in comparison with the through current of the corresponding inductor winding Lin2 in the conventional technology. Therefore, this can effectively reduce circuit costs of the second inductor winding L12 and a connection line corresponding to the second inductor winding L12, and further reduce the circuit costs of the power conversion device 1. In addition, the second inductor winding L2 is the shared inductor winding, to connect the second input end in2 and the second output end out2 of the power conversion device 1, so that the third filter capacitor C3 may be equivalent to filter capacitors Cin3 and Cout3 in the conventional technology. Therefore, the power conversion device 1 can reduce one filter capacitor in comparison with the AC/AC power supply in the conventional technology, to further reduce the circuit costs of the power conversion device 1.

Figure 5C:
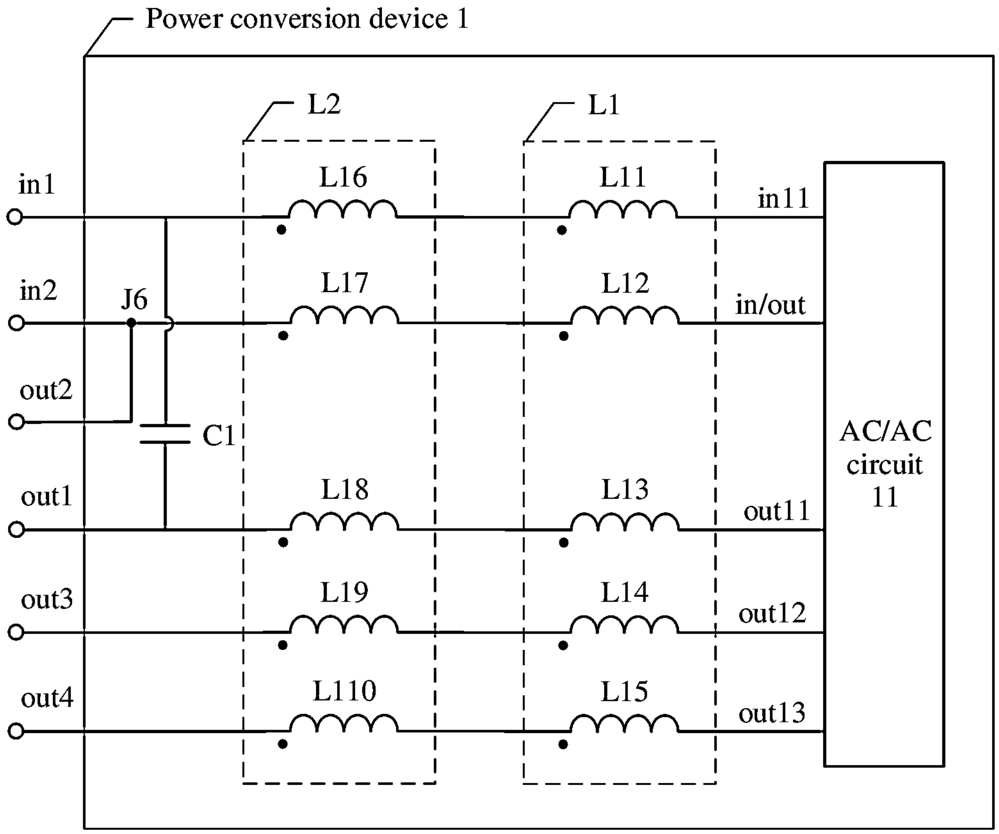
FIG. 5*c* is a schematic diagram of another structure of a power conversion device.

FIG. 5*c* is a schematic diagram of another structure of a power conversion device. Compared with the power conversion device 1 shown in FIG. 5*a*, the power conversion device 1 shown in FIG. 5*c* further includes a second filter inductor L2. As shown in FIG. 5*c*, the second filter inductor L2 includes a sixth inductor winding L16, a seventh inductor winding L17, an eighth inductor winding L18, a ninth inductor winding L19, a tenth inductor winding L110, and a second inductor magnetic core.

The sixth inductor winding L16, the seventh inductor winding L17, the eighth inductor winding L18, the ninth inductor winding L19, and the tenth inductor winding L110 are all wound around the second inductor magnetic core. A first end of a first inductor winding L11 is connected to a first input end in1 of the power conversion device 1 through the sixth inductor winding L16, a first end of a second inductor winding L12 is connected to a second input end in2 and a second output end out2 of the power conversion device 1 through the seventh inductor winding L17, a first end of a third inductor winding L13 is connected to a first output end out1 of the power conversion device through the eighth inductor winding L18, a first end of a fourth inductor winding L14 is connected to a third output end out3 of the power conversion device 1 through the ninth inductor winding L19, and a first end of a fifth inductor winding L15 is connected to a fourth output end out4 of the power conversion device 1 through the tenth inductor winding L110.

A first end of each inductor winding may be a dotted terminal, and correspondingly, a second end of each inductor winding is an undotted terminal. Herein, for a connection relationship between each inductor winding in the first filter inductor L1 and an AC/AC circuit 11, a circuit element included in the AC/AC circuit 11, and a connection relationship of the circuit element, refer to descriptions of corresponding parts in the power conversion devices 1 shown in FIG. 5*a* and FIG. 5*b*. Details are not described herein again.

Optionally, a first filter capacitor C1 may be alternatively located between an undotted terminal of the first inductor winding L11 and an undotted terminal of the third inductor winding L13 or located between a dotted terminal of the first inductor winding L11 and a dotted terminal of the third inductor winding L13. It may be understood that the first filter capacitor C1 in the power conversion device 1 has various locations, so that the power conversion device 1 has various structures and high flexibility.

To better achieve filtering effect on an input current and an output current of the power conversion device 1, the power conversion device 1 may further appropriately add a filter capacitor. For example, the power conversion device 1 may further add at least one of the following filter capacitors: a filter capacitor located between the undotted terminal of the first inductor winding L11 and the undotted terminal of the third inductor winding L13, a filter capacitor located between the dotted terminal of the first inductor winding L11 and the dotted terminal of the third inductor winding L13, a filter capacitor located between the first input end in1 of the power conversion device 1 and a ground cable PE, a filter capacitor located between the second input end in2 of the power conversion device 1 and the ground cable PE, a filter capacitor located between the first output end out1 of the power conversion device 1 and the ground cable PE, a filter capacitor located between the second output end out2 of the power conversion device 1 and the ground cable PE, a filter capacitor located between the third output end out3 of the power conversion device 1 and the ground cable PE, a filter capacitor located between the fourth output end out4 of the power conversion device 1 and the ground cable PE, a filter capacitor located between the first input end in1 and the second input end in2 of the power conversion device 1, a filter capacitor located between the first output end out1 and the second output end out2 of the power conversion device 1, a filter capacitor located between the third output end out3 and the second output end out2 of the power conversion device 1, a filter capacitor located between the fourth output end out4 and the second output end out2 of the power conversion device 1, a filter capacitor located between the first output end out1 and the third output end out3 of the power conversion device 1, a filter capacitor located between the first output end out1 and the fourth output end out4 of the power conversion device 1, a filter capacitor located between the third output end out3 and the fourth output end out4 of the power conversion device 1, a filter capacitor located between the undotted terminal of the first inductor winding L11 and the ground cable PE, a filter capacitor located between an undotted terminal of the second inductor winding L12 and the ground cable PE, a filter capacitor located between the undotted terminal of the third inductor winding L13 and the ground cable PE, a filter capacitor located between an undotted terminal of the fourth inductor winding L14 and the ground cable PE, a filter capacitor located between an undotted terminal of the fifth inductor winding L15 and the ground cable PE, a filter capacitor located between the undotted terminal of the first inductor winding L11 and the undotted terminal of the second inductor winding L12, a filter capacitor located between the undotted terminal of the third inductor winding L13 and the undotted terminal of the second inductor winding L12, a filter capacitor located between the undotted terminal of the fourth inductor winding L14 and the undotted terminal of the second inductor winding L12, a filter capacitor located between the undotted terminal of the fifth inductor winding L15 and the undotted terminal of the second inductor winding L12, a filter capacitor located between the undotted terminal of the third inductor winding L13 and the undotted terminal of the fourth inductor winding L14, a filter capacitor located between the undotted terminal of the third inductor winding L13 and the undotted terminal of the fifth inductor winding L15, a filter capacitor located between the undotted terminal of the fourth inductor winding L14 and the undotted terminal of the fifth inductor winding L15, a filter capacitor located between the dotted terminal of the first inductor winding L11 and the ground cable PE, a filter capacitor located between a dotted terminal of the second inductor winding L12 and the ground cable PE, a filter capacitor located between the dotted terminal of the third inductor winding L13 and a ground cable PE, a filter capacitor located between a dotted terminal of the fourth inductor winding L14 and the ground cable PE, a filter capacitor located between a dotted terminal of the fifth inductor winding L15 and the ground cable PE, a filter capacitor located between the dotted terminal of the first inductor winding L11 and the dotted terminal of the second inductor winding L12, a filter capacitor located between the dotted terminal of the third inductor winding L13 and the dotted terminal of the second inductor winding L12, a filter capacitor located between the dotted terminal of the fourth inductor winding L14 and the dotted terminal of the second inductor winding L12, a filter capacitor located between the dotted terminal of the fifth inductor winding L15 and the dotted terminal of the second inductor winding L12, a filter capacitor located between the dotted terminal of the third inductor winding L13 and the dotted terminal of the fourth inductor winding L14, a filter capacitor located between the dotted terminal of the third inductor winding L13 and the dotted terminal of the fifth inductor winding L15, and a filter capacitor located between the dotted terminal of the fourth inductor winding L14 and the dotted terminal of the fifth inductor winding L15.

It may be understood from a circuit structure of the power conversion device 1 shown in FIG. 5*c* that the power conversion device 1 shown in FIG. 5*c* is applicable to an application scenario in which a single-phase input and a three-phase output are used and two-stage filter inductors are at both an input end and an output end. It may be understood from an energy flow direction after the power conversion device 1 operates that the first inductor winding L11, the second inductor winding L12, the sixth inductor winding L16, and the seventh inductor winding L17 may filter an alternating current input by an alternating current power grid, to better reduce electromagnetic interference of the alternating current input by the alternating current power grid, and may also better suppress switching ripples at an input side of the AC/AC circuit 11, to prevent switching noise from interfering with a power grid side device. The second inductor winding L12, the third inductor winding L13, the fourth inductor winding L14, the fifth inductor winding L15, the seventh inductor winding L17, the eighth inductor winding L18, the ninth inductor winding L19, and the tenth inductor winding L110 may filter an alternating current output by the AC/AC circuit 11, to obtain an alternating current that meets a noise requirement for normal operation of the alternating current load and has lower noise. Therefore, it may be understood that the first filter inductor L1 and the second filter inductor L2 can implement functions of a two-stage filter inductor at an input end and a two-stage filter inductor at an output end of an AC/AC power supply with a single-phase input and a three-phase output in the conventional technology.

In addition, it is assumed that an input current and an output current of the power conversion device 1 are respectively I1 and I2. It may be understood from an energy flow direction of the power conversion device 1 that a through current of a branch (such as circuit between a node J6 and a common end in/out of the AC/AC circuit 11) on which the seventh inductor winding L17 and the second inductor winding L12 are located is |I1-I2|. Similarly, it may be understood, from an energy flow direction and a circuit structure of the AC/AC power supply with the single-phase input and the three-phase output and with the two-stage filter inductors at both the input end and the output end in the conventional technology, that in the conventional technology, a through current of a branch (such as a circuit between an input end inN of the AC/AC power supply and the common end in/out of the AC/AC circuit) on which two inductor windings corresponding to the seventh inductor winding L17 and the second inductor winding L12 are located is I1. It is clear that the through current of the branch on which the second inductor winding L12 and the seventh inductor winding L17 are located in the power conversion device 1 is greatly reduced in comparison with the through current of the branch on which the two corresponding inductor windings are located in the conventional technology. Therefore, the second inductor winding L12 and the seventh inductor winding L17 in the power conversion device 1 each may use a thinner copper wire or cable, and a connection line between the node J6 and the common end in/out of the AC/AC circuit may use a thinner cable. This can greatly reduce circuit costs of the power conversion device 1.

In this embodiment, the first filter inductor L1 and the second filter inductor L2 reduce two inductor windings and two inductor magnetic cores in comparison with the two-stage filter inductor at the input end and the two-stage filter inductor at the output end of the AC/AC power supply with the single-phase input and the three-phase output in the conventional technology, thereby reducing a volume of the power conversion device 1, and reducing the circuit costs of the power conversion device 1. In addition, the second inductor winding L12 and the seventh inductor winding L17 each are an inductor winding shared by a filter inductor at an input end and a filter inductor at an output end, and a through current of the shared inductor winding is greatly reduced in comparison with a through current of the two corresponding inductor windings in the conventional technology. Therefore, this can effectively reduce circuit costs of the second inductor winding L12, the seventh inductor winding L17, and a connection line corresponding to the second inductor winding L12 and the seventh inductor winding L17, and further reduce the circuit costs of the power conversion device 1.

Figure 5D:
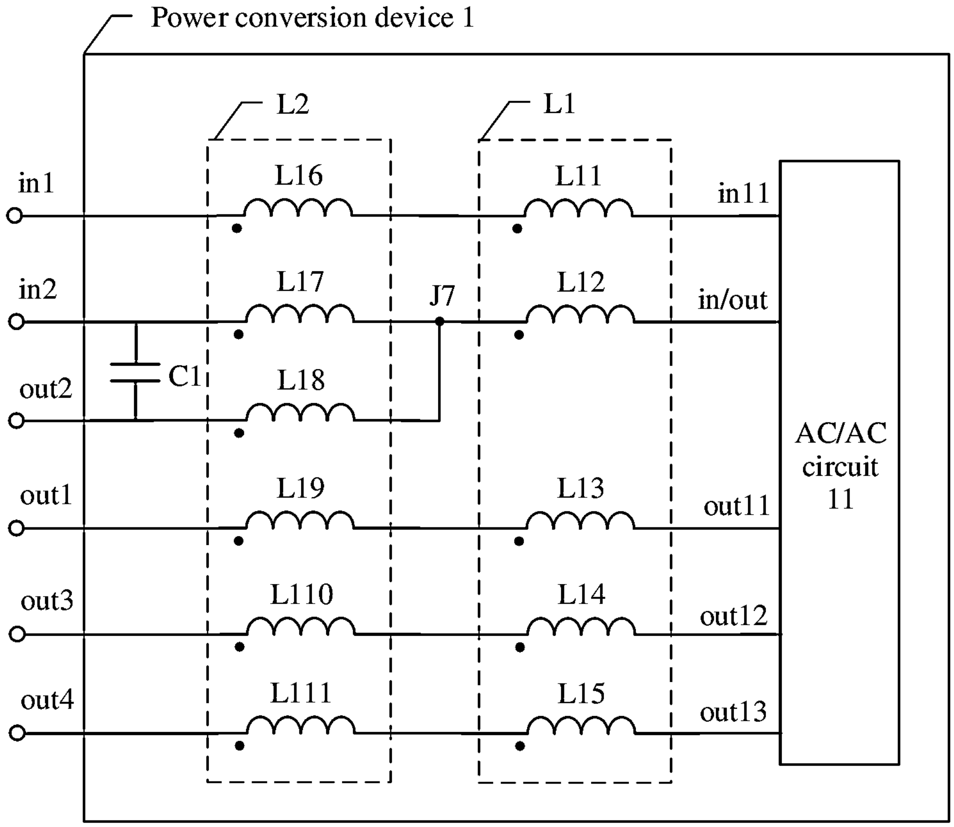
FIG. 5*d* is a schematic diagram of another structure of a power conversion device.

FIG. 5*d* is a schematic diagram of another structure of a power conversion device. Compared with the power conversion device 1 shown in FIG. 5*c*, in the power conversion device shown in FIG. 5*d*, a second filter inductor L2 shown in FIG. 5*d* is different from the second filter inductor L2 shown in FIG. 5*c*. The second filter inductor L2 includes a sixth inductor winding L16, a seventh inductor winding L17, an eighth inductor winding L18, a ninth inductor winding L19, a tenth inductor winding L110, an eleventh inductor winding L111, and a second inductor magnetic core. The sixth inductor winding L16, the seventh inductor winding L17, the eighth inductor winding L18, the ninth inductor winding L19, the tenth inductor winding L110, and the eleventh inductor winding L111 are all wound around the second inductor magnetic core. A first end of a first inductor winding L11 is connected to a first input end in1 of the power conversion device 1 through the sixth inductor winding L16, a first end of a second inductor winding L12 is connected to a second input end in2 of the power conversion device 1 through the seventh inductor winding L17, the first end of the second inductor winding L12 is connected to a second output end out2 of the power conversion device 1 through the eighth inductor winding L18, a first end of a third inductor winding L13 is connected to a first output end out1 of the power conversion device 1 through the ninth inductor winding L19, a first end of a fourth inductor winding L14 is connected to a third output end out3 of the power conversion device 1 through the tenth inductor winding L110, and a first end of a fifth inductor winding L15 is connected to a fourth output end out4 of the power conversion device through the eleventh inductor winding L111.

Herein, for other circuit elements except the second filter inductor L2 in the power conversion device 1 shown in FIG. 5*d* and connection relationships of the other circuit elements, refer to descriptions of corresponding parts in the power conversion device 1 shown in FIG. 5*c*. Details are not described herein again.

The power conversion device 1 further includes a first filter capacitor C1. For example, the first filter capacitor C1 is located between the second input end in2 and the second output end out2 of the power conversion device 1. Optionally, the first filter capacitor C1 may be alternatively located between the first input end in1 and the first output end out1 of the power conversion device 1, located between an undotted terminal of the first inductor winding L11 and an undotted terminal of the third inductor winding L13, or located between a dotted terminal of the first inductor winding L11 and a dotted terminal of the third inductor winding L13. It may be understood that the first filter capacitor C1 in the power conversion device 1 has various locations, so that the power conversion device 1 has various structures and high flexibility.

To better achieve filtering effect on an input current and an output current of the power conversion device 1, the power conversion device 1 may further appropriately add a filter capacitor. For example, the power conversion device 1 may further add at least one of the following filter capacitors: a filter capacitor located between the undotted terminal of the first inductor winding L11 and the undotted terminal of the third inductor winding L13, a filter capacitor located between the dotted terminal of the first inductor winding L11 and the dotted terminal of the third inductor winding L13, a filter capacitor located between the first input end in1 of the power conversion device 1 and a ground cable PE, a filter capacitor located between the second input end in2 of the power conversion device 1 and the ground cable PE, a filter capacitor located between the first output end out1 of the power conversion device 1 and the ground cable PE, a filter capacitor located between the second output end out2 of the power conversion device 1 and the ground cable PE, a filter capacitor located between the third output end out3 of the power conversion device 1 and the ground cable PE, a filter capacitor located between the fourth output end out4 of the power conversion device 1 and the ground cable PE, a filter capacitor located between the first input end in1 and the second input end in2 of the power conversion device 1, a filter capacitor located between the first output end out1 and the second output end out2 of the power conversion device 1, a filter capacitor located between the third output end out3 and the second output end out2 of the power conversion device 1, a filter capacitor located between the fourth output end out4 and the second output end out2 of the power conversion device 1, a filter capacitor located between the first output end out1 and the third output end out3 of the power conversion device 1, a filter capacitor located between the first output end out1 and the fourth output end out4 of the power conversion device 1, a filter capacitor located between the third output end out3 and the fourth output end out4 of the power conversion device 1, a filter capacitor located between the undotted terminal of the first inductor winding L11 and the ground cable PE, a filter capacitor located between the undotted terminal of the second inductor winding L12 and the ground cable PE, a filter capacitor located between the undotted terminal of the third inductor winding L13 and the ground cable PE, a filter capacitor located between an undotted terminal of the fourth inductor winding L14 and the ground cable PE, a filter capacitor located between an undotted terminal of the fifth inductor winding L15 and the ground cable PE, a filter capacitor located between the undotted terminal of the first inductor winding L11 and the undotted terminal of the second inductor winding L12, a filter capacitor located between the undotted terminal of the third inductor winding L13 and the undotted terminal of the second inductor winding L12, a filter capacitor located between the undotted terminal of the fourth inductor winding L14 and the undotted terminal of the second inductor winding L12, a filter capacitor located between the undotted terminal of the fifth inductor winding L15 and the undotted terminal of the second inductor winding L12, a filter capacitor located between the undotted terminal of the third inductor winding L13 and the undotted terminal of the fourth inductor winding L14, a filter capacitor located between the undotted terminal of the third inductor winding L13 and the undotted terminal of the fifth inductor winding L15, a filter capacitor located between the undotted terminal of the fourth inductor winding L14 and the undotted terminal of the fifth inductor winding L15, a filter capacitor located between the dotted terminal of the first inductor winding L11 and the ground cable PE, a filter capacitor located between the dotted terminal of the second inductor winding L12 and the ground cable PE, a filter capacitor located between the dotted terminal of the third inductor winding L13 and the ground cable PE, a filter capacitor located between the dotted terminal of the first inductor winding L11 and the dotted terminal of the second inductor winding L12, a filter capacitor located between the dotted terminal of the third inductor winding L13 and the dotted terminal of the second inductor winding L12, a filter capacitor located between a dotted terminal of the fourth inductor winding L14 and the dotted terminal of the second inductor winding L12, a filter capacitor located between a dotted terminal of the fifth inductor winding L15 and the dotted terminal of the second inductor winding L12, a filter capacitor located between the dotted terminal of the third inductor winding L13 and the dotted terminal of the fourth inductor winding L14, a filter capacitor located between the dotted terminal of the third inductor winding L13 and the dotted terminal of the fifth inductor winding L15, and a filter capacitor located between the dotted terminal of the fourth inductor winding L14 and the dotted terminal of the fifth inductor winding L15.

It may be understood from a circuit structure of the power conversion device 1 shown in FIG. 5*d* that the power conversion device 1 shown in FIG. 5*d* is also applicable to an application scenario in which a single-phase input and a three-phase output are used and two-stage filter inductors are at both an input end and an output end. It may be understood from an energy flow direction after the power conversion device 1 operates that the first inductor winding L11, the second inductor winding L12, the sixth inductor winding L16, and the seventh inductor winding L17 may filter an alternating current input by an alternating current power grid, to better reduce electromagnetic interference of the alternating current input by the alternating current power grid, and may also better suppress switching ripples at an input side of an AC/AC circuit 11, to prevent switching noise from interfering with a power grid side device. The second inductor winding L12, the third inductor winding L13, the fourth inductor winding L14, the fifth inductor winding L15, the eighth inductor winding L18, the ninth inductor winding L19, the tenth inductor winding L110, and the eleventh inductor winding L111 may filter an alternating current output by the AC/AC circuit 11, to obtain an alternating current that meets a noise requirement for normal operation of an alternating current load and has lower noise. Therefore, it may be understood that a first filter inductor L1 and the second filter inductor L2 can implement functions of a two-stage filter inductor at an input end and a two-stage filter inductor at an output end of an AC/AC power supply with a single-phase input and a three-phase output in the conventional technology.

In addition, it is assumed that an input current and an output current of the power conversion device 1 are respectively I1 and I2. It may be understood from an energy flow direction of the power conversion device 1 that a through current of a branch (such as a circuit between a node J7 and a common end in/out of the AC/AC circuit 11) on which the second inductor winding L12 is located is |I1-I2|. Similarly, it may be understood, from an energy flow direction and a circuit structure of the AC/AC power supply with the single-phase input and the three-phase output and with the two-stage filter inductors at both the input end and the output end in the conventional technology, that in the conventional technology, a through current of a branch (such as a circuit between an input end inN of the AC/AC power supply and the common end in/out of the AC/AC circuit) on which an inductor winding Lin2 corresponding to the second inductor winding L12 is located is I1. It is clear that the through current of the branch on which the second inductor winding L12 is located in the power conversion device 1 is greatly reduced in comparison with the through current of the branch on which the corresponding inductor winding Lin2 is located in the conventional technology. Therefore, the second inductor winding L12 in the power conversion device 1 may use a thinner copper wire or cable, and a connection line between the node J7 and the common end in/out of the AC/AC circuit 11 may use a thinner cable. This can greatly reduce circuit costs of the power conversion device 1.

In this embodiment, the first filter inductor L1 and the second filter inductor L2 reduce one inductor winding and two inductor magnetic cores in comparison with the two-stage filter inductor at the input end and the two-stage filter inductor at the output end of the AC/AC power supply with the single-phase input and the three-phase output in the conventional technology, thereby reducing a volume of the power conversion device 1, and reducing the circuit costs of the power conversion device 1. In addition, the second inductor winding L12 is an inductor winding shared by a filter inductor at the input end and a filter inductor at the output end, and a through current of the shared inductor winding is greatly reduced in comparison with a through current of the corresponding inductor winding Lin2 in the conventional technology. Therefore, this can effectively reduce circuit costs of the second inductor winding L12 and a connection line corresponding to the second inductor winding L12, and further reduce the circuit costs of the power conversion device 1.

Figure 6A:
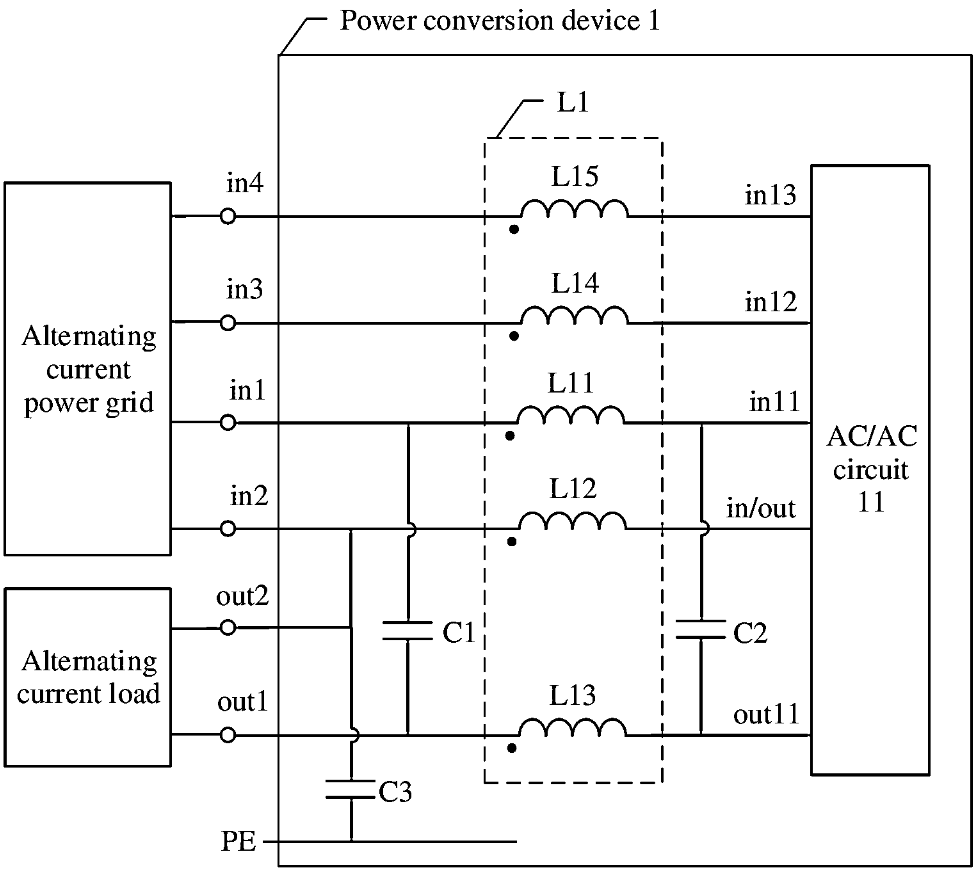
FIG. 6*a* is a schematic diagram of another structure of a power conversion device.

FIG. 6*a* is a schematic diagram of another structure of a power conversion device. Compared with the power conversion device 1 shown in FIG. 3*a*, in the power conversion device 1 shown in FIG. 6*a*, an alternating current input end further includes a third input end in3 and a fourth input end in4, a first filter inductor L1 further includes a fourth inductor winding L14 and a fifth inductor winding L15, and an input end of an AC/AC circuit 11 further includes a second input end in12 and a third input end in13. A first end of the fourth inductor winding L14 is connected to the third input end in3 of the power conversion device 1, a second end of the fourth inductor winding L14 is connected to the second input end in12 of the AC/AC circuit 11, a first end of the fifth inductor winding L15 is connected to the fourth input end in4 of the power conversion device 1, and a second end of the fifth inductor winding L15 is connected to the third input end in13 of the AC/AC circuit 11. A first end of each inductor winding may be a dotted terminal, and correspondingly, a second end of each inductor winding is an undotted terminal.

The power conversion device 1 further includes a first filter capacitor C1, a second filter capacitor C2, and a third filter capacitor C3. For descriptions of the first filter capacitor C1, the second filter capacitor C2, and the third filter capacitor C3, refer to descriptions of corresponding parts in the power conversion device 1 shown in FIG. 3*b*. Details are not described herein again.

To better achieve filtering effect on an input current and an output current of the power conversion device 1, the power conversion device 1 may further appropriately add a filter capacitor. For example, the power conversion device 1 may further add at least one of the following filter capacitors: a filter capacitor located between a first input end in1 of the power conversion device 1 and a ground cable PE, a filter capacitor located between the third input end in3 of the power conversion device 1 and the ground cable PE, a filter capacitor located between the fourth input end in4 of the power conversion device 1 and the ground cable PE, a filter capacitor located between a first output end out1 of the power conversion device 1 and the ground cable PE, a filter capacitor located between the first input end in1 and a second input end in2 of the power conversion device 1, a filter capacitor located between the third input end in3 and the second input end in2 of the power conversion device 1, a filter capacitor located between the fourth input end in4 and the second input end in2 of the power conversion device 1, a filter capacitor located between the first input end in1 and the third input end in3 of the power conversion device 1, a filter capacitor located between the first input end in1 and the fourth input end in4 of the power conversion device 1, a filter capacitor between the third input end in3 and the fourth input end in4 of the power conversion device 1, a filter capacitor located between the first output end out1 and a second output end out2 of the power conversion device 1, a filter capacitor located between an undotted terminal of a first inductor winding L11 and the ground cable PE, a filter capacitor located between an undotted terminal of a second inductor winding L12 and the ground cable PE, a filter capacitor located between an undotted terminal of a third inductor winding L13 and the ground cable PE, a filter capacitor located between an undotted terminal of the fourth inductor winding L14 and the ground cable PE, a filter capacitor located between an undotted terminal of the fifth inductor winding L15 and the ground cable PE, a filter capacitor located between the undotted terminal of the first inductor winding L11 and the undotted terminal of the second inductor winding L12, a filter capacitor located between the undotted terminal of the second inductor winding L12 and the undotted terminal of the fourth inductor winding L14, a filter capacitor located between the undotted terminal of the second inductor winding L12 and the undotted terminal of the fifth inductor winding L15, a filter capacitor located between the undotted terminal of the first inductor winding L11 and the undotted terminal of the fourth inductor winding L14, a filter capacitor located between the undotted terminal of the fourth inductor winding L14 and the undotted terminal of the fifth inductor winding L15, a filter capacitor located between the undotted terminal of the first inductor winding L11 and the undotted terminal of the fifth inductor winding L15, a filter capacitor located between the undotted terminal of the second inductor winding L12 and the undotted terminal of the third inductor winding L13, a filter capacitor located between a dotted terminal of the first inductor winding L11 and the ground cable PE, a filter capacitor located between a dotted terminal of the second inductor winding L12 and the ground cable PE, a filter capacitor located between a dotted terminal of the third inductor winding L13 and the ground cable PE, a filter capacitor located between a dotted terminal of the fourth inductor winding L14 and the ground cable PE, a filter capacitor located between a dotted terminal of the fifth inductor winding L15 and the ground cable PE, a filter capacitor located between the dotted terminal of the first inductor winding L11 and the dotted terminal of the second inductor winding L12, a filter capacitor located between the dotted terminal of the second inductor winding L12 and the dotted terminal of the fourth inductor winding L14, a filter capacitor located between the dotted terminal of the second inductor winding L12 and the dotted terminal of the fifth inductor winding L15, a filter capacitor located between the dotted terminal of the first inductor winding L11 and the dotted terminal of the fourth inductor winding L14, a filter capacitor located between the dotted terminal of the fourth inductor winding L14 and the dotted terminal of the fifth inductor winding L15, a filter capacitor located between the dotted terminal of the first inductor winding L11 and the dotted terminal of the fifth inductor winding L15, and a filter capacitor located between the dotted terminal of the second inductor winding L12 and the dotted terminal of the third inductor winding L13.

Figure 6B:
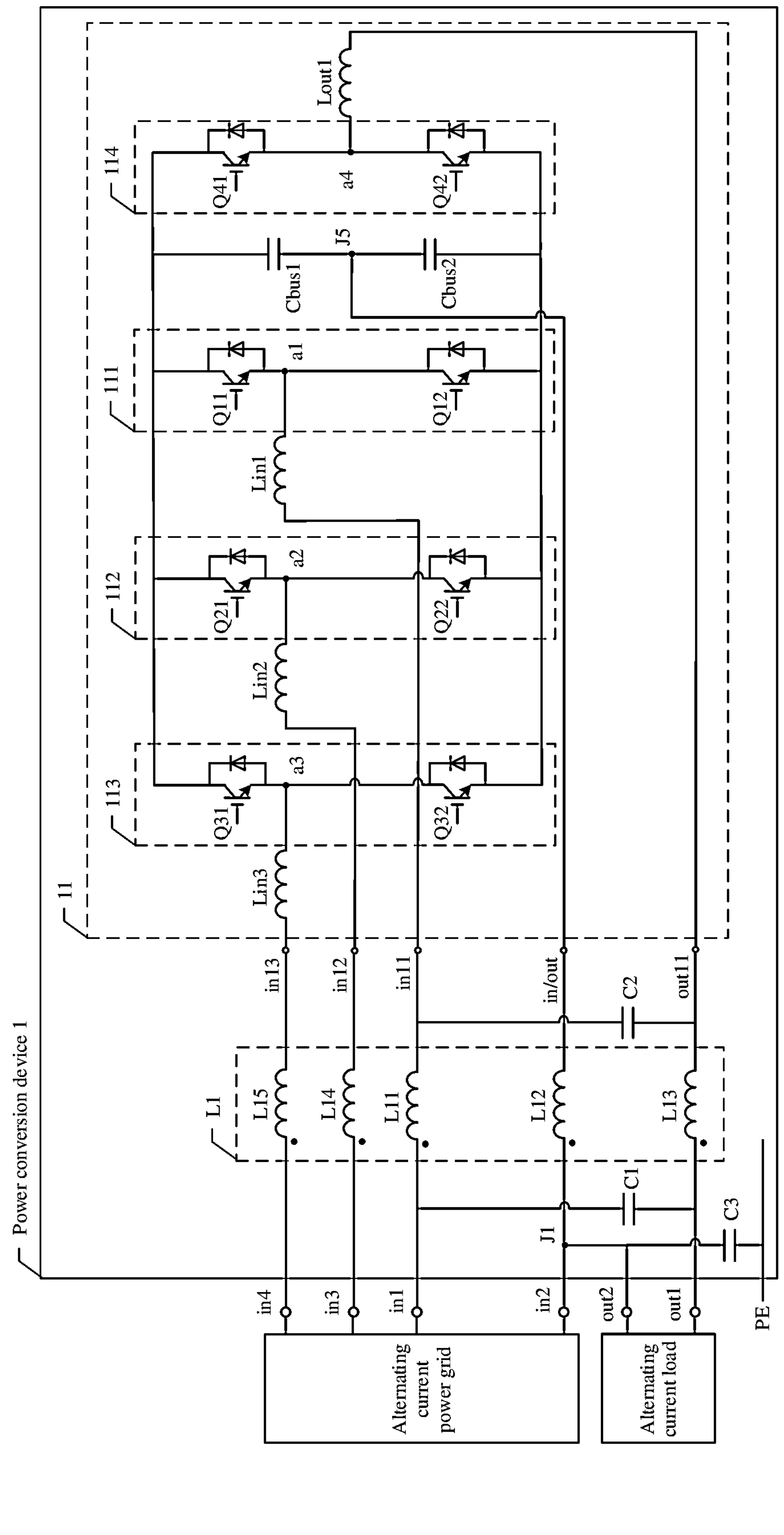
FIG. 6*b* is a schematic diagram of another structure of a power conversion device.

Herein, an AC/AC circuit 11 shown in FIG. 6*b* may be used as the AC/AC circuit 11. As shown in FIG. 6*b*, the AC/AC circuit 11 includes a first phase bridge arm 111, a second phase bridge arm 112, a third phase bridge arm 113, a fourth phase bridge arm 114, a first bus capacitor Cbus1, a second bus capacitor Cbus2, a first inductor Lin1, a second inductor Lin2, a third inductor Lin3, and a fourth inductor Lout1. The first phase bridge arm 111, the second phase bridge arm 112, the third phase bridge arm 113, and the fourth phase bridge arm 114 are connected in parallel to each other. A switching transistor Q11 and a switching transistor Q12 are connected in series to form the first phase bridge arm 111, a switching transistor Q21 and a switching transistor Q22 are connected in series to form the second phase bridge arm 112, a switching transistor Q31 and a switching transistor Q32 are connected in series to form the third phase bridge arm 113, and a switching transistor Q41 and a switching transistor Q42 are connected in series to form the fourth phase bridge arm 114. The first bus capacitor Cbus1 and the second bus capacitor Cbus2 are connected in series and then connected in parallel to two ends of the first phase bridge arm 111, and a serial connection part J5 of the first bus capacitor Cbus1 and the second bus capacitor Cbus2 is connected to a common end in/out of the AC/AC circuit 11. A midpoint a1 of the first phase bridge arm 111, such as a serial connection part of the switching transistor Q11 and the switching transistor Q12, is connected to a first input end in11 of the AC/AC circuit 11 through the first inductor Lin1. A midpoint a2 of the second phase bridge arm 112, such as a serial connection part of the switching transistor Q21 and the switching transistor Q22, is connected to a second input end in12 of the AC/AC circuit 11 through the second inductor Lin2. A midpoint a3 of the third phase bridge arm 113, such as a serial connection part of the switching transistor Q31 and the switching transistor Q32, is connected to a third input end in13 of the AC/AC circuit 11 through the third inductor Lin3. A midpoint a4 of the fourth phase bridge arm 114, such as a serial connection part of the switching transistor Q41 and the switching transistor Q42, is connected to a first output end out11 of the AC/AC circuit 11 through the fourth inductor Lout1.

After the power conversion device 1 operates, three-phase alternating current energy of an alternating current power grid is input to the power conversion device 1 from the first input end in1, the third input end in3, and the fourth input end in4 of the power conversion device 1, flows through the first inductor winding L11, the fourth inductor winding L14, the fifth inductor winding L15, and the second inductor winding L12, then flows into the AC/AC circuit 11 from the first input end in11, the second input end in12, the third input end in13, and the common end in/out of the AC/AC circuit 11, and then is rectified by the first phase bridge arm 111, the second phase bridge arm 112, and the third phase bridge arm 113. It is clear that the first inductor winding L11, the second inductor winding L12, the fourth inductor winding L14, and the fifth inductor winding L15 may filter an alternating current input by the alternating current power grid, to reduce electromagnetic interference of the alternating current input by the alternating current power grid and filter electromagnetic interference of the AC/AC circuit to the alternating current power grid. In addition, energy stored on the first bus capacitor Cbus1 and the second bus capacitor Cbus2 after being rectified by the foregoing bridge arms is output from the first output end out11 and the common end in/out of the AC/AC circuit 11 after being inverted by the fourth phase bridge arm 114 and the first phase bridge arm 111, passes through the third inductor winding L13 and the second inductor winding L12, and then flows into an alternating current load. It is clear that the second inductor winding L12 and the third inductor winding L13 may filter an alternating current output by the AC/AC circuit 11, to obtain an alternating current that meets a noise requirement for normal operation of the alternating current load. Therefore, it may be understood that the first filter inductor L1 can implement functions of an input filter inductor with four inductor windings and an output filter inductor with two inductor windings in an AC/AC power supply with a three-phase input and a single-phase output in the conventional technology.

In addition, it is assumed that an input current and an output current of the power conversion device 1 are respectively I1 and I2. It may be understood from an energy flow direction of the power conversion device 1 that a through current of a branch (such as a circuit between a node J1 and a node J5) on which the second inductor winding L12 is located is |I1-I2|. Similarly, it may be understood, from an energy flow direction and a circuit structure of the AC/AC power supply with the three-phase input and the single-phase output in the conventional technology, that in the conventional technology, a through current of a branch (such as a circuit between an input end inN of the AC/AC power supply and the common end in/out of the AC/AC circuit) on which an inductor winding Lin2 is located is I1. It is clear that the through current of the branch on which the second inductor winding L12 is located in the power conversion device 1 is greatly reduced in comparison with the through current of the branch on which the inductor winding Lin2 is located in the conventional technology. Therefore, the second inductor winding L12 in the power conversion device 1 may use a thinner copper wire or cable, and a connection line between the node J1 and the node J5 may use a thinner cable. This can greatly reduce circuit costs of the power conversion device 1.

In this embodiment, the first filter inductor L1 not only can implement the functions of the input filter inductor and the output filter inductor of the AC/AC power supply with the three-phase input and the single-phase output in the conventional technology, but also reduces one inductor winding and one inductor magnetic core in comparison with the input filter inductor and the output filter inductor of the AC/AC power supply with the three-phase input and the single-phase output in the conventional technology, thereby reducing a volume of the power conversion device 1, and reducing the circuit costs of the power conversion device 1. In addition, the second inductor winding L12 is an inductor winding shared by a filter inductor at the input end and a filter inductor at the output end, and a through current of the shared inductor winding is greatly reduced in comparison with a through current of the corresponding inductor winding Lin2 in the conventional technology. Therefore, this can effectively reduce circuit costs of the second inductor winding L12 and a connection line corresponding to the second inductor winding L12, and further reduce the circuit costs of the power conversion device 1. In addition, the second inductor winding L2 is the shared inductor winding, to connect the second input end in2 and the second output end out2 of the power conversion device 1, so that the third filter capacitor C3 may be equivalent to filter capacitors Cin3 and Cout3 in the conventional technology. Therefore, the power conversion device 1 can reduce one filter capacitor in comparison with the AC/AC power supply in the conventional technology, to further reduce the circuit costs of the power conversion device 1.

Figure 6C:
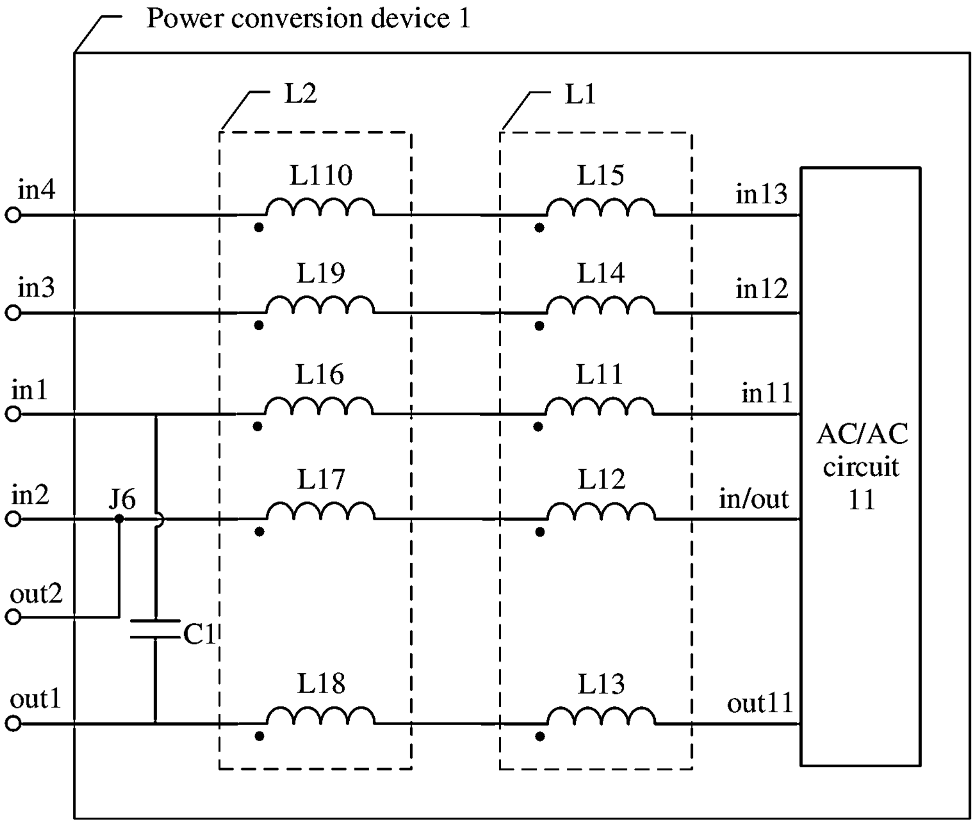
FIG. 6*c* is a schematic diagram of another structure of a power conversion device.

FIG. 6*c* is a schematic diagram of another structure of a power conversion device. Compared with the power conversion device 1 shown in FIG. 6*a*, the power conversion device 1 shown in FIG. 6*c* further includes a second filter inductor L2. As shown in FIG. 6*c*, the second filter inductor L2 includes a sixth inductor winding L16, a seventh inductor winding L17, an eighth inductor winding L18, a ninth inductor winding L19, a tenth inductor winding L110, and a second inductor magnetic core.

The sixth inductor winding L16, the seventh inductor winding L17, the eighth inductor winding L18, the ninth inductor winding L19, and the tenth inductor winding L110 are all wound around the second inductor magnetic core. A first end of a first inductor winding L11 is connected to a first input end in1 of the power conversion device 1 through the sixth inductor winding L16, a first end of a second inductor winding L12 is connected to a second input end in2 and a second output end out2 of the power conversion device 1 through the seventh inductor winding L17, a first end of a third inductor winding L13 is connected to a first output end out of the power conversion device through the eighth inductor winding L18, a first end of a fourth inductor winding L14 is connected to a third input end in3 of the power conversion device 1 through the ninth inductor winding L19, and a first end of a fifth inductor winding L15 is connected to a fourth input end in4 of the power conversion device 1 through the tenth inductor winding L110.

A first end of each inductor winding may be a dotted terminal, and correspondingly, a second end of each inductor winding is an undotted terminal. Herein, for a connection relationship between each inductor winding in a first filter inductor L1 and an AC/AC circuit 11, a circuit element included in the AC/AC circuit 11, and a connection relationship of the circuit element, refer to descriptions of corresponding parts in the power conversion devices 1 shown in FIG. 6*a* and FIG. 6*b*. Details are not described herein again.

Optionally, a first filter capacitor C1 may be alternatively located between an undotted terminal of the first inductor winding L11 and an undotted terminal of the third inductor winding L13 or located between a dotted terminal of the first inductor winding L11 and a dotted terminal of the third inductor winding L13. It may be understood that the first filter capacitor C1 in the power conversion device 1 has various locations, so that the power conversion device 1 has various structures and high flexibility.

To better achieve filtering effect on an input current and an output current of the power conversion device 1, the power conversion device 1 may further appropriately add a filter capacitor. For example, the power conversion device 1 may further add at least one of the following filter capacitors: a filter capacitor located between the first input end in1 of the power conversion device 1 and a ground cable PE, a filter capacitor located between the second input end in2 of the power conversion device 1 and the ground cable PE, a filter capacitor located between the third input end in3 of the power conversion device 1 and the ground cable PE, a filter capacitor located between the fourth input end in4 of the power conversion device 1 and the ground cable PE, a filter capacitor located between the first output end out1 of the power conversion device 1 and the ground cable PE, and other filter capacitors connected to inductor windings in the first filter inductor L1. Herein, for locations of the other filter capacitors connected to the inductor windings in the first filter inductor L1, refer to descriptions of corresponding parts in the power conversion device 1 shown in FIG. 5*c*. Details are not described herein again.

It may be understood from a circuit structure of the power conversion device 1 shown in FIG. 6*c* that the power conversion device 1 shown in FIG. 6*c* is applicable to an application scenario in which a three-phase input and a single-phase output are used and two-stage filter inductors are at both an input end and an output end. It may be understood from an energy flow direction after the power conversion device 1 operates that the first inductor winding L11, the second inductor winding L12, the fourth inductor winding L14, the fifth inductor winding L15, the sixth inductor winding L16, the seventh inductor winding L17, the ninth inductor winding L19, and the tenth inductor winding L110 may filter an alternating current input by an alternating current power grid, to better reduce electromagnetic interference of the alternating current input by the alternating current power grid, and may also better suppress switching ripples at an input side of the AC/AC circuit 11, to prevent switching noise from interfering with a power grid side device. The second inductor winding L12, the third inductor winding L13, the seventh inductor winding L17, and the eighth inductor winding L18 may filter an alternating current output by the AC/AC circuit 11, to obtain an alternating current that meets a noise requirement for normal operation of the alternating current load and has lower noise. Therefore, it may be understood that the first filter inductor L1 and the second filter inductor L2 can implement functions of a two-stage filter inductor at an input end and a two-stage filter inductor at an output end of an AC/AC power supply with a three-phase input and a single-phase output in the conventional technology.

In addition, it is assumed that an input current and an output current of the power conversion device 1 are respectively I1 and I2. It may be understood from an energy flow direction of the power conversion device 1 that a through current of a branch (such as a circuit between a node J6 and a common end in/out of the AC/AC circuit 11) on which the seventh inductor winding L17 and the second inductor winding L12 are located is |I1-I2|. Similarly, it may be understood, from an energy flow direction and a circuit structure of the AC/AC power supply with the three-phase input and the single-phase output and with the two-stage filter inductors at both the input end and the output end in the conventional technology, that in the conventional technology, a through current of a branch (such as a circuit between an input end inN of the AC/AC power supply and the common end in/out of the AC/AC circuit) on which two inductor windings corresponding to the seventh inductor winding L17 and the second inductor winding L12 are located is I1. It is clear that the through current of the branch on which the second inductor winding L12 and the seventh inductor winding L17 are located in the power conversion device 1 is greatly reduced in comparison with the through current of the branch on which the two corresponding inductor windings are located in the conventional technology. Therefore, the second inductor winding L12 and the seventh inductor winding L17 in the power conversion device 1 each may use a thinner copper wire or cable, and a connection line between the node J6 and the common end in/out of the AC/AC circuit may use a thinner cable. This can greatly reduce circuit costs of the power conversion device 1.

In this embodiment, the first filter inductor L1 and the second filter inductor L2 reduce two inductor windings and two inductor magnetic cores in comparison with the two-stage filter inductor at the input end and the two-stage filter inductor at the output end of the AC/AC power supply with the three-phase input and the single-phase output in the conventional technology, thereby reducing a volume of the power conversion device 1, and reducing the circuit costs of the power conversion device 1. In addition, the second inductor winding L12 and the seventh inductor winding L17 each are an inductor winding shared by the filter inductor at the input end and the filter inductor at the output end, and a through current of the shared inductor winding is greatly reduced in comparison with a through current of the two corresponding inductor windings in the conventional technology. Therefore, this can effectively reduce circuit costs of the second inductor winding L12, the seventh inductor winding L17, and a connection line corresponding to the second inductor winding L12 and the seventh inductor winding L17, and further reduce the circuit costs of the power conversion device 1.

Figure 6D:
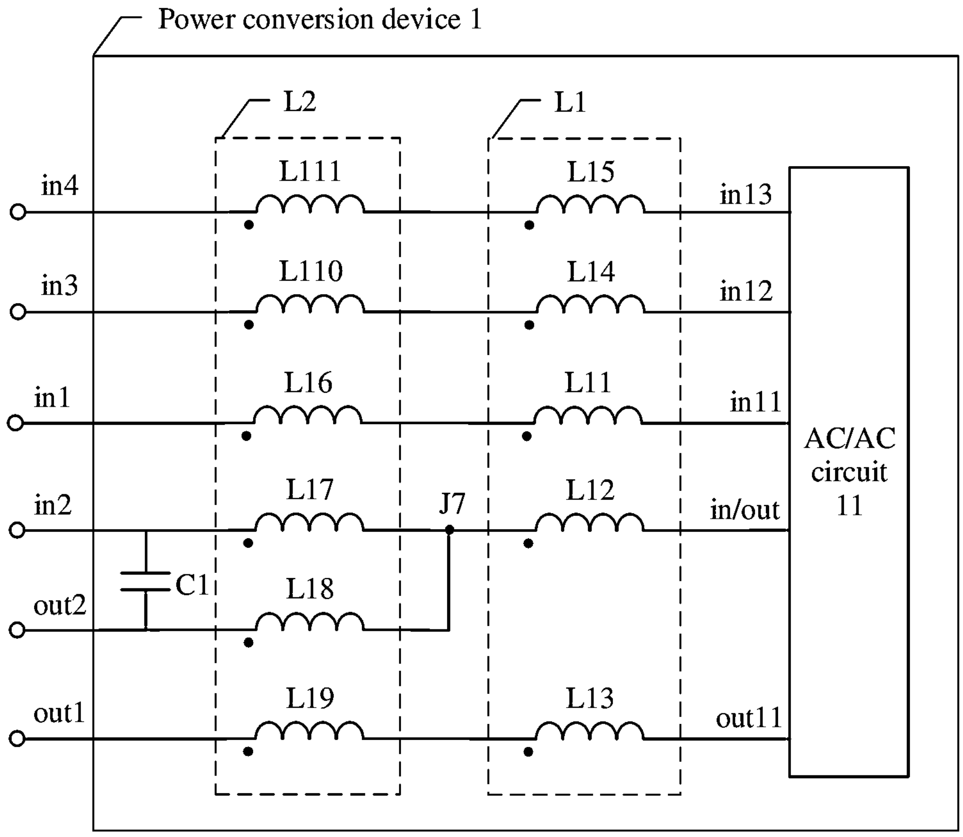
FIG. 6*d* is a schematic diagram of another structure of a power conversion device.

FIG. 6*d* is a schematic diagram of another structure of a power conversion device. Compared with the power conversion device 1 shown in FIG. 6*c*, in the power conversion device shown in FIG. 6*d*, a second filter inductor L2 shown in FIG. 6*d* is different from the second filter inductor L2 shown in FIG. 6*c*. The second filter inductor L2 includes a sixth inductor winding L16, a seventh inductor winding L17, an eighth inductor winding L18, a ninth inductor winding L19, a tenth inductor winding L110, an eleventh inductor winding L111, and a second inductor magnetic core. The sixth inductor winding L16, the seventh inductor winding L17, the eighth inductor winding L18, the ninth inductor winding L19, the tenth inductor winding L110, and the eleventh inductor winding L111 are all wound around the second inductor magnetic core. A first end of a first inductor winding L11 is connected to a first input end in1 of the power conversion device 1 through the sixth inductor winding L16, a first end of a second inductor winding L12 is connected to a second input end in2 of the power conversion device 1 through the seventh inductor winding L17, the first end of the second inductor winding L12 is connected to a second output end out2 of the power conversion device 1 through the eighth inductor winding L18, a first end of a third inductor winding L13 is connected to a first output end out1 of the power conversion device 1 through the ninth inductor winding L19, a first end of a fourth inductor winding L14 is connected to a third input end in3 of the power conversion device 1 through the tenth inductor winding L110, and a first end of a fifth inductor winding L15 is connected to a fourth input end in4 of the power conversion device through the eleventh inductor winding L111.

Herein, for other circuit elements except the second filter inductor L2 in the power conversion device 1 shown in FIG. 6*d* and connection relationships of the other circuit elements, refer to descriptions of corresponding parts in the power conversion device 1 shown in FIG. 6*c*. Details are not described herein again.

The power conversion device 1 further includes a first filter capacitor C1. For example, the first filter capacitor C1 is located between the second input end in2 and the second output end out2 of the power conversion device 1. Optionally, the first filter capacitor C1 may be alternatively located between the first input end in1 and the first output end out1 of the power conversion device 1, located between an undotted terminal of the first inductor winding L11 and an undotted terminal of the third inductor winding L13, or located between a dotted terminal of the first inductor winding L11 and a dotted terminal of the third inductor winding L13. It may be understood that the first filter capacitor C1 in the power conversion device 1 has various locations, so that the power conversion device 1 has various structures and high flexibility.

To better achieve filtering effect on an input current and an output current of the power conversion device 1, the power conversion device 1 may further appropriately add a filter capacitor. For example, the power conversion device 1 may further add at least one of the following filter capacitors: a filter capacitor located between the first input end in1 of the power conversion device 1 and a ground cable PE, a filter capacitor located between the second input end in2 of the power conversion device 1 and the ground cable PE, a filter capacitor located between the third input end in3 of the power conversion device 1 and the ground cable PE, a filter capacitor located between the fourth input end in4 of the power conversion device 1 and the ground cable PE, a filter capacitor located between the first output end out1 of the power conversion device 1 and the ground cable PE, a filter capacitor located between the second output end out2 of the power conversion device 1 and the ground cable PE, a filter capacitor located between the first input end in1 and the second input end in2 of the power conversion device 1, a filter capacitor located between the third input end in3 and the second input end in2 of the power conversion device 1, a filter capacitor located between the fourth input end in4 and the second input end in2 of the power conversion device 1, a filter capacitor located between the first input end in1 and the third input end in3 of the power conversion device 1, a filter capacitor located between the first input end in1 and the fourth input end in4 of the power conversion device 1, a filter capacitor located between the third input end in3 and the fourth input end in3 of the power conversion device 1, a filter capacitor located between the first output end out1 and the second output end out2 of the power conversion device 1, and other filter capacitors connected to inductor windings in a first filter inductor L1. Herein, for locations of the other filter capacitors connected to the inductor windings in the first filter inductor L1, refer to descriptions of corresponding parts in the power conversion device 1 shown in FIG. 5*d*. Details are not described herein again.

It may be understood from a circuit structure of the power conversion device 1 shown in FIG. 6*d* that the power conversion device 1 shown in FIG. 6*d* is also applicable to an application scenario in which a three-phase input and a single-phase output are used and two-stage filter inductors are at both an input end and an output end. It may be understood from an energy flow direction after the power conversion device 1 operates that the first inductor winding L11, the second inductor winding L12, the fourth inductor winding L14, the fifth inductor winding L15, the sixth inductor winding L16, the seventh inductor winding L17, the tenth inductor winding L110, and the eleventh inductor winding L111 may filter an alternating current input by an alternating current power grid, to better reduce electromagnetic interference of the alternating current input by the alternating current power grid, and may also better suppress switching ripples at an input side of an AC/AC circuit 11, to prevent switching noise from interfering with a power grid side device. The second inductor winding L12, the third inductor winding L13, the eighth inductor winding L18, and the ninth inductor winding L19 may filter an alternating current output by the AC/AC circuit 11, to obtain an alternating current that meets a noise requirement for normal operation of an alternating current load and has lower noise. Therefore, it may be understood that the first filter inductor L1 and the second filter inductor L2 can implement functions of a two-stage filter inductor at an input end and a two-stage filter inductor at an output end of an AC/AC power supply with a three-phase input and a single-phase output in the conventional technology.

In addition, it is assumed that an input current and an output current of the power conversion device 1 are respectively I1 and I2. It may be understood from an energy flow direction of the power conversion device 1 that a through current of a branch (such as a circuit between a node J7 and a common end in/out of the AC/AC circuit 11) on which the second inductor winding L12 is located is |I1-I2|. Similarly, it may be understood, from an energy flow direction and a circuit structure of the AC/AC power supply with the three-phase input and the single-phase output and with the two-stage filter inductors at both the input end and the output end in the conventional technology, that in the conventional technology, a through current of a branch (such as a circuit between an input end inN of the AC/AC power supply and the common end in/out of the AC/AC circuit) on which an inductor winding Lin2 corresponding to the second inductor winding L12 is located is I1. It is clear that the through current of the branch on which the second inductor winding L12 is located in the power conversion device 1 is greatly reduced in comparison with the through current of the branch on which the corresponding inductor winding Lin2 is located in the conventional technology. Therefore, the second inductor winding L12 in the power conversion device 1 may use a thinner copper wire or cable, and a connection line between the node J7 and the common end in/out of the AC/AC circuit 11 may use a thinner cable. This can greatly reduce circuit costs of the power conversion device 1.

In this embodiment, the first filter inductor L1 and the second filter inductor L2 reduce one inductor winding and two inductor magnetic cores in comparison with the two-stage filter inductor at the input end and the two-stage filter inductor at the output end of the AC/AC power supply with the three-phase input and the single-phase output in the conventional technology, thereby reducing a volume of the power conversion device 1, and reducing the circuit costs of the power conversion device 1. In addition, the second inductor winding L12 is an inductor winding shared by a filter inductor at the input end and a filter inductor at the output end, and a through current of the shared inductor winding is greatly reduced in comparison with a through current of the corresponding inductor winding Lin2 in the conventional technology. Therefore, this can effectively reduce circuit costs of the second inductor winding L12 and a connection line corresponding to the second inductor winding L12, and further reduce the circuit costs of the power conversion device 1.

Figure 7A:
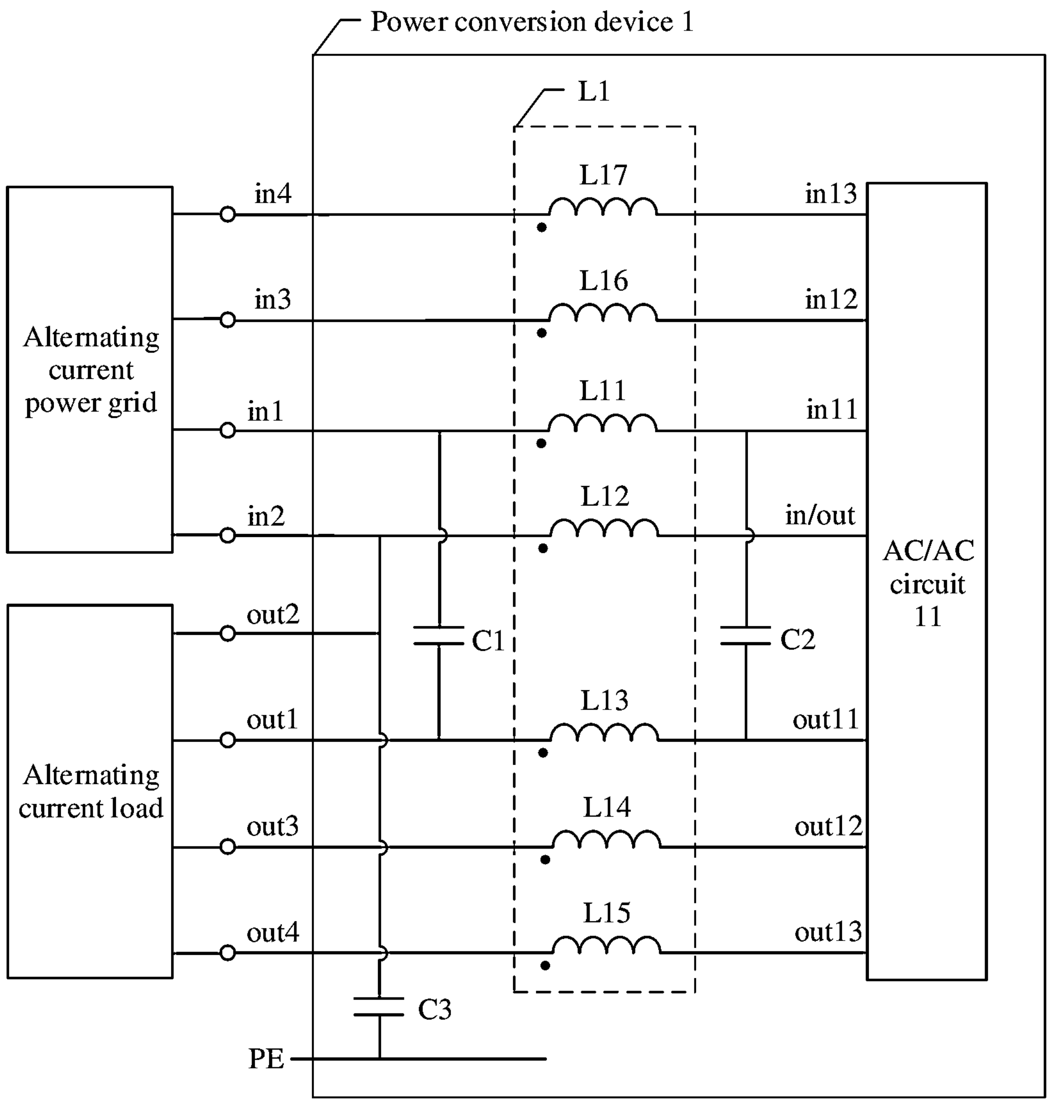
FIG. 7*a* is a schematic diagram of another structure of a power conversion device.

FIG. 7a is a schematic diagram of another structure of a power conversion device. Compared with the power conversion device 1 shown in FIG. 5a, in the power conversion device 1 shown in FIG. 7a, an alternating current input end further includes a third input end in3 and a fourth input end in4, a first filter inductor L1 further includes a sixth inductor winding L16 and a seventh inductor winding L17, and an input end of an AC/AC circuit 11 further includes a second input end in12 and a third input end in13. A first end of the sixth inductor winding L16 is connected to the third input end in3 of the power conversion device 1, a second end of the sixth inductor winding L16 is connected to the second input end in12 of the AC/AC circuit 11, a first end of the seventh inductor winding L17 is connected to the fourth input end in4 of the power conversion device 1, and a second end of the seventh inductor winding L17 is connected to the third input end in13 of the AC/AC circuit 11. A first end of each inductor winding may be a dotted terminal, and correspondingly, a second end of each inductor winding is an undotted terminal.

The power conversion device 1 further includes a first filter capacitor C1, a second filter capacitor C2, and a third filter capacitor C3. For example, the first filter capacitor C1 is located between a first input end in1 and a first output end out1 of the power conversion device 1, the second filter capacitor C2 is located between an undotted terminal of a first inductor winding L11 and an undotted terminal of a third inductor winding L13, and the third filter capacitor C3 is located between a second input end in2 of the power conversion device 1 and a ground cable PE. Optionally, the first filter capacitor C1 may be alternatively located between the third input end in3 and a third output end out3 of the power conversion device 1 or located between the fourth input end in4 and a fourth output end out4 of the power conversion device 1. Optionally, the second filter capacitor C2 may be alternatively located between an undotted terminal of the sixth inductor winding L16 and an undotted terminal of a fourth inductor winding L14 or located between an undotted terminal of the seventh inductor winding L17 and an undotted terminal of a fifth inductor winding L15.

To better achieve filtering effect on an input current and an output current of the power conversion device 1, the power conversion device 1 may further appropriately add a filter capacitor. For example, the power conversion device 1 may further add at least one of the following filter capacitors: a filter capacitor located between the first input end in1 of the power conversion device 1 and the ground cable PE, a filter capacitor located between the third input end in3 of the power conversion device 1 and the ground cable PE, a filter capacitor located between the fourth input end in4 of the power conversion device 1 and the ground cable PE, a filter capacitor located between the first output end out1 of the power conversion device 1 and the ground cable PE, a filter capacitor located between the third output end out3 of the power conversion device 1 and the ground cable PE, a filter capacitor located between the fourth output end out4 of the power conversion device 1 and the ground cable PE, a filter capacitor located between the first input end in1 and the second input end in2 of the power conversion device 1, a filter capacitor located between the third input end in3 and the second input end in2 of the power conversion device 1, a filter capacitor located between the fourth input end in4 and the second input end in2 of the power conversion device 1, a filter capacitor between the first input end in1 and the third input end in3 of the power conversion device 1, a filter capacitor between the first input end in1 and the fourth input end in4 of the power conversion device 1, a filter capacitor between the third input end in3 and the fourth input end in4 of the power conversion device 1, a filter capacitor located between the first output end out1 and the second output end out2 of the power conversion device 1, a filter capacitor located between the third output end out3 and the second output end out2 of the power conversion device 1, a filter capacitor located between the fourth output end out4 and the second output end out2 of the power conversion device 1, a filter capacitor located between the first output end out1 and the third output end out3 of the power conversion device 1, a filter capacitor located between the first output end out1 and the fourth output end out4 of the power conversion device 1, a filter capacitor located between the third output end out3 and the fourth output end out4 of the power conversion device 1, a filter capacitor located between the undotted terminal of the sixth inductor winding L16 and the ground cable PE, a filter capacitor located between the undotted terminal of the seventh inductor winding L17 and the ground cable PE, a filter capacitor located between the undotted terminal of the sixth inductor winding L16 and the undotted terminal of the seventh inductor winding L17, a filter capacitor located between the undotted terminal of the seventh inductor winding L17 and an undotted terminal of a second inductor winding L12, a filter capacitor located between the undotted terminal of the sixth inductor winding L16 and the undotted terminal of the second inductor winding L12, a filter capacitor located between the undotted terminal of the seventh inductor winding L17 and the undotted terminal of the first inductor winding L11, a filter capacitor located between the undotted terminal of the sixth inductor winding L16 and the undotted terminal of the first inductor winding L11, and other filter capacitors connected to other inductor windings except the sixth inductor winding L16 and the seventh inductor winding L17 in the first filter inductor L1. Herein, for location relationships of the other filter capacitors connected to the other inductor windings except the sixth inductor winding L16 and the seventh inductor winding L17 in the first filter inductor L1, refer to descriptions of corresponding parts in the power conversion device 1 shown in FIG. 5a. Details are not described herein again.

Figure 7B:
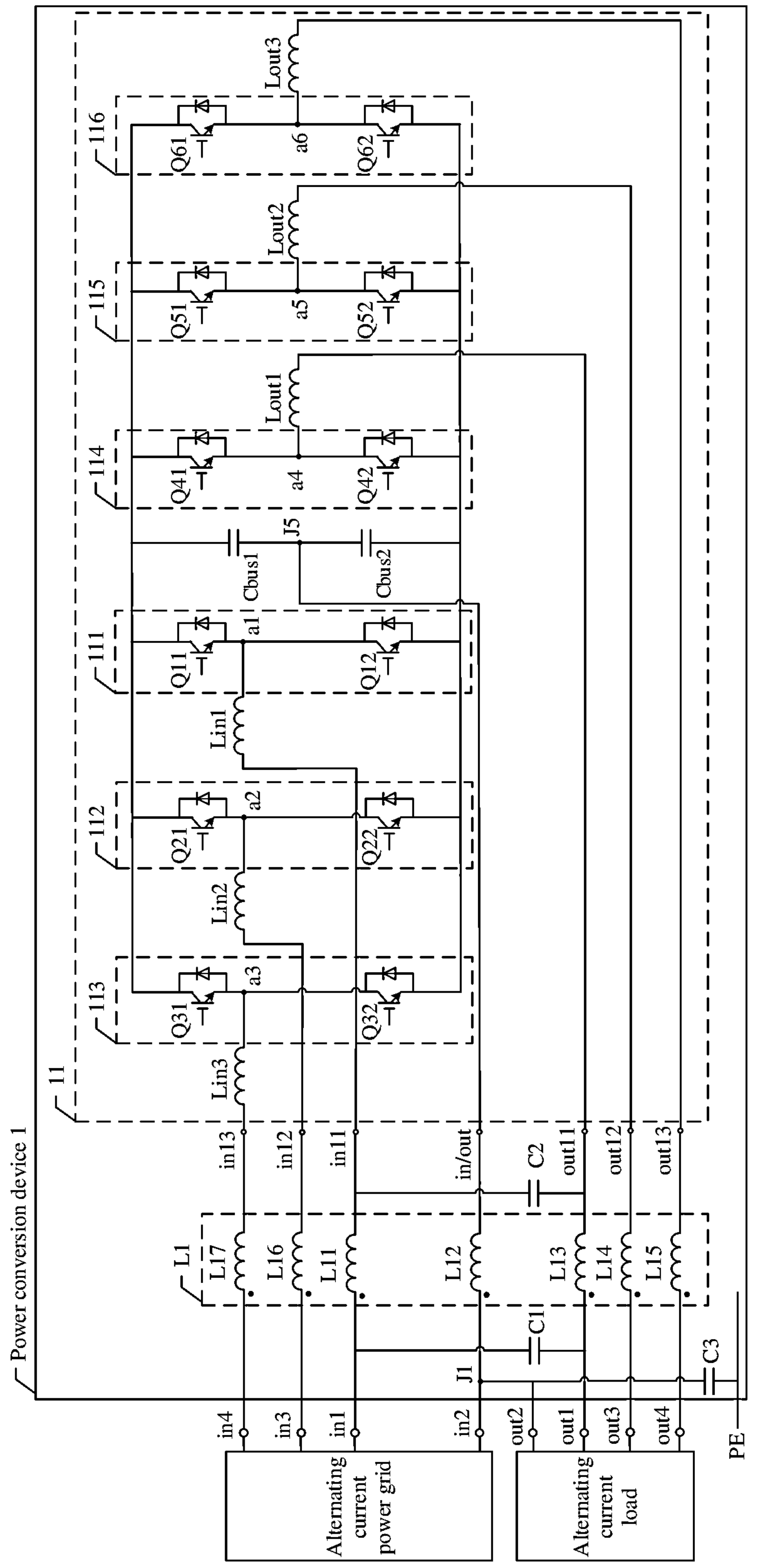
FIG. 7*b* is a schematic diagram of another structure of a power conversion device.

Herein, an AC/AC circuit 11 shown in FIG. 7b may be used as the AC/AC circuit 11. As shown in FIG. 7b, the AC/AC circuit 11 includes a first phase bridge arm 111, a second phase bridge arm 112, a third phase bridge arm 113, a fourth phase bridge arm 114, a fifth phase bridge arm 115, a sixth phase bridge arm 116, a first bus capacitor Cbus1, a second bus capacitor Cbus2, a first inductor Lin1, a second inductor Lin2, a third inductor Lin3, a fourth inductor Lout1, a fifth inductor Lout2, and a sixth inductor Lout3. The first phase bridge arm 111, the second phase bridge arm 112, the third phase bridge arm 113, the fourth phase bridge arm 114, the fifth phase bridge arm 115, and the sixth phase bridge arm 116 are connected in parallel to each other. A switching transistor Q51 and a switching transistor Q52 are connected in series to form the fifth phase bridge arm 115, and a switching transistor Q61 and a switching transistor Q62 are connected in series to form the sixth phase bridge arm 116. A midpoint a5 of the fifth phase bridge arm 115, such as a serial connection part of the switching transistor Q51 and the switching transistor Q52, is connected to a second output end out12 of the AC/AC circuit 11 through the fifth inductor Lout2. A midpoint a6 of the sixth phase bridge arm 116, such as a serial connection part of the switching transistor Q61 and the switching transistor Q62, is connected to a third output end out13 of the AC/AC circuit 11 through the sixth inductor Lout3. Herein, for descriptions of other circuit elements except the fifth phase bridge arm 115 and the sixth phase bridge arm 116 in the AC/AC circuit 11, refer to descriptions of corresponding parts in the power conversion device 1 shown in FIG. 6*b*. Details are not described herein again.

After the power conversion device 1 operates, three-phase alternating current energy of an alternating current power grid is input to the power conversion device 1 from the first input end in1, the second input end in2, the third input end in3, and the fourth input end in4 of the power conversion device 1, flows through the first inductor winding L11, the second inductor winding L12, the sixth inductor winding L16, and the seventh inductor winding L17, then flows into the AC/AC circuit 11 from the first input end in11, the common end in/out, the second input end in12, and the third input end in13 of the AC/AC circuit 11, and then is rectified by the first phase bridge arm 111, the second phase bridge arm 112, and the third phase bridge arm 113. It is clear that the first inductor winding L11, the second inductor winding L12, the sixth inductor winding L16, and the seventh inductor winding L17 may filter an alternating current input by the alternating current power grid, to reduce electromagnetic interference of the alternating current input by the alternating current power grid, and may also suppress switching ripples at an input side of the AC/AC circuit 11, to prevent switching noise from interfering with a power grid side device. In addition, energy stored on the first bus capacitor Cbus1 and the second bus capacitor Cbus2 after being rectified by the foregoing bridge arms is separately output from the common end in/out, the first output end out11, the second output end out12, and the third output end out13 of the AC/AC circuit 11 after being inverted by the fourth phase bridge arm 114, the fifth phase bridge arm 115, and the sixth phase bridge arm 116, passes through the second inductor winding L12, the third inductor winding L13, the fourth inductor winding L14, and the fifth inductor winding L15, and then flows into an alternating current load. It is clear that the second inductor winding L12, the third inductor winding L13, the fourth inductor winding L14, and the fifth inductor winding L15 may filter an alternating current output by the AC/AC circuit 11, to obtain an alternating current that meets a noise requirement for normal operation of the alternating current load. Therefore, it may be understood that the first filter inductor L1 can implement functions of an input filter inductor with four inductor windings and an output filter inductor with four inductor windings in an AC/AC power supply with a three-phase input and a three-phase output in the conventional technology.

In addition, it is assumed that an input current and an output current of the power conversion device 1 are respectively I1 and I2. It may be understood from an energy flow direction of the power conversion device 1 that a through current of a branch (such as a circuit between a node J1 and a node J5) on which the second inductor winding L12 is located is |I1-I2|. Similarly, it may be understood, from an energy flow direction and a circuit structure of the AC/AC power supply with the three-phase input and the three-phase output in the conventional technology, that in the conventional technology, a through current of a branch (such as a circuit between an input end inN of the AC/AC power supply and the common end in/out of the AC/AC circuit) on which an inductor winding Lin2 is located is I1. It is clear that the through current of the branch on which the second inductor winding L12 is located in the power conversion device 1 is greatly reduced in comparison with the through current of the branch on which the inductor winding Lin2 is located in the conventional technology. Therefore, the second inductor winding L12 in the power conversion device 1 may use a thinner copper wire or cable, and a connection line between the node J1 and the node J5 may use a thinner cable. This can greatly reduce circuit costs of the power conversion device 1.

In this embodiment, the first filter inductor L1 not only can implement the functions of the input filter inductor and the output filter inductor of the AC/AC power supply with the three-phase input and the three-phase output in the conventional technology, but also reduces one inductor winding and one inductor magnetic core in comparison with the input filter inductor and the output filter inductor of the AC/AC power supply with the three-phase input and the three-phase output in the conventional technology, thereby reducing a volume of the power conversion device 1, and reducing the circuit costs of the power conversion device 1. In addition, the second inductor winding L12 is an inductor winding shared by a filter inductor at the input end and a filter inductor at the output end, and a through current of the shared inductor winding is greatly reduced in comparison with a through current of the corresponding inductor winding Lin2 in the conventional technology. Therefore, this can effectively reduce circuit costs of the second inductor winding L12 and a connection line corresponding to the second inductor winding L12, and further reduce the circuit costs of the power conversion device 1. In addition, the second inductor winding L2 is the shared inductor winding, to connect the second input end in2 and the second output end out2 of the power conversion device 1, so that the third filter capacitor C3 may be equivalent to filter capacitors Cin3 and Cout3 in the conventional technology. Therefore, the power conversion device 1 can reduce one filter capacitor in comparison with the AC/AC power supply in the conventional technology, to further reduce the circuit costs of the power conversion device 1.

Figure 7C:
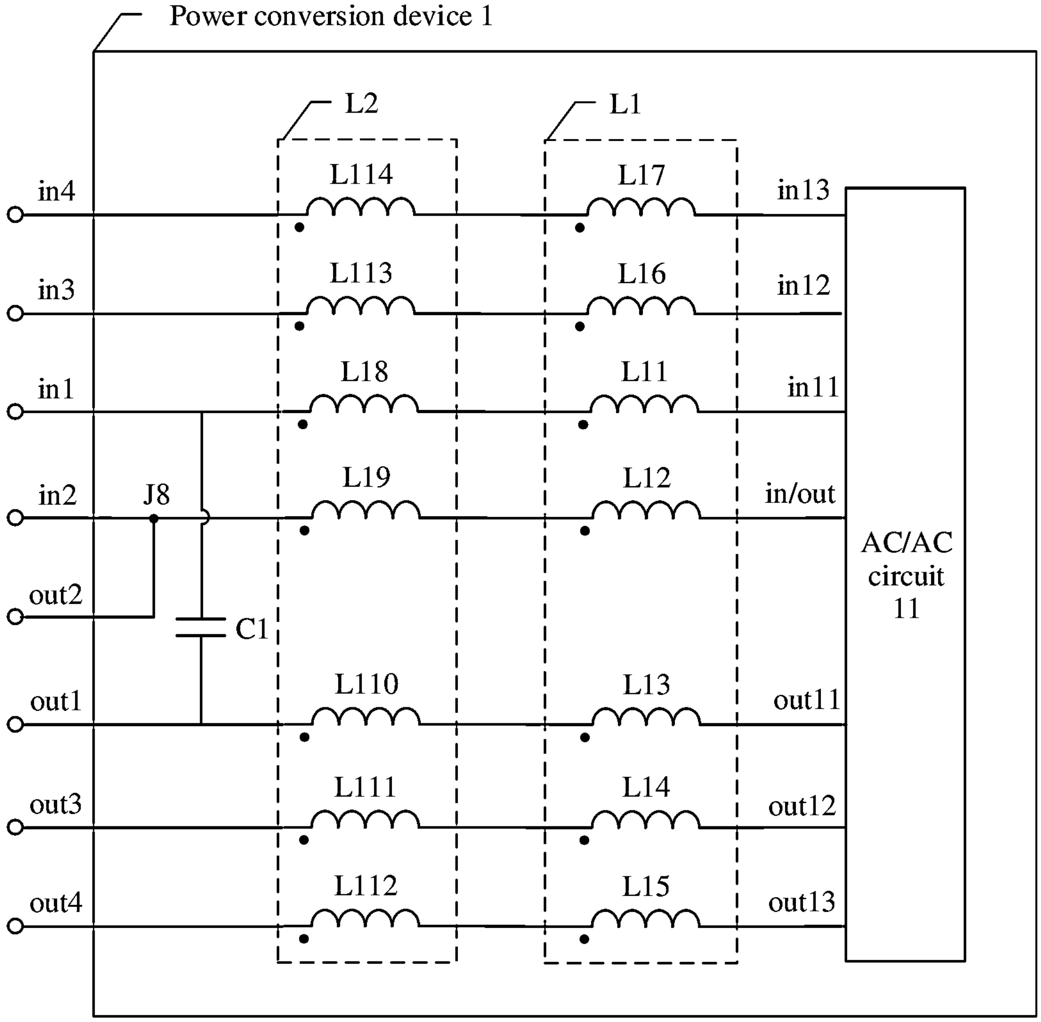
FIG. 7*c* is a schematic diagram of another structure of a power conversion device.

FIG. 7*c* is a schematic diagram of another structure of a power conversion device. Compared with the power conversion device 1 shown in FIG. 7*a*, the power conversion device 1 shown in FIG. 7*c* further includes a second filter inductor L2. As shown in FIG. 7*c*, the second filter inductor L2 includes an eighth inductor winding L18, a ninth inductor winding L19, a tenth inductor winding L110, an eleventh inductor winding L111, a twelfth inductor winding L112, a thirteenth inductor winding L113, a fourteenth inductor winding L114, and a second inductor magnetic core.

The eighth inductor winding L18, the ninth inductor winding L19, the tenth inductor winding L110, the eleventh inductor winding L111, the twelfth inductor winding L112, the thirteenth inductor winding L113, and the fourteenth inductor winding L114 are all wound around the second inductor magnetic core. A first end of a first inductor winding L11 is connected to a first input end in1 of the power conversion device 1 through the eighth inductor winding L18, a first end of a second inductor winding L12 is connected to a second input end in2 and a second output end out2 of the power conversion device 1 through the ninth inductor winding L19, a first end of a third inductor winding L13 is connected to a first output end out1 of the power conversion device 1 through the tenth inductor winding L110, a first end of a fourth inductor winding L14 is connected to a third output end out3 of the power conversion device 1 through the eleventh inductor winding L111, a first end of a fifth inductor winding L15 is connected to a fourth output end out4 of the power conversion device 1 through the twelfth inductor winding L112, a first end of a sixth inductor winding L16 is connected to a third input end in3 of the power conversion device 1 through the thirteenth inductor winding L113, and a first end of a seventh inductor winding L17 is connected to a fourth input end in4 of the power conversion device 1 through the fourteenth inductor winding L114.

A first end of each inductor winding may be a dotted terminal, and correspondingly, a second end of each inductor winding is an undotted terminal. Herein, for a connection relationship between each inductor winding in a first filter inductor L1 and an AC/AC circuit 11, a circuit element included in the AC/AC circuit 11, and a connection relationship of the circuit element, refer to descriptions of corresponding parts in the power conversion devices 1 shown in FIG. 7*a* and FIG. 7*b*. Details are not described herein again.

Optionally, a first filter capacitor C1 may be alternatively located between the third input end in3 and the third output end out3 of the power conversion device 1, located between the fourth input end in4 and the fourth output end out4 of the power conversion device 1, located between an undotted terminal of the first inductor winding L11 and an undotted terminal of the third inductor winding L13, located between an undotted terminal of the sixth inductor winding L16 and an undotted terminal of the fourth inductor winding L14, located between an undotted terminal of the seventh inductor winding L17 and an undotted terminal of the fifth inductor winding L15, located between a dotted terminal of the first inductor winding L11 and a dotted terminal of the third inductor winding L13, located between a dotted terminal of the sixth inductor winding L16 and a dotted terminal of the fourth inductor winding L14, or located between a dotted terminal of the seventh inductor winding L17 and a dotted terminal of the fifth inductor winding L15. It may be understood that the first filter capacitor C1 in the power conversion device 1 has various locations, so that the power conversion device 1 has various structures and high flexibility.

To better achieve filtering effect on an input current and an output current of the power conversion device 1, the power conversion device 1 may further appropriately add a filter capacitor. For example, the power conversion device 1 may further add at least one of the following filter capacitors: a filter capacitor located between the third input end in3 of the power conversion device 1 and a ground cable PE, a filter capacitor located between the fourth input end in4 of the power conversion device 1 and the ground cable PE, a filter capacitor located between the first output end out1 and the third output end out3 of the power conversion device 1, a filter capacitor located between the first output end out1 and the fourth output end out4 of the power conversion device 1, a filter capacitor located between the third output end out3 and the fourth output end out4 of the power conversion device 1, a filter capacitor located between the second output end out2 and the third output end out3 of the power conversion device 1, a filter capacitor located between the second output end out2 and the fourth output end out4 of the power conversion device 1, a filter capacitor located between the undotted terminal of the seventh inductor winding L17 and the undotted terminal of the first inductor winding L11, a filter capacitor located between the undotted terminal of the sixth inductor winding L16 and the undotted terminal of the first inductor winding L11, a filter capacitor located between the undotted terminal of the sixth inductor winding L16 and the undotted terminal of the seventh inductor winding L17, a filter capacitor located between the undotted terminal of the seventh inductor winding L17 and an undotted terminal of the second inductor winding L12, a filter capacitor located between the undotted terminal of the sixth inductor winding L16 and the undotted terminal of the second inductor winding L12, a filter capacitor located between the dotted terminal of the seventh inductor winding L17 and the dotted terminal of the first inductor winding L11, a filter capacitor located between the dotted terminal of the sixth inductor winding L16 and the dotted terminal of the first inductor winding L11, a filter capacitor located between the dotted terminal of the sixth inductor winding L16 and the dotted terminal of the seventh inductor winding L17, a filter capacitor located between the dotted terminal of the seventh inductor winding L17 and a dotted terminal of the second inductor winding L12, a filter capacitor located between the dotted terminal of the sixth inductor winding L16 and the dotted terminal of the second inductor winding L12, another filter capacitor connected to another input end and output end except the third input end in3 and the fourth input end in4 of the power conversion device 1, and other filter capacitors connected to other inductor windings except the sixth inductor winding L16 and the seventh inductor winding L17 in the first filter inductor L1. Herein, for locations of the another filter capacitor connected to another input end and output end except the third input end in3 and the fourth input end in4 of the power conversion device 1, and the other filter capacitors connected to the other inductor windings except the sixth inductor winding L16 and the seventh inductor winding L17 in the first filter inductor L1, refer to descriptions of corresponding parts in the power conversion device 1 shown in FIG. 5*c*. Details are not described herein again.

It may be understood from a circuit structure of the power conversion device 1 shown in FIG. 7*c* that the power conversion device 1 shown in FIG. 7*c* is applicable to an application scenario in which a three-phase input and a three-phase output are used and two-stage filter inductors are at both an input end and an output end. It may be understood from an energy flow direction after the power conversion device 1 operates that the first inductor winding L11, the second inductor winding L12, the sixth inductor winding L16, the seventh inductor winding L17, the eighth inductor winding L18, the ninth inductor winding L19, the thirteenth inductor winding L113, and the fourteenth inductor winding L114 may filter an alternating current input by an alternating current power grid, to better reduce electromagnetic interference of the alternating current input by the alternating current power grid, and may also better suppress switching ripples at an input side of the AC/AC circuit 11, to prevent switching noise from interfering with a power grid side device. The second inductor winding L12, the third inductor winding L13, the fourth inductor winding L14, the fifth inductor winding L15, the ninth inductor winding L19, the tenth inductor winding L110, the eleventh inductor winding L111, and the twelfth inductor winding L112 may filter an alternating current output by the AC/AC circuit 11, to obtain an alternating current that meets a noise requirement for normal operation of an alternating current load and has lower noise. Therefore, it may be understood that the first filter inductor L1 and the second filter inductor L2 can implement functions of a two-stage filter inductor at an input end and a two-stage filter inductor at an output end of an AC/AC power supply with a three-phase input and a three-phase output in the conventional technology.

In addition, it is assumed that an input current and an output current of the power conversion device 1 are respectively I1 and I2. It may be understood from an energy flow direction of the power conversion device 1 that a through current of a branch (such as a circuit between a node J8 and a common end in/out of the AC/AC circuit 11) on which the ninth inductor winding L19 and the second inductor winding L12 are located is |I1-I2|. Similarly, it may be understood, from an energy flow direction and a circuit structure of the AC/AC power supply with the three-phase input and the three-phase output and with the two-stage filter inductors at both the input end and the output end in the conventional technology, that in the conventional technology, a through current of a branch (such as a circuit between an input end inN of the AC/AC power supply and the common end in/out of the AC/AC circuit) on which two inductor windings corresponding to the ninth inductor winding L19 and the second inductor winding L12 are located is I1. It is clear that the through current of the branch on which the ninth inductor winding L19 and the second inductor winding L12 are located in the power conversion device 1 is greatly reduced in comparison with the through current of the branch on which the two corresponding inductor windings are located in the conventional technology. Therefore, the ninth inductor winding L19 and the second inductor winding L12 in the power conversion device 1 each may use a thinner copper wire or cable, and a connection line between the node J8 and the common end in/out of the AC/AC circuit may use a thinner cable. This can greatly reduce circuit costs of the power conversion device 1.

In this embodiment, the first filter inductor L1 and the second filter inductor L2 reduce two inductor windings and two inductor magnetic cores in comparison with a two-stage filter inductor at the input end and a two-stage filter inductor at the output end of the AC/AC power supply with the three-phase input and the three-phase output in the conventional technology, thereby reducing a volume of the power conversion device 1, and reducing the circuit costs of the power conversion device 1. In addition, the ninth inductor winding L19 and the second inductor winding L12 each are an inductor winding shared by the filter inductor at the input end and the filter inductor at the output end, and a through current of the shared inductor winding is greatly reduced in comparison with a through current of the two corresponding inductor windings in the conventional technology. Therefore, this can effectively reduce circuit costs of the ninth inductor winding L19, the second inductor winding L12, and a connection line corresponding to the ninth inductor winding L19 and the second inductor winding L12, and further reduce the circuit costs of the power conversion device 1.

Figure 7D:
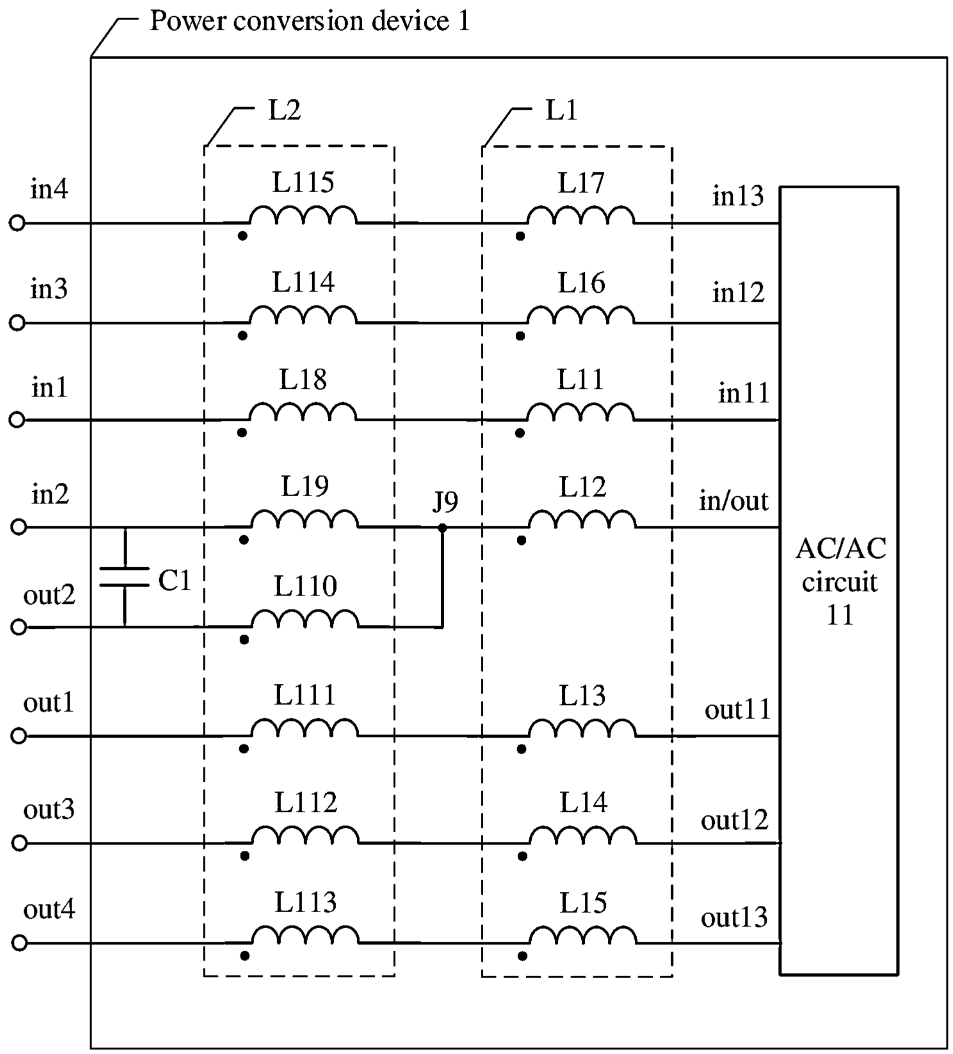
FIG. 7*d* is a schematic diagram of another structure of a power conversion device.
Figure 8:
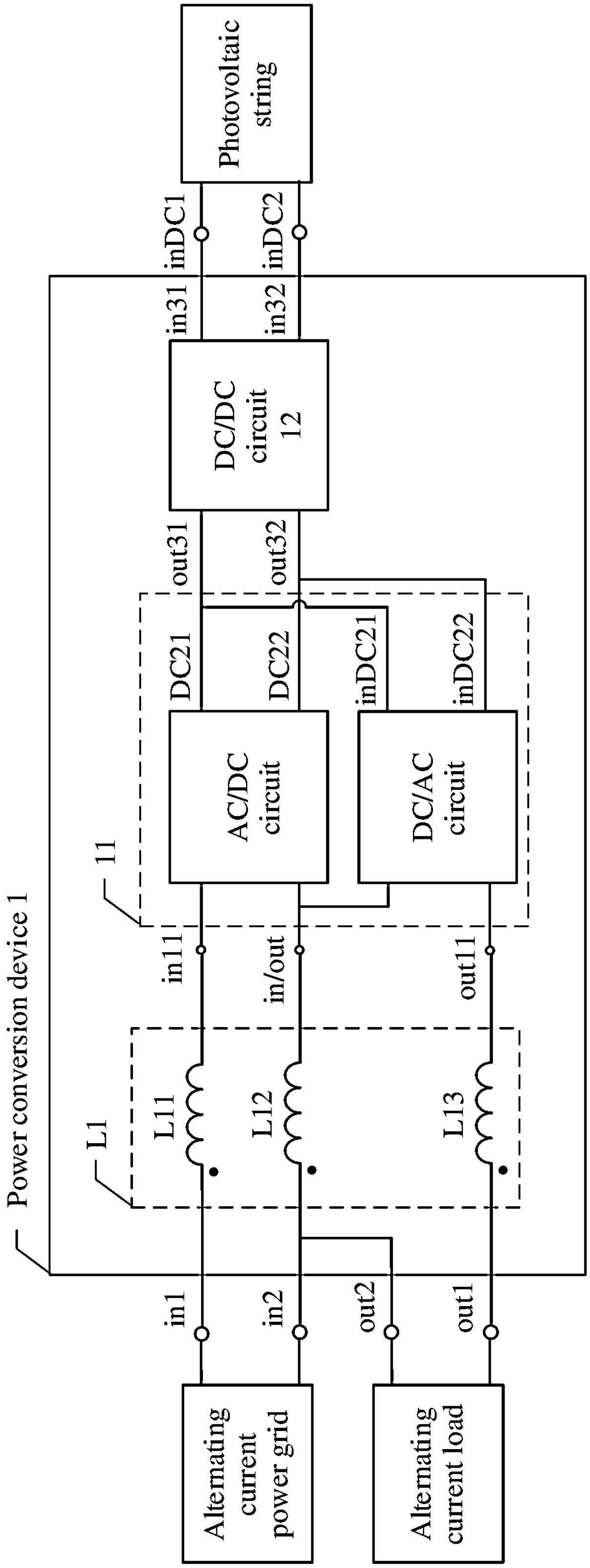
FIG. 8 is a schematic diagram of still another structure of a power conversion device.

FIG. 7*d* is a schematic diagram of another structure of a power conversion device. Compared with the power conversion device 1 shown in FIG. 7*c*, in the power conversion device shown in FIG. 7*d*, a second filter inductor L2 shown in FIG. 7*d* is different from the second filter inductor L2 shown in FIG. 7*c*. The second filter inductor L2 includes an eighth inductor winding L18, a ninth inductor winding L19, a tenth inductor winding L110, an eleventh inductor winding L111, a twelfth inductor winding L112, a thirteenth inductor winding L113, a fourteenth inductor winding L114, a fifteenth inductor winding L115, and a second inductor magnetic core. The eighth inductor winding L18, the ninth inductor winding L19, the tenth inductor winding L110, the eleventh inductor winding L111, the twelfth inductor winding L112, the thirteenth inductor winding L113, the fourteenth inductor winding L114, and the fifteenth inductor winding L115 are all wound around the second inductor magnetic core. A first end of a first inductor winding L11 is connected to a first input end in1 of the power conversion device 1 through the eighth inductor winding L18, a first end of a second inductor winding L12 is connected to a second input end in2 of the power conversion device 1 through the ninth inductor winding L19, the first end of the second inductor winding L12 is connected to a second output end out2 of the power conversion device 1 through the tenth inductor winding L110, a first end of a third inductor winding L13 is connected to a first output end out1 of the power conversion device 1 through the eleventh inductor winding L111, a first end of a fourth inductor winding L14 is connected to a third output end out3 of the power conversion device 1 through the twelfth inductor winding L112, a first end of a fifth inductor winding L15 is connected to a fourth output end out4 of the power conversion device 1 through the thirteenth inductor winding L113, a first end of a sixth inductor winding L16 is connected to a third input end in3 of the power conversion device 1 through the fourteenth inductor winding L114, and a first end of a seventh inductor winding L17 is connected to a fourth input end in4 of the power conversion device 1 through the fifteenth inductor winding L115.

Herein, for other circuit elements except the second filter inductor L2 in the power conversion device 1 shown in FIG. 7*d* and connection relationships of the other circuit elements, refer to descriptions of corresponding parts in the power conversion device 1 shown in FIG. 7*c*. Details are not described herein again.

The power conversion device 1 further includes a first filter capacitor C1. For example, the first filter capacitor C1 is located between the second input end in2 and the second output end out2 of the power conversion device 1. Optionally, the first filter capacitor C1 may be alternatively located between the first input end in1 and the first output end out1 of the power conversion device 1, located between the third input end in3 and the third output end out3 of the power conversion device 1, located between the fourth input end in4 and the fourth output end out4 of the power conversion device 1, located between an undotted terminal of the first inductor winding L11 and an undotted terminal of the third inductor winding L13, located between an undotted terminal of the sixth inductor winding L16 and an undotted terminal of the fourth inductor winding L14, located between an undotted terminal of the seventh inductor winding L17 and an undotted terminal of the fifth inductor winding L15, located between a dotted terminal of the first inductor winding L11 and a dotted terminal of the third inductor winding L13, located between a dotted terminal of the sixth inductor winding L16 and a dotted terminal of the fourth inductor winding L14, or located between a dotted terminal of the seventh inductor winding L17 and a dotted terminal of the fifth inductor winding L15. It may be understood that the first filter capacitor C1 in the power conversion device 1 has various locations, so that the power conversion device 1 has various structures and high flexibility.

To better achieve filtering effect on an input current and an output current of the power conversion device 1, the power conversion device 1 may further appropriately add a filter capacitor. For example, the power conversion device 1 may further add at least one of the following filter capacitors: a filter capacitor located between the third input end in3 of the power conversion device 1 and a ground cable PE, a filter capacitor located between the fourth input end in4 of the power conversion device 1 and the ground cable PE, a filter capacitor located between the third input end in3 and the second input end in2 of the power conversion device 1, a filter capacitor located between the fourth input end in4 and the second input end in2 of the power conversion device 1, a filter capacitor located between the fourth input end in4 and the third input end in3 of the power conversion device 1, a filter capacitor located between the first input end in1 and the third input end in3 of the power conversion device 1, a filter capacitor located between the first input end in1 and the fourth input end in3 of the power conversion device 1, a filter capacitor located between the third input end in3 and the fourth input end in3 of the power conversion device 1, another filter capacitor connected to another input end and output end except the third input end in3 and the fourth input end in4 of the power conversion device 1, and other filter capacitors connected to other inductor windings except the sixth inductor winding L16 and the seventh inductor winding L17 in a first filter inductor L1. Herein, for locations of the another filter capacitor connected to the another input end and output end except the third input end in3 and the fourth input end in4 of the power conversion device 1, and the other filter capacitors connected to the other inductor windings except the sixth inductor winding L16 and the seventh inductor winding L17 in the first filter inductor L1, refer to descriptions of corresponding parts in the power conversion device 1 shown in FIG. 5*d*. Details are not described herein again.

It may be understood from a circuit structure of the power conversion device 1 shown in FIG. 7*d* that the power conversion device 1 shown in FIG. 7*d* is also applicable to an application scenario in which a three-phase input and a three-phase output are used and two-stage filter inductors are at both an input end and an output end. It may be understood from an energy flow direction after the power conversion device 1 operates that the first inductor winding L11, the second inductor winding L12, the sixth inductor winding L16, the seventh inductor winding L17, the eighth inductor winding L18, the ninth inductor winding L19, the fourteenth inductor winding L114, and the fifteenth inductor winding L115 may filter an alternating current input by an alternating current power grid, to better reduce electromagnetic interference of the alternating current input by the alternating current power grid, and may also better suppress switching ripples at an input side of an AC/AC circuit 11, to prevent switching noise from interfering with a power grid side device. The second inductor winding L12 to the fifth inductor winding L15 and the tenth inductor winding L110 to the thirteenth inductor winding L113 may filter an alternating current output by the AC/AC circuit 11, to obtain an alternating current that meets a noise requirement for normal operation of an alternating current load and has lower noise. Therefore, it may be understood that the first filter inductor L1 and the second filter inductor L2 can implement functions of a two-stage filter inductor at an input end and a two-stage filter inductor at an output end of an AC/AC power supply with a three-phase input and a three-phase output in the conventional technology.

In addition, it is assumed that an input current and an output current of the power conversion device 1 are respectively I1 and I2. It may be understood from an energy flow direction of the power conversion device 1 that a through current of a branch (such as a circuit between a node J9 and a common end in/out of the AC/AC circuit 11) on which the second inductor winding L12 is located is |I1-I2|. Similarly, it may be understood, from an energy flow direction and a circuit structure of the AC/AC power supply with the three-phase input and the three-phase output and with the two-stage filter inductors at both the input end and the output end in the conventional technology, that in the conventional technology, a through current of a branch (such as a circuit between an input end inN of the AC/AC power supply and the common end in/out of the AC/AC circuit) on which an inductor winding Lin2 corresponding to the second inductor winding L12 is located is I1. It is clear that the through current of the branch on which the second inductor winding L12 is located in the power conversion device 1 is greatly reduced in comparison with the through current of the branch on which the corresponding inductor winding Lin2 is located in the conventional technology. Therefore, the second inductor winding L12 in the power conversion device 1 may use a thinner copper wire or cable, and a connection line between the node J9 and the common end in/out of the AC/AC circuit 11 may use a thinner cable. This can greatly reduce circuit costs of the power conversion device 1.

In this embodiment, the first filter inductor L1 and the second filter inductor L2 reduce one inductor winding and two inductor magnetic cores in comparison with a two-stage filter inductor at the input end and a two-stage filter inductor at the output end of the AC/AC power supply with the three-phase input and the three-phase output in the conventional technology, thereby reducing a volume of the power conversion device 1, and reducing the circuit costs of the power conversion device 1. In addition, the second inductor winding L12 is an inductor winding shared by a filter inductor at the input end and a filter inductor at the output end, and a through current of the shared inductor winding is greatly reduced in comparison with a through current of the corresponding inductor winding Lin2 in the conventional technology. Therefore, this can effectively reduce circuit costs of the second inductor winding L12 and a connection line corresponding to the second inductor winding L12, and further reduce the circuit costs of the power conversion device 1.

It should be noted that a quantity of filter inductors included in the power conversion device 1 may be adjusted based on a filtering requirement in an actual application scenario. This is not limited. In addition, an example in which both a filter inductor at an input end and a filter inductor at an output end of the power conversion device 1 are used for one-stage filtering or two-stage filtering is used for description. When both the filter inductor at the input end and the filter inductor at the output end of the power conversion device 1 are used for three-stage filtering or higher-stage filtering, circuit structures and working principles of the filter inductors and the filter capacitors in the power conversion device 1 may be deduced based on the power conversion device 1 in which both the filter inductor at the input end and the filter inductor at the output end are used for two-stage filtering. This is not described in detail. In addition to non-isolated AC/AC circuit topologies shown in FIG. 3*a* to FIG. 7*d*, a circuit structure of the AC/AC circuit may use another non-isolated AC/AC circuit topology or an isolated AC/AC circuit topology. This is not limited.

In addition, the first filter inductor L1 may further use a circuit structure in which only a magnetic core is shared by an inductor winding at an input end and an inductor winding at an output end. When the power conversion device 1 is of a circuit structure with a single-phase input and a single-phase output, the first filter inductor L1 includes four inductor windings and a first magnetic core, where two of the four inductor windings are connected between an alternating current input end of the power conversion device 1 and an input end of the AC/AC circuit 11, and the other two of the four inductor windings are connected between an alternating current output end of the power conversion device 1 and an output end of the AC/AC circuit 11. The four inductor windings are all wound around the first magnetic core. It is clear that the first filter inductor L1 uses the power conversion device 1 in which only the magnetic core is shared and that has the single-phase input and the single-phase output. Compared with an AC/AC power supply with a single-phase input and a single-phase output in the conventional technology, the power conversion device 1 may reduce one inductor magnetic core, thereby reducing circuit costs of the power conversion device 1. When the power conversion device 1 is of a circuit structure with a three-phase input and a single-phase output, the first filter inductor L1 includes six inductor windings and a first magnetic core, where four of the six inductor windings are connected between an alternating current input end of the power conversion device 1 and an input end of the AC/AC circuit 11, and the other two of the six inductor windings are connected between an alternating current output end of the power conversion device 1 and an output end of the AC/AC circuit 11. The six inductor windings are all wound around the first magnetic core. It is clear that the first filter inductor L1 uses the power conversion device 1 in which only the magnetic core is shared and that has the three-phase input and the single-phase output. Compared with an AC/AC power supply with a three-phase input and a single-phase output in the conventional technology, the power conversion device 1 may reduce one inductor magnetic core, thereby reducing circuit costs of the power conversion device 1. When the power conversion device 1 is of a circuit structure with a three-phase input and a three-phase output, the first filter inductor L1 includes eight inductor windings and a first magnetic core, where four of the eight inductor windings are connected between an alternating current input end of the power conversion device 1 and an input end of the AC/AC circuit 11, and the other four of the eight inductor windings are connected between an alternating current output end of the power conversion device 1 and an output end of the AC/AC circuit 11. The eight inductor windings are all wound around the first magnetic core. It is clear that the first filter inductor L1 uses the power conversion device 1 in which only the magnetic core is shared and that has the three-phase input and the three-phase output. Compared with an AC/AC power supply with a three-phase input and a three-phase output in the conventional technology, the power conversion device 1 may reduce one inductor magnetic core, thereby reducing circuit costs of the power conversion device 1.

When the power conversion device 1 is a UPS, the UPS may further include a bypass switch. When the UPS is of a circuit structure with a single-phase input and a single-phase output, the bypass switch may be located between the dotted terminal of the first inductor winding L11 and the dotted terminal of the third inductor winding L13 or located between the undotted terminal of the first inductor winding L11 and the undotted terminal of the third inductor winding L13. When the UPS is of a circuit structure with a three-phase input and a three-phase output (the power conversion device 1 shown in FIG. 7*a*), the UPS includes three bypass switches: a first bypass switch, a second bypass switch, and a third bypass switch. The first bypass switch is located between the dotted terminal of the first inductor winding L11 and the dotted terminal of the third inductor winding L13 or located between the undotted terminal of the first inductor winding L11 and the undotted terminal of the third inductor winding L13. The second bypass switch is located between the dotted terminal of the fourth inductor winding L14 and the dotted terminal of the sixth inductor winding L16 or located between the undotted terminal of the fourth inductor winding L14 and the undotted terminal of the sixth inductor winding L16. The third bypass switch is located between the dotted terminal of the fifth inductor winding L15 and the dotted terminal of the seventh inductor winding L17 or located between the undotted terminal of the fifth inductor winding L15 and the undotted terminal of the seventh inductor winding L17. It may be understood that when the AC/AC circuit in the UPS is faulty, the UPS may control the bypass switch to be turned on, so that the alternating current input by the alternating current power grid is directly output to the alternating current load through the bypass switch, to implement power supplying for the alternating current load. This not only can improve stability of the UPS during working, but also can improve working efficiency of the UPS.

Optionally, the UPS may further include an energy storage unit, and the energy storage unit is connected to two ends of a bus capacitor in the AC/AC circuit 11. For example, when the UPS is of a circuit structure with a single-phase input and a single-phase output (the power conversion device 1 shown in FIG. 3*b*), the energy storage unit is connected to two ends of the first bus capacitor Cbus1. When the UPS is of a circuit structure with a single-phase input and a three-phase output (the power conversion device 1 shown in FIG. 5*b*), the energy storage unit is connected to two ends formed by connecting the first bus capacitor Cbus1 and the second bus capacitor Cbus2 in series. It may be understood that when the alternating current power grid no longer outputs an alternating current, the UPS may invert, through a DC/AC circuit in the AC/AC circuit 11, a direct current output by the energy storage unit into an alternating current, to implement uninterruptible power supplying for the alternating current load.

When the power conversion device 1 is an inverter, the alternating current input ends of the power conversion devices 1 shown in FIG. 3*a* to FIG. 7*d* are alternating current input/output bidirectional ends. Correspondingly, at least two input ends of the alternating current input end of the power conversion device 1 are also input/output bidirectional ends. An input end of the AC/AC circuit 11 is an input/output bidirectional end, and correspondingly, a common end and at least one input end in the input end of the AC/AC circuit 11 are both input/output bidirectional ends. Herein, the input/output bidirectional end may be used as an input end or a terminal of an output end. The power conversion device further includes a DC/DC circuit and a first direct current input end. The AC/AC circuit 11 includes an AC/DC circuit and a DC/AC circuit. For details, refer to a power conversion device shown in FIG. 8. Compared with the power conversion device 1 shown in FIG. 3*a*, the power conversion device 1 shown in FIG. 8 further includes first direct current input ends inDC1 and inDC2, and a DC/DC circuit 12. An AC/AC circuit 11 includes an AC/DC circuit and a DC/AC circuit. The first direct current input ends inDC1 and inDC2 of the power conversion device 1 are connected to a photovoltaic string. Direct current input ends in31 and in32 of the DC/DC circuit 12 are respectively connected to the first direct current input ends inDC1 and inDC2 of the power conversion device 1. Direct current output ends out31 and out32 of the DC/DC circuit 12 are respectively connected to direct current ends DC21 and DC22 of the AC/DC circuit, or direct current output ends out31 and out32 of the DC/DC circuit 12 are respectively connected to direct current input ends inDC21 and inDC22 of the DC/AC circuit. Two alternating current ends of the AC/DC circuit are respectively used as a first input end in11 and a common end in/out of the AC/AC circuit 11, and two alternating current output ends of the DC/AC circuit are respectively used as the common end in/out and a first output end out11 of the AC/AC circuit 11. Herein, for descriptions of a first filter inductor L1 in the inverter, refer to descriptions of a corresponding part in the power conversion device 1 shown in FIG. 3*a*. Details are not described herein again.

For example, when the power conversion device 1 is of a circuit structure with a single-phase input and a single-phase output, and the AC/AC circuit 11 is the AC/AC circuit 11 shown in FIG. 3*b*, the AC/DC circuit is of a circuit structure formed by the first phase bridge arm 111, the first bus capacitor Cbus1, and the second phase bridge arm 112 that are connected in parallel to each other, and the first inductor Lin1 connected between the midpoint a1 of the first phase bridge arm 111 and the first input end in11 of the AC/AC circuit 11, as shown in FIG. 3*b*. Two ends of the first bus capacitor Cbus1 respectively correspond to the direct current ends DC21 and DC22 of the AC/DC circuit. The DC/AC circuit is of a circuit structure formed by the second phase bridge arm 112 and the third phase bridge arm 113 that are connected in parallel to each other, and the second inductor Lout1 connected between the midpoint a3 of the third phase bridge arm 113 and the first output end out11 of the AC/AC circuit 11, as shown in FIG. 3*b*. Two ends formed by connecting the second phase bridge arm 112 and the third phase bridge arm 113 in parallel respectively correspond to the direct current input ends inDC21 and inDC22 of the DC/AC circuit.

When the power conversion device 1 is of a circuit structure with a single-phase input and a three-phase output, and the AC/AC circuit 11 is the AC/AC circuit 11 shown in FIG. 5*b*, the AC/DC circuit is of a circuit structure formed by a branch on which two bus capacitors are connected in series, the first phase bridge arm 111, and the second phase bridge arm 112 that are connected in parallel to each other, the first inductor Lin1 connected between the midpoint a1 of the first phase bridge arm 111 and the first input end in11 of the AC/AC circuit 11, and the second inductor Lout1 connected between the midpoint a2 of the second phase bridge arm 112 and the first output end out11 of the AC/AC circuit 11, as shown in FIG. 5*b*. Two ends formed by connecting the first bus capacitor Cbus1 and the second bus capacitor Cbus2 in series respectively correspond to the direct current ends DC21 and DC22 of the AC/DC circuit. The DC/AC circuit is of a circuit structure formed by the third phase bridge arm 113 and the fourth phase bridge arm 114 that are connected in parallel to each other, the third inductor Lout2 connected between the midpoint a3 of the third phase bridge arm 113 and the second output end out12 of the AC/AC circuit 11, and the fourth inductor Lout3 connected between the midpoint a4 of the fourth phase bridge arm 114 and the third output end out13 of the AC/AC circuit 11, as shown in FIG. 5*b*. Two ends formed by connecting the third phase bridge arm 113 and the fourth phase bridge arm 114 in parallel respectively correspond to the direct current input ends inDC21 and inDC22 of the DC/AC circuit.

When the power conversion device 1 is of a circuit structure with a three-phase input and a three-phase output, and the AC/AC circuit 11 is the AC/AC circuit 11 shown in FIG. 7*b*, the AC/DC circuit is of a circuit structure formed by a branch on which two bus capacitors are connected in series, the first phase bridge arm 111, the second phase bridge arm 112, the third phase bridge arm 113, and the fourth phase bridge arm 114 that are connected in parallel to each other, the first inductor Lin1 connected between the midpoint a1 of the first phase bridge arm 111 and the first input end in11 of the AC/AC circuit 11, the second inductor Lin2 connected between the midpoint a2 of the second phase bridge arm 112 and the second input end in12 of the AC/AC circuit 11, the third inductor Lin3 connected between the midpoint a3 of the third phase bridge arm 113 and the third input end in13 of the AC/AC circuit 11, and the fourth inductor Lout1 connected between the midpoint a4 of the fourth phase bridge arm 114 and the first output end out11 of the AC/AC circuit 11, as shown in FIG. 7*b*. Two ends formed by connecting the first bus capacitor Cbus1 and the second bus capacitor Cbus2 in series respectively correspond to the direct current ends DC21 and DC22 of the AC/DC circuit. The DC/AC circuit is of a circuit structure formed by the fourth phase bridge arm 114, the fifth phase bridge arm 115, and the sixth phase bridge arm 116 that are connected in parallel to each other, the fourth inductor Lout1 connected between the midpoint a4 of the fourth phase bridge arm 114 and the first output end out11 of the AC/AC circuit 11, the fifth inductor Lout2 connected between the midpoint a5 of the fifth phase bridge arm 115 and the second output end out12 of the AC/AC circuit 11, and the sixth inductor Lout3 connected between the midpoint a6 of the sixth phase bridge arm 116 and the third output end out13 of the AC/AC circuit 11, as shown in FIG. 7*b*. Two ends formed by connecting the fourth phase bridge arm 114, the fifth phase bridge arm 115, and the sixth phase bridge arm 116 in parallel to each other respectively correspond to the direct current input ends inDC21 and inDC22 of the DC/AC circuit.

After the power conversion device 1 operates, energy input by the alternating current power grid and the photovoltaic string may be converted, and then converted energy may be output to the alternating current load. Energy input by the alternating current power grid sequentially passes through the first filter inductor L1, the AC/DC circuit, the DC/AC circuit, and the first filter inductor L1, and then flows into the alternating current load. In addition, a direct current input by the photovoltaic string sequentially passes through the DC/DC circuit 12 and the DC/AC circuit, to obtain an inverted alternating current, and the alternating current passes through the first filter inductor L1 and then flows into the alternating current load, to implement power supplying for the alternating current load.

Optionally, the power conversion device 1 further includes a second direct current input end, and the second direct current input end is configured to connect to the energy storage unit. The second direct current input end is connected to the direct current end of the AC/DC circuit. When the second direct current input end of the power conversion device 1 is connected to the energy storage unit, an energy flow direction between an alternating current input end of the power conversion device 1 and the second direct current input end may be bidirectional. When the alternating current power grid supplies energy for the energy storage unit, alternating current energy output by the alternating current power grid flows through the first filter inductor L1, and then flows into the energy storage unit after being rectified by the AC/DC circuit, to implement power supplying for the energy storage unit. When the energy storage unit supplies energy for the alternating current power grid, after being inverted by the AC/DC circuit, a direct current output by the energy storage unit passes through the first filter inductor L1 and then flows into the alternating current power grid, to implement power supplying for the alternating current power grid.

Herein, for a process of deducing beneficial effect brought by a current flow direction of the power conversion device 1 and the circuit structure of the power conversion device 1, refer to descriptions of corresponding parts in the power conversion device 1 shown in FIG. 3*a*. Details are not described herein again.

In this embodiment, the first filter inductor L1 not only can implement the functions of an input filter inductor Lin and an output filter inductor Lout of the AC/AC power supply with the single-phase input and the single-phase output in the conventional technology, but also reduces one inductor winding and one inductor magnetic core in comparison with the input filter inductor Lin and the output filter inductor Lout of the AC/AC power supply with the single-phase input and the single-phase output in the conventional technology, thereby reducing a volume of the power conversion device 1, and reducing circuit costs of the power conversion device 1. In addition, when being the inverter, the power conversion device 1 is further applicable to a photovoltaic power supply scenario and is high in applicability.

In addition, beneficial effect brought by the circuit structures of the filter inductors, the filter capacitors, and the AC/AC circuits 11 in the power conversion devices 1 shown in FIG. 3*b* to FIG. 7*d*, the energy flow direction of the power conversion device 1, and the circuit structure of the power conversion device 1 is also applicable to the inverter. Details are not described herein again.

The foregoing descriptions are merely implementations but are not intended to limit the scope of the embodiments. Any variation or replacement readily figured out by a person skilled in the art shall fall within the scope of the embodiments.

What is claimed is:

1. A power conversion device comprising:

an alternating current input end, wherein the alternating current input end of the power conversion device comprises a first input end and a second input end;

an alternating current output end, wherein the alternating current output end of the power conversion device comprises a first output end and a second output end;

a first filter inductor, wherein the first filter inductor comprises a first inductor winding, a second inductor winding, a third inductor winding, and a first inductor magnetic core;

an AC/AC circuit, wherein the first inductor winding, the second inductor winding, and the third inductor winding are all wound around the first inductor magnetic core, a first end of the first inductor winding is connected to the first input end of the power conversion device, a first end of the second inductor winding is connected to the second input end and the second output end of the power conversion device, a second end of the first inductor winding and a second end of the second inductor winding are separately connected to an input end of the AC/AC circuit, a first end of the third inductor winding is connected to the first output end of the power conversion device, and the second end of the second inductor winding and a second end of the third inductor winding are separately connected to an output end of the AC/AC circuit;

wherein the first filter inductor further comprises a fourth inductor winding and a fifth inductor winding, and a second filter inductor that comprises a plurality of inductors and a second inductor magnetic core.

2. The power conversion device according to claim 1, further comprising the plurality inductors of the second filter inductor comprises a fourth inductor winding, a fifth inductor winding, and a sixth inductor winding, wherein the fourth inductor winding, the fifth inductor winding, and the sixth inductor winding are all wound around the second inductor magnetic core; the first end of the first inductor winding is connected to the first input end of the power conversion device through the fourth inductor winding, the first end of the second inductor winding is connected to the second input end and the second output end of the power conversion device through the fifth inductor winding, and the first end of the third inductor winding is connected to the first output end of the power conversion device through the sixth inductor winding.

3. The power conversion device according to claim 1, wherein the input end of the AC/AC circuit comprises a first input end and a common end shared between the input end and the output end of the AC/AC circuit, and the output end of the AC/AC circuit comprises a first output end and the common end, the second end of the first inductor winding is connected to the first input end of the AC/AC circuit, the second end of the second inductor winding is connected to the common end of the AC/AC circuit, and the second end of the third inductor winding is connected to the first output end of the AC/AC circuit.

4. The power conversion device according to claim 1, further comprising:

the plurality inductors of the second filter inductor comprises a sixth inductor winding, a seventh inductor winding, an eighth inductor winding, a ninth inductor winding, and a tenth inductor winding, wherein the sixth inductor winding, the seventh inductor winding, the eighth inductor winding, the ninth inductor winding, and the tenth inductor winding are all wound around the second inductor magnetic core; the first end of the first inductor winding is connected to the first input end of the power conversion device through the sixth inductor winding, the first end of the second inductor winding is connected to the second input end and the second output end of the power conversion device through the seventh inductor winding, the first end of the third inductor winding is connected to the first output end of the power conversion device through the eighth inductor winding, the first end of the fourth inductor winding is connected to the third output end of the power conversion device through the ninth inductor winding, and the first end of the fifth inductor winding is connected to the fourth output end of the power conversion device through the tenth inductor winding.

5. The power conversion device according to claim 1, further comprising:

the plurality inductors of the second filter inductor comprises a sixth inductor winding, a seventh inductor winding, an eighth inductor winding, a ninth inductor winding, a tenth inductor winding, and an eleventh inductor winding, wherein the sixth inductor winding, the seventh inductor winding, the eighth inductor winding, the ninth inductor winding, the tenth inductor winding, and the eleventh inductor winding are all wound around the second inductor magnetic core; the first end of the first inductor winding is connected to the first input end of the power conversion device through the sixth inductor winding, the first end of the second inductor winding is connected to the second input end of the power conversion device through the seventh inductor winding, the first end of the second inductor winding is connected to the second output end of the power conversion device through the eighth inductor winding, the first end of the third inductor winding is connected to the first output end of the power conversion device through the ninth inductor winding, the first end of the fourth inductor winding is connected to the third output end of the power conversion device through the tenth inductor winding, and the first end of the fifth inductor winding is connected to the fourth output end of the power conversion device through the eleventh inductor winding.

6. The power conversion device according to claim 1, further comprising:

the plurality inductors of the second filter inductor comprises a sixth inductor winding, a seventh inductor winding, an eighth inductor winding, a ninth inductor winding, and a tenth inductor winding, wherein the sixth inductor winding, the seventh inductor winding, the eighth inductor winding, the ninth inductor winding, and the tenth inductor winding are all wound around the second inductor magnetic core; the first end of the first inductor winding is connected to the first input end of the power conversion device through the sixth inductor winding, the first end of the second inductor winding is connected to the second input end and the second output end of the power conversion device through the seventh inductor winding, the first end of the third inductor winding is connected to the first output end of the power conversion device through the eighth inductor winding, the first end of the fourth inductor winding is connected to the third input end of the power conversion device through the ninth inductor winding, and the first end of the fifth inductor winding is connected to the fourth input end of the power conversion device through the tenth inductor winding.

7. The power conversion device according to claim 1, further comprising:

the plurality inductors of the second filter inductor comprises a sixth inductor winding, a seventh inductor winding, an eighth inductor winding, a ninth inductor winding, a tenth inductor winding, and an eleventh inductor winding, wherein the sixth inductor winding, the seventh inductor winding, the eighth inductor winding, the ninth inductor winding, and the tenth inductor winding are all wound around the second inductor magnetic core; the first end of the first inductor winding is connected to the first input end of the power conversion device through the sixth inductor winding, the first end of the second inductor winding is connected to the second input end of the power conversion device through the seventh inductor winding, the first end of the second inductor winding is connected to the second output end of the power conversion device through the eighth inductor winding, the first end of the third inductor winding is connected to the first output end of the power conversion device through the ninth inductor winding, the first end of the fourth inductor winding is connected to the third input end of the power conversion device through the tenth inductor winding, and the first end of the fifth inductor winding is connected to the fourth input end of the power conversion device through the eleventh inductor winding.

8. The power conversion device according to claim 1, further comprising:

the plurality inductors of the second filter inductor, and the second filter inductor comprises an eighth inductor winding, a ninth inductor winding, a tenth inductor winding, an eleventh inductor winding, a twelfth inductor winding, a thirteenth inductor winding, and a fourteenth inductor winding, wherein the eighth inductor winding, the ninth inductor winding, the tenth inductor winding, the eleventh inductor winding, the twelfth inductor winding, the thirteenth inductor winding, and the fourteenth inductor winding are all wound around the second inductor magnetic core; the first end of the first inductor winding is connected to the first input end of the power conversion device through the eighth inductor winding, the first end of the second inductor winding is connected to the second input end and the second output end of the power conversion device through the ninth inductor winding, and the first end of the third inductor winding is connected to the first output end of the power conversion device through the tenth inductor winding; the first end of the fourth inductor winding is connected to the third output end of the power conversion device through the eleventh inductor winding, the first end of the fifth inductor winding is connected to the fourth output end of the power conversion device through the twelfth inductor winding, the first end of the sixth inductor winding is connected to the third input end of the power conversion device through the thirteenth inductor winding, and the first end of the seventh inductor winding is connected to the fourth input end of the power conversion device through the fourteenth inductor winding.

9. The power conversion device according to claim 1, wherein the alternating current input end of the power conversion device further comprises a third input end and a fourth input end, and the alternating current output end of the power conversion device further comprises a third output end and a fourth output end, the fourth inductor winding, the fifth inductor winding, the sixth inductor winding, and the seventh inductor winding are all wound around the first inductor magnetic core, a first end of the fourth inductor winding is connected to the third output end of the power conversion device, a first end of the fifth inductor winding is connected to the fourth output end of the power conversion device, and a second end of the fourth inductor winding and a second end of the fifth inductor winding are separately connected to the output end of the AC/AC circuit, a first end of the sixth inductor winding is connected to the third input end of the power conversion device, a first end of the seventh inductor winding is connected to the fourth input end of the power conversion device, and a second end of the sixth inductor winding and a second end of the seventh inductor winding are separately connected to the input end of the AC/AC circuit.

10. The power conversion device according to claim 1, further comprising:

a first filter capacitor that is either connected between the first input end and the first output end of the power conversion device, or connected between the second end of the first inductor winding and the second end of the third inductor winding.

11. The power conversion device according to claim 1, further comprising:

the plurality inductors of the second filter inductor comprises a fourth inductor winding, a fifth inductor winding, a sixth inductor winding, a seventh inductor winding, and a second inductor magnetic core, wherein the fourth inductor winding, the fifth inductor winding, the sixth inductor winding, and the seventh inductor winding are all wound around the second inductor magnetic core; the first end of the first inductor winding is connected to the first input end of the power conversion device through the fourth inductor winding, the first end of the second inductor winding is connected to the second input end of the power conversion device through the fifth inductor winding, the first end of the second inductor winding is connected to the second output end of the power conversion device through the sixth inductor winding, and the first end of the third inductor winding is connected to the first output end of the power conversion device through the seventh inductor winding.

12. The power conversion device according to claim 11, wherein the power conversion device further comprises a first filter capacitor, and the first filter capacitor is connected between the second input end and the second output end of the power conversion device.

13. The power conversion device according to claim 1, wherein the alternating current output end of the power conversion device further comprises a third output end and a fourth output end, the fourth inductor winding and the fifth inductor winding are both wound around the first inductor magnetic core, a first end of the fourth inductor winding is connected to the third output end of the power conversion device, a first end of the fifth inductor winding is connected to the fourth output end of the power conversion device, and a second end of the fourth inductor winding and a second end of the fifth inductor winding are separately connected to the output end of the AC/AC circuit.

14. The power conversion device according to claim 13, wherein the input end of the AC/AC circuit comprises a first input end and a common end shared between the input end and the output end of the AC/AC circuit, and the output end of the AC/AC circuit comprises a first output end, a second output end, a third output end, and the common end, the second end of the first inductor winding is connected to the first input end of the AC/AC circuit, and the second end of the second inductor winding is connected to the common end of the AC/AC circuit, the second end of the third inductor winding is connected to the first output end of the AC/AC circuit, the second end of the fourth inductor winding is connected to the second output end of the AC/AC circuit, and the second end of the fifth inductor winding is connected to the third output end of the AC/AC circuit.

15. The power conversion device according to claim 1, wherein the alternating current input end of the power conversion device further comprises a third input end and a fourth input end, the fourth inductor winding and the fifth inductor winding are both wound around the first inductor magnetic core, a first end of the fourth inductor winding is connected to the third input end of the power conversion device, a first end of the fifth inductor winding is connected to the fourth input end of the power conversion device, and a second end of the fourth inductor winding and a second end of the fifth inductor winding are separately connected to the input end of the AC/AC circuit.

16. The power conversion device according to claim 15, wherein the input end of the AC/AC circuit comprises a first input end, a second input end, a third input end, and a common end shared between the input end and the output end of the AC/AC circuit, and the output end of the AC/AC circuit comprises a first output end and the common end, the second end of the first inductor winding is connected to the first input end of the AC/AC circuit, the second end of the fourth inductor winding is connected to the second input end of the AC/AC circuit, the second end of the fifth inductor winding is connected to the third input end of the AC/AC circuit, the second end of the second inductor winding is connected to the common end of the AC/AC circuit, and the second end of the third inductor winding is connected to the first output end of the AC/AC circuit.

17. The power conversion device according to claim 9, wherein the input end of the AC/AC circuit comprises a first input end, a second input end, a third input end, and a common end shared between the input end and the output end of the AC/AC circuit, and the output end of the AC/AC circuit comprises a first output end, a second output end, a third output end, and the common end, the second end of the first inductor winding is connected to the first input end of the AC/AC circuit, the second end of the sixth inductor winding is connected to the second input end of the AC/AC circuit, the second end of the seventh inductor winding is connected to the third input end of the AC/AC circuit, the second end of the second inductor winding is connected to the common end of the AC/AC circuit, the second end of the third inductor winding is connected to the first output end of the AC/AC circuit, the second end of the fourth inductor winding is connected to the second output end of the AC/AC circuit, and the second end of the fifth inductor winding is connected to the third output end of the AC/AC circuit.

18. The power conversion device according to claim 9, wherein the power conversion device further comprises a first filter capacitor, and the first filter capacitor is connected between the first input end and the first output end of the power conversion device, is connected between the third input end and the third output end of the power conversion device, is connected between the fourth input end and the fourth output end of the power conversion device, is connected between the second end of the first inductor winding and the second end of the third inductor winding, is either:

connected between the second end of the sixth inductor winding and the second end of the fourth inductor winding, or connected between the second end of the seventh inductor winding and the second end of the fifth inductor winding.

19. The power conversion device according to claim 1, further comprising:

the plurality inductors of the second filter inductor comprising an eighth inductor winding, a ninth inductor winding, a tenth inductor winding, an eleventh inductor winding, a twelfth inductor winding, a thirteenth inductor winding, a fourteenth inductor winding, and a fifteenth inductor winding, wherein the eighth inductor winding, the ninth inductor winding, the tenth inductor winding, the eleventh inductor winding, the twelfth inductor winding, the thirteenth inductor winding, the fourteenth inductor winding, and the fifteenth inductor winding are all wound around the second inductor magnetic core; the first end of the first inductor winding is connected to the first input end of the power conversion device through the eighth inductor winding, the first end of the second inductor winding is connected to the second input end of the power conversion device through the ninth inductor winding, and the first end of the second inductor winding is connected to the second output end of the power conversion device through the tenth inductor winding; the first end of the third inductor winding is connected to the first output end of the power conversion device through the eleventh inductor winding, the first end of the fourth inductor winding is connected to the third output end of the power conversion device through the twelfth inductor winding, the first end of the fifth inductor winding is connected to the fourth output end of the power conversion device through the thirteenth inductor winding, the first end of the sixth inductor winding is connected to the third input end of the power conversion device through the fourteenth inductor winding, and the first end of the seventh inductor winding is connected to the fourth input end of the power conversion device through the fifteenth inductor winding.

20. The power conversion device according to claim 19, further comprising:

a first filter capacitor connected between the second input end and the second output end of the power conversion device.

* * * * *